United States Patent [19]
Iwatani et al.

[11] Patent Number: 6,079,029
[45] Date of Patent: Jun. 20, 2000

[54] DEVICE ARRAY SYSTEM PROVIDING REDUNDANCY OF DISKS FROM ACTIVE SYSTEM DISKS DURING A DISK FAILURE

[75] Inventors: Sawao Iwatani; Suijin Taketa, both of Kawasaki, Japan

[73] Assignee: Fujitsu Limited, Kawasaki, Japan

[21] Appl. No.: 08/979,951

[22] Filed: Nov. 26, 1997

[30] Foreign Application Priority Data

Mar. 17, 1997 [JP] Japan .................................. 9-062759

[51] Int. Cl.[7] .............................................. H03K 19/003
[52] U.S. Cl. ............................................................ 714/6
[58] Field of Search ..................... 714/6, 7, 710

[56] References Cited

U.S. PATENT DOCUMENTS

| | | | |
|---|---|---|---|
| 4,914,656 | 4/1990 | Dunphy, Jr. et al. | 371/10.2 |
| 4,989,205 | 1/1991 | Dunphy, Jr. et al. | 371/10.1 |
| 4,989,206 | 1/1991 | Dunphy, Jr. et al. | 371/10.1 |
| 5,077,736 | 12/1991 | Dunphy, Jr. et al. | 371/10.1 |
| 5,479,653 | 12/1995 | Jones | 395/182.03 |

FOREIGN PATENT DOCUMENTS 7261945A  3/1994  Japan .

OTHER PUBLICATIONS

The RAIDBook, A Source Book for RAID Technology, Edition 1–1, The Raid Advisory Board, St. Peter, MN, Nov. 18, 1993.

*Primary Examiner*—Robert W. Beausoliel, Jr.
*Assistant Examiner*—Stephen C. Elmore
*Attorney, Agent, or Firm*—Staas & Halsey

[57] ABSTRACT

In a device array system, a failure alternate device is fetched from another logic group of a higher redundancy without needing a hot spare patrol, accordingly recovering redundancy of data. In a case corresponding to a mirrored device of RAID-1, as a logic group of a device array unit, a construction control unit constructs a first logic group in which the same data is stored into (N=2) devices and duplicated and a second logic group in which the same data is stored into (N+1=3) devices and triplicated. when one device has failed in the first logic group having a lower redundancy and the redundancy is lost, a failure processing unit fetches one device from the second logic group of a higher redundancy into the first logic group and reconstructs data by using the fetched device as a failure alternate device, accordingly recovering the redundancy of the first logic group.

56 Claims, 37 Drawing Sheets

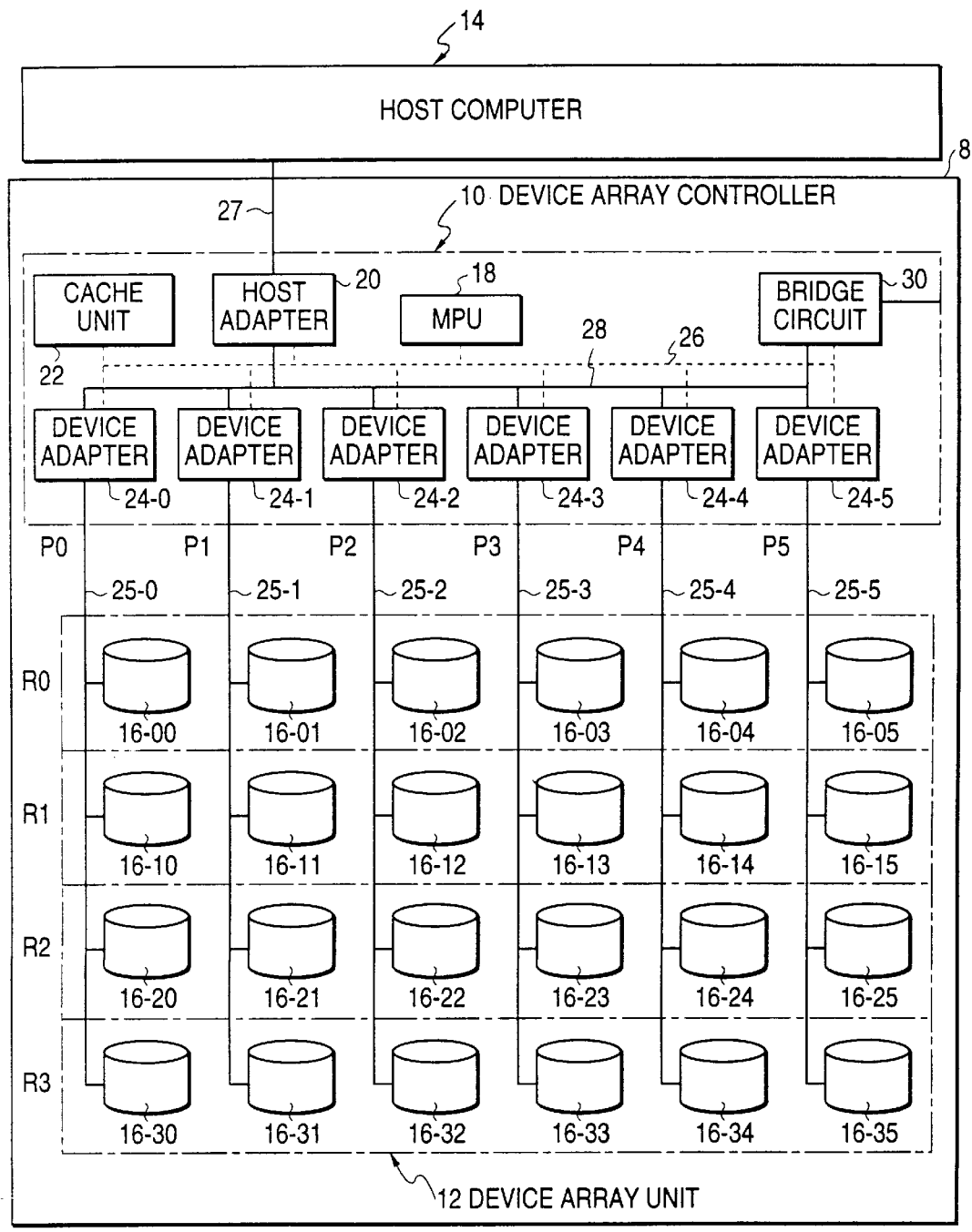

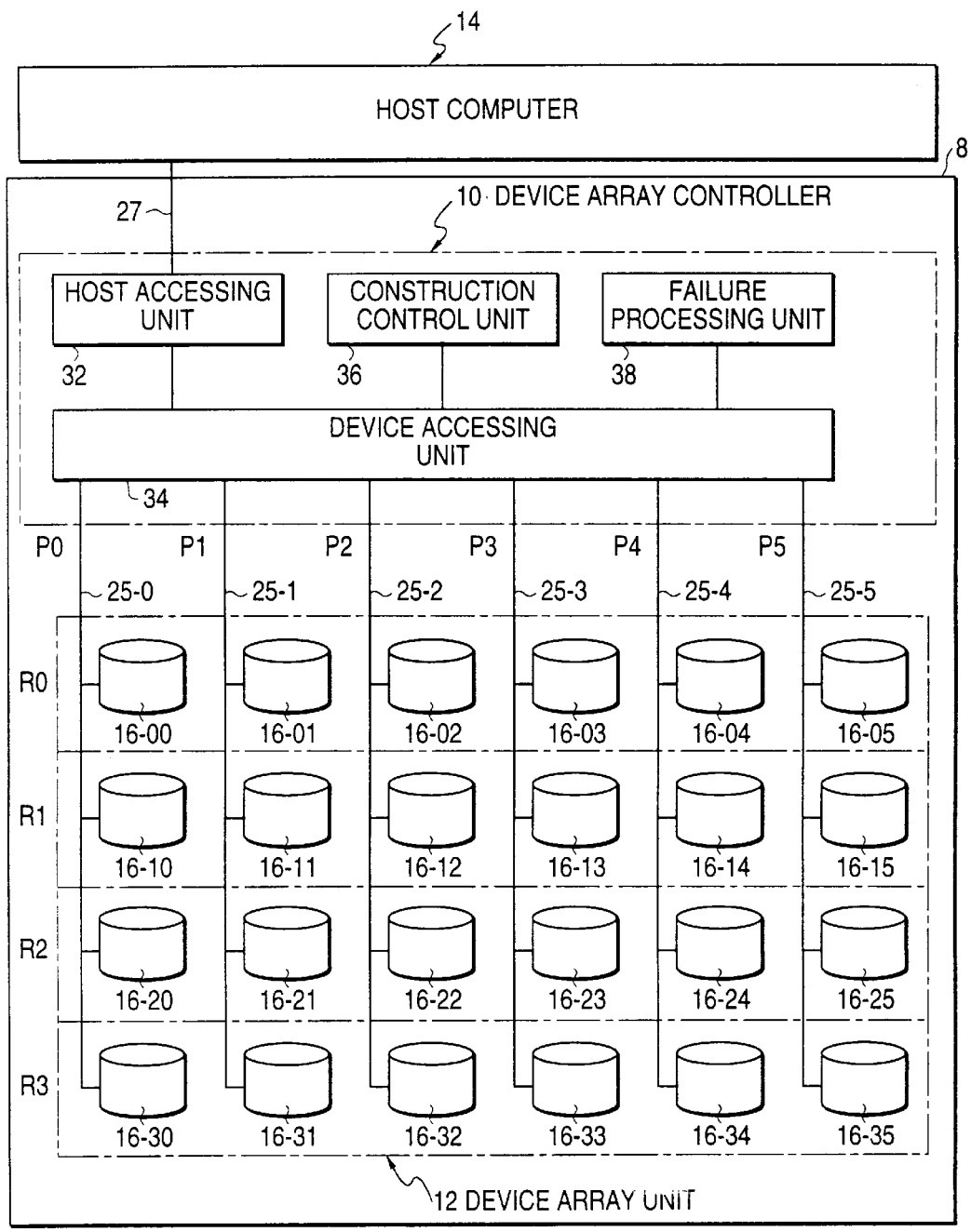

DEVICE ARRAY SYSTEM PROVIDING REDUNDANCY OF DISKS FROM ACTIVE SYSTEM DISKS DURING A DISK FAILURE

CROSS-REFERENCE TO RELATED APPLICATIONS

This application is based on, and claims priority to, Japanese Patent application 9-062759, filed Mar. 17, 1997 in Japan, and which is incorporated herein by reference.

BACKGROUND OF THE INVENTION

1. Field of the Invention

The invention relates to a device array system in which logic groups having redundancies are constructed by a plurality of input/output devices such as disk drives or the like, enabling data to be corrected when a device has failed and, more particularly, to a disk array apparatus which fetches a failure alternating device from another logic group having a high redundancy for a device failure, recovering the redundancy.

2. Description of the Related Art

In the related art, RAID (Redundant Array of Inexpensive or Independent Disk Drives) levels, disclosed in a thesis by David. A. Patterson et al. of University of California at Berkeley, 1987, is a disk array system in which a large amount of data is accessed by many input/output devices, such as disk drives, at a high speed, and which provides for a redundancy of the data when a device has failed.

RAID is explained in *The RAIDBook, A Source Book for RAID Technology*, Edition 1—1, published by the RAID Advisory Board, St. Peter, Minn., Nov. 18, 1993.

The RAID Levels are classified to levels from RAID-1 to RAID-5. RAID-1 relates to a mirrored disk in which the same data is stored in two disk drives. In RAID-2, data and a Hamming code to recover data in a failed drive are stored in several disk drives. In RAID-3 to RAID-5, parities are stored in order to recover data when the disk drive has failed.

According to RAID-4 and RAID-5, a plurality of disk drives can be simultaneously accessed and data read therefrom. In RAID-5, further, since the disk drive storing the parity is not fixed, data can be also simultaneously written to a plurality of disk drives, the effect of which is apparent in a large amount of transaction processes. In the above-mentioned RAID systems, when one of the disk drives has failed and if the failed drive is continuously used as it is, a problem arises such that when another disk drive fails, data is lost.

Therefore, when one disk drive has failed, data stored on the failed disk drive is immediately reconstructed and stored on a normal (or functioning) disk drive which is newly added by using a data reconstructing function based on the redundancy of RAID, so that the redundancy of data is restored. For this purpose, a disk drive called a hot spare, which is used for data correction at the time of failure, is installed in the array of the disk array apparatus. A hot spare is a disk drive which is powered up and ready to replace a failed disk drive without powering down the disk array system.

However, if a hot spare is provided in the disk array system, monitoring whether the hot spare is normal is always necessary and a hot spare patrol is provided for this purpose.

According to the hot spare patrol, a verifying command is generated and transmitted to the hot spare, for example, once an hour, and a verifying process of the entire surface of the disk of the hot spare is executed, for instance, for once a month. Since writing and reading circuits of the hot spare cannot be verified using only the verifying command, the reading and writing operations of a plurality of block data are also executed to the hot spare.

The above-mentioned hot spare patrol is, however, asynchronously and transparently performed with respect to a host computer accessing operation. When accessing the hot spare, the operation may collide with the host accessing operation to another disk drive connected to the same port. When the collision occurs, the host accessing operation is made to wait until the accessing operation to the hot spare is finished, which deteriorates accessing performance.

SUMMARY OF THE INVENTION

An object of the present invention is to provide improved performance in accessing a device array system.

A further object of the present invention is to provide a device array system in which redundancy of data storage is recovered by fetching a failure alternate device (a device which is substituted for a failed device) from another logic group having a relatively higher redundancy and without needing a hot spare patrol.

To accomplish the above-mentioned objects, the present invention is a device array system comprising a device array unit and a controller. In the device array unit of the present invention, a plurality of devices to input and output data are connected to each of a plurality of ports over a plurality of ranks. Ranks are explained herein below, with reference to FIG. 1(A).

The plurality of devices are accessed in parallel on a rank unit basis. The controller of the present invention divides the plurality of devices provided for the device array unit into a plurality of logic groups and accesses the devices on the basis of the logic group unit in response to an access request from a host apparatus.

The controller of the present invention comprises a construction control unit and a failure processing unit, each performing various functions explained below, and providing for the recovery of the redundancy of data (and parity) when a device has failed.

The controller of the present invention constructs, as the logic groups, a first logic group in which the same data is stored into (N) devices and multiplexed, and a second logic group in which the same data is stored into at least (N+1) devices and multiplexed. The failure processing unit is constructed in a manner such that when one device in the first logic group has failed and redundancy is lost, one device in the second logic group is fetched into the first logic group and the data is reconstructed by using the fetched device as a failure alternate device, accordingly recovering the redundancy.

Further, the construction control unit constructs a plurality of logic groups each having a predetermined redundancy and having a data device to store data and a Hamming code device to store a Hamming code corresponding to the data stored in said data device. The failure processing unit is then constructed in a manner such that when the device in a certain logic group has failed and redundancy is below the predetermined redundancy, a device for redundancy in another logic group is assembled into the logic group in which the device failure occurred under a prerequisite condition that the redundancy is not below the predetermined redundancy, and the data is reconstructed by using the assembled device as a failure alternating device, accordingly recovering the redundancy.

Also, the construction control unit constructs, as the logic groups, a first logic group and a second logic group. In the first logic group, data is divided and stored into each of a plurality of data devices and parities obtained from the storage data are stored into a plurality of parity devices. In the second logic group, data is divided and stored into a plurality of data devices and parities obtained from the storage data are stored in one parity device. The failure processing unit is constructed in a manner such that when the device in the second logic group has failed and a redundancy is lost, one parity device in the first logic group is fetched into the second logic group and the data is reconstructed by using the fetched parity device as a failure alternating device, accordingly recovering the redundancy.

In addition, the construction control unit constructs, as the logic groups, a first logic group and a second logic groups. The first logic group includes a plurality of data devices in which data is divided and stored, one parity device to store the same parity obtained from the storage data, and at least one data multiplexing device in which the same data as that of a part of the plurality of data devices is stored and multiplexed. The second logic group includes a plurality of data devices in which data is divided and stored and one parity device for storing parities obtained from the storage data. The failure processing unit is constructed in a manner such that when the device in the second logic group has failed and a redundancy is lost, one data multiplexing device in the first logic group is fetched into the second logic group and reconstructs the data by using the fetched data multiplexing device as a failure alternating device, accordingly recovering the redundancy.

Further, the construction control unit constructs, as the logic groups, a first logic group and a second logic group. The first logic group includes a plurality of devices for storing data and a parity corresponding to RAID-5 and a multiplexing device to store the same data and parity as those of a part of the plurality of devices. The second logic group includes a plurality of devices to store the data and a parity corresponding to RAID-5. The failure processing unit is constructed in a manner such that when the device in the second logic group has failed and redundancy is lost, the multiplexing device in the first logic group is fetched into the second logic group and the data is reconstructed by using the fetched multiplexing device as a failure alternate device, accordingly recovering the redundancy.

Also, the construction control unit constructs, as the logic groups, a first logic group and a second logic group. In the first logic group, data and a Hamming code corresponding to RAID-2 are stored in a plurality of devices. In the second logic group, data and parity correspond to RAID-1, 3, 4, or 5. The failure processing unit is constructed in a manner such that when the device in the second logic group has failed and redundancy is lost, the Hamming code device in the first logic group is fetched into the second logic group and the data is reconstructed by using the fetched Hamming code device as a failure alternate device, accordingly recovering the redundancy.

Further, the construction control unit constructs, as the logic groups, a first logic group and a second logic group. In the first logic group, data and a Hamming code corresponding to RAID-2 are stored into a plurality of devices. In the second logic group, data and a parity corresponding to RAID-1, 3, 4, or 5 are stored in a plurality of devices. The failure processing unit is constructed in a manner such that when the device in the second logic group has failed and redundancy is lost, the first logic group is changed to a logic group of RAID-3, one of a plurality of Hamming code devices released from the first logic group is fetched into the second logic group and the data is reconstructed by using the fetched Hamming code device as a failure alternate device, accordingly recovering the redundancy.

Also construction control unit constructs, as the logic groups, a first logic group and a second logic group. In the first logic group, the same data is stored into a plurality of devices. In the second logic group, data and a parity are stored into a plurality of devices. The failure processing unit is constructed in a manner such that when the device in the first logic group has failed and redundancy is lost, a parity device in the second logic group is fetched into the first logic group anu the data is reconstructed by using the fetched parity device as a failure alternate device, accordingly recovering the redundancy.

In addition, the construction control unit constructs, as the logic groups, a first logic group and a second logic group. In the first logic group, the same data is stored into a plurality of devices. In the second logic group, data and a parity are stored into a plurality of devices. The failure processing unit is constructed in a manner such that when the device in the second logic group has failed and redundancy is lost, one device in the first logic group is fetched into the second logic group and the data is reconstructed by using the fetched device as a failure alternate device, accordingly recovering the redundancy.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 2 is a block diagram of a system construction of the present invention.

FIG. 3 is a block diagram of system functions of the present invention.

DESCRIPTION OF THE PREFERRED EMBODIMENTS

Figure 1A:
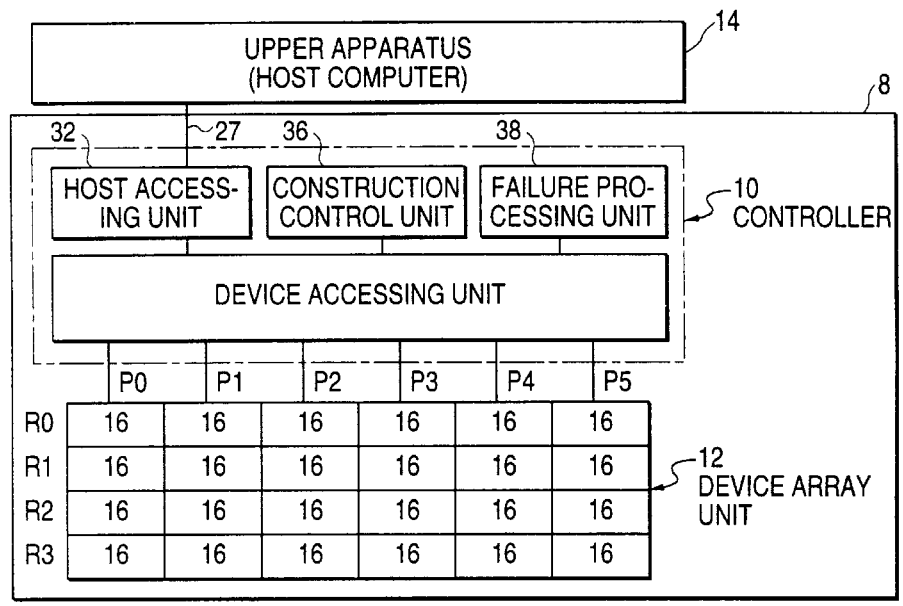
FIGS. 1(A) and 1(B) are principle explanatory diagrams of the present invention.
Figure 1B:
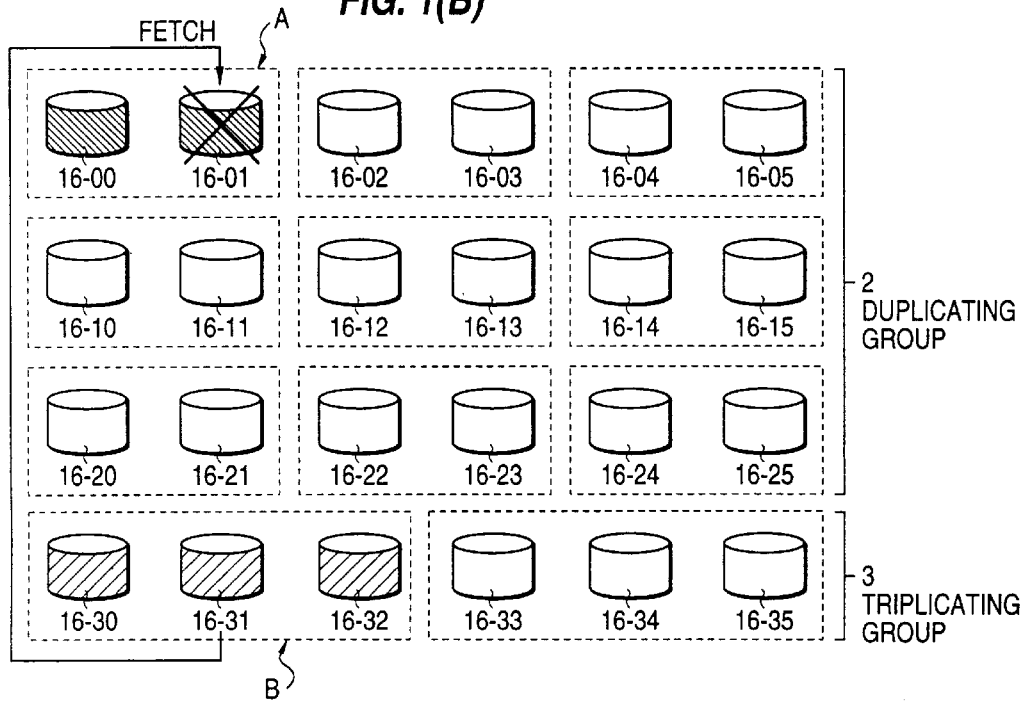

FIGS. 1(A) and 1(B) are principle explanatory diagrams of the present invention. As shown in FIG. 1(A), the device array system 8 of the present invention comprises a device array unit 12 and a controller 10.

In the device array unit 12 of the present invention, a plurality of devices 16 for input/output are connected to a plurality of ports P0 to P5 for a plurality of ranks R0 to R3, respectively, accordingly enabling the plurality of devices 16 to be accessed in parallel on a rank unit basis.

The controller 10 of the present invention divides the plurality of devices 16 provided in the device array unit 12 into a plurality of logic groups and accesses the plurality of devices 16 on a logic group unit basis in response to an accessing request received from an upper apparatus 14 (such as a host computer).

The present invention implementing RAID-1 is explained herein below.

According to the present invention, as part of the device array system 8, a construction control unit 36 and a failure processing unit 38 which correspond to the mirrored device of RAID-1 are provided in the controller 10. The logic groups of the device array unit 12 are constructed as follows. The construction control unit 36 constructs a first logic group in which the same data is stored to N devices 16 and multiplexed, and a second logic group in which the same data is stored into at least (N+1) devices 16 and multiplexed.

The first logic group has a lower level of redundancy, and the second logic group has a higher level of redundancy. When one device 16 has failed in the first logic group, and redundancy is lost, the failure processing unit 38 fetches one device 16 of the second logic group into the first logic group, reconstructs data by using the fetched device as a failure alternating device, and recovers the redundancy of the first logic group.

For example, as shown in FIG. 1(B), the construction control unit 36 constructs nine first logic groups A, in each of which the same data is stored into two devices 16 and duplicated. Further, the construction control unit 36 constructs two second logic groups B, in each of which the same data is stored into three devices 16 and triplicated. In the case shown in FIG. 1(B), when one device 16-01 has failed in the duplicated first logic groups A and redundancy is lost, the failure processing unit 38 fetches a device 16-31 in the triplicated second logic groups B into the first logic groups A and reconstructs data by using the fetched device as a failure alternating device, accordingly allowing the redundancy to be recovered (duplicated).

According to the device array system 8 of the present invention corresponding to RAID-1, during normal operation, a hot spare device which is used as a failure alternate device when a device fails does not exist in the device array unit 12, and all of the devices 16 belong to any one of the logic groups and are in the operating state receiving and executing an accessing operation. Therefore, as in the case in which a hot spare device is fixed and provided, a hot spare patrol verifying whether the hot spare is functioning normally is unnecessary.

Consequently, a collision between an access by the hot spare patrol and an access based on a host request to the same device does not occur, and system performance is guaranteed.

When the device failure occurs in the first logic group, which has a low redundancy in the above-mentioned example, the device of the second logic group, which has a high redundancy in the above-mentioned example, is fetched as a failure alternate device and the redundancy of the first logic group in which the device failure occurred can be recovered. In the above-mentioned example, although the redundancy of the second logic group which provided the failure alternate device deteriorates, the redundancy is not lower than a predetermined threshold value, for example, the redundancy of the first logic group.

The device of the second logic group having a high redundancy is fetched as a failure alternate device for the device failure of the first logic group having a low redundancy, and the redundancy of the first logic group in which the device failure occurred is recovered. Subsequently, when the failed device of the first logic group is exchanged for a normal device, the failure processing unit 38 fetches the exchanged device into the first logic group, reconstructs the same data as that of the failure alternate device, returns the failure alternate device to the second logic group, and reconstructs the original data, accordingly recovering the redundancy of the device array system 8 to the same level as before the device of the first logic group failed, which was deteriorated due to the failure alternation.

As another process of the failure processing unit 38, when the failed device of the first logic group is exchanged for the normal device, the exchanged device is fetched into the second logic group, and the data is reconstructed, accordingly recovering the redundancy of the device array system 8 to the same level as before the device of the first logic group failed, which was deteriorated due to the failure alternation. In the above-mentioned another process, the failure alternate device 16 keeps the first logic group as it is and omits the reconstructing process of data.

The failure processing unit 38 executes the following processes when a plurality of failures occur such that the devices of the first logic group fail sequentially.

First, when one device 16 of the first logic group has failed, redundancy is lost, and a device 16 of the second logic group is fetched as a failure alternate device into the first logic group, accordingly reconstructing data. After that, when another device 16 fails in the first logic group, another device 16 of the second logic group is fetched as a failure alternate device into the first logic group and data is reconstructed, accordingly recovering the redundancy.

When fetching the failure alternate device 16 of the first logic group from the second logic group, the failure processing unit 38 preferentially selects the device 16 of the second logic group connected to the same port as that of the failed device 16. Consequently, the failure alternate device 16 fetched to the first logic group and the existing normal device are made to interface to the device accessing unit 12 on different ports P0–P5, accordingly avoiding a collision of accesses which would occur if a plurality of devices 16 in the group exist on the same port P0–P5.

When the device 16 of the second logic group having a high redundancy has failed, the failure processing unit 38 allows the accessing operation to continue, but with the failed device 16 disconnected. When the failed device 16 is exchanged for a normal device 16, the failure processing unit 38 returns the exchanged device 16 to the second logic group, accordingly reconstructing data. Consequently, no failure alternation is needed for the device failure in the second logic group, in which the level of redundancy is high.

To assist in discriminating the device failure by the failure processing unit 38, an error ratio for the accessing operations to the plurality of devices 16 provided for the device array unit 12 is measured. When the error ratio is equal to or larger than a predetermined value, the corresponding device 16 is determined to have failed. A corresponding failure process is then executed.

When the device failure is discriminated from the error ratio as mentioned above, the failed device 16 is exchanged for a normal device 16 before the device failure actually occurs, so that the reliability of the device array system 8 is further improved.

When the failed device is exchanged, since the failure alternate device 16 is provided from the second logic group having a high redundancy, the redundancy of the first logic group does not deteriorate during the device exchanging process.

In another aspect of the present invention corresponding to RAID-1, the construction control unit 36 constructs a plurality of second logic groups having different redundancies such as an (N+1)-multiplexed group, an (N+2)-multiplexed group, and the like. In this case, when the device has failed in the first logic group (which has a low redundancy) and redundancy is lost, the failure processing unit 38 fetches the device of the group having the highest redundancy in the plurality of second logic groups into the first logic group. The failure processing unit 38 reconstructs the data by using the fetched device as a failure alternate device, accordingly recovering the redundancy.

Although the devices 16 of the device array unit 12 are generally made up of only magnetic disk drives, a semiconductor memory is additionally provided. Accordingly, at least one semiconductor memory is arranged in the plurality of devices 16 of the second logic group by the construction control unit 36. In this case, when the device 16 has failed in the first logic group, having a low redundancy, and the redundancy is lost, the failure processing unit 38 includes the semiconductor memory of the second logic group, having a high redundancy, in the first logic group as an alternate device 16 of the failed device 16. The failure processing unit 38 reconstructs data, accordingly recovering the redundancy. By fetching the semiconductor memory having a high accessing speed as a failure alternate device, the recovery of the redundancy for the first logic group is realized in a short period of time.

The present invention implementing RAID-2 is explained herein below.

In a RAID-2 device array system, redundancy is accomplished using a Hamming code. When the device array system 8 of the present invention corresponds to a RAID-2 system, the construction control unit 36 and failure processing unit 38 of the controller 10 are constructed as explained below.

First, the construction control unit 36 constructs a plurality of logic groups, in each of which a plurality of data devices 16 storing data and a plurality of Hamming code devices 16 storing Hamming codes corresponding to the data stored in the data devices 16 are provided. Each of the plurality of logic groups has a predetermined redundancy.

When a device 16 of a certain logic group has failed and the redundancy for that logic group is less than the predetermined redundancy, the failure processing unit 38 fetches a Hamming code device 16 of another logic group into the logic group in which the device 16 failure occurred. The failure processing unit 38 fetches the Hamming code device 16 under a condition such that the redundancy is not lower than a predetermined redundancy. The failure processing unit 38 reconstructs data by using the fetched device as a failure alternate device 16, accordingly recovering the redundancy.

Even in the device array system corresponding to RAID-2 as well, during normal operation, a hot spare which is used as a failure alternate device 16 for a device failure is not included in the device array unit 12. All of the devices 16 in the device array unit 12 belong to any one of the logic groups and are in an operating state in which an accessing operation is received and executed. The hot spare is not a separate or specific device, but is allocated when needed as an alternate device for a failed device from other, redundant devices in the device array system 8 of the present invention. Therefore, no hot spare patrol is needed, and a collision between the device access by the hot spare patrol and the device access based on the host request does not occur. Accordingly, system performance is guaranteed.

When the failed device is exchanged for a normal device 16, the failure processing unit 38 reconstructs into the exchanged device the same data as that of the failure alternate device 16 and returns the failure alternate device 16 to the original logic group, accordingly reconstructing the original Hamming code.

The present invention implementing RAID-3 or RAID-4 is explained herein below.

When the device array system of the present invention corresponds to RAID-3 or RAID-4 in which a parity device 16 is fixed, the construction control unit 36 and failure processing unit 38 of the controller 10 are constructed as follows.

First, the construction control unit 36 constructs a first logic group in which data is divided and stored into each of a plurality of data devices 16 and parities obtained from the stored data are stored into a plurality of parity devices 16 (multiplexed parities). The construction control unit 38 also constructs a second logic group in which data is divided and stored into a plurality of data devices 16 and parities derived from the stored data are stored into one parity device 16.

For example, a first logic group in which a parity device 16 of RAID-3 is multiplexed and a second logic group of only RAID-3 are constructed 16. In addition, a first logic group in which a parity device 16 of RAID-4 is multiplexed and a second logic group of only RAID-4 could also be constructed.

When the device 16 of the second logic group implementing only RAID-3 or RAID-4 has failed and redundancy is lost, the failure processing unit 38 fetches one parity device 16 from the first logic group whose redundancy is high due to the above-mentioned parity multiplex into the second logic group. The failure processing unit 38 reconstructs data by using the fetched device 16 as a failure alternate device, accordingly recovering the redundancy.

Even in the device array system corresponding to RAID-3 or RAID-4 as well, during normal operation a hot spare (which is used as a failure alternate device for a device failure) is not included in the device array unit 12. All of the devices 16 belong to any one of the logic groups and are in the operating state in which the accessing operation is received and executed. The hot spare is not a separate or specific device, but is allocated when needed as an alternate device for a failed device from other, redundant devices in the device array system 8 of the present invention. Therefore, no hot spare patrol is needed, a collision between the device access by the hot spare patrol and the device access based on the host request does not occur, and the system performance is guaranteed.

When the failed device 16 of the second logic group is exchanged for normal device 16, the failure processing unit 38 reconstructs into the exchanged device the same parity as that of the second logic group, accordingly duplicating the parity device 16. In this instance, the failure alternate device 16 fetched from the first logic group is stored in the second logic group as is, without reconstructing data.

As another aspect of the failure processing unit 38, when the failed device 16 of the second logic group is exchanged for the normal device 16, the same data as that of the failure alternate device can be reconstructed into the exchanged device, to subsequently return the failure alternate device to the original first logic group, and to reconstruct the original parity.

In another embodiment of the present invention corresponding to RAID-3 or RAID-4, the parity device 16 is not multiplexed but a part of a plurality of data devices 16 is multiplexed and used for the failure alternative. That is, the construction control unit 36 constructs the following first logic group and second logic group.

The first logic group comprises a plurality of data devices in which data is divided and stored, one parity device 16 storing the same parity obtained from the stored data, and at least one data multiplexing device in which the same data as that of a part of the plurality of data devices is stored and multiplexed. The second logic group comprises a plurality of data devices 16 in which data is divided and stored and one parity device 16 to store a parity obtained from the stored data.

Specifically, a first logic group and a second logic group are constructed. In the first logic group, a part of the data devices of RAID-3 is multiplexed. The second logic group comprises only RAID-4. Consistent with the present invention, a first logic group in which a part of the data devices of RAID-4 are multiplexed and a second logic group implementing only RAID-4 could also be constructed.

In this case, when the device of the second logic group implementing only RAID-3 or RAID-4 has failed and redundancy is lost, the failure processing unit 38 fetches one multiplexed data device of the first logic group in which a part of the data devices has been multiplexed into the second logic group and reconstructs data by using the fetched device as a failure alternate device, accordingly recovering the redundancy.

In the device array system 8 of the present invention as well, when the failed device 16 of the second logic group is exchanged for normal device 16, the failure processing unit 38 duplicates into the exchanged device a part of the data devices by reconstructing the same data as that of a specified device of the second logic group and allows the failure alternate device fetched from the first logic group to remain in the second logic group as is, making reconstruction of the data unnecessary.

When the failed device of the second logic group is exchanged for the normal device, as another process of the failure processing unit 38, the same data as that of the failure alternate device is reconstructed into the exchanged device, to return the failure alternate device to the first logic group, and to reconstruct the original data.

The present invention implementing RAID-5 is explained herein below.

When the device array system 8 of the present invention corresponds to RAID-5 in which the parity device is not fixed, the construction control unit 36 and the failure processing unit 38 of the controller 10 are constructed as follows. First, the construction control unit 36 of the present invention constructs a first logic group and a second logic group as logic groups of the device array unit 12 of the present invention.

The first logic group comprises a plurality of devices 16 storing data and parity corresponding to RAID-5, and at least one multiplexing device storing the same data and parity as those stored in a part of the devices.

The second logic group comprises a plurality of devices 16 to storing data and parity corresponding to RAID-5. In this case, when the device 16 of the second logic group of only RAID-5 has failed and redundancy is lost, the failure processing unit 38 fetches the multiplexing device of the first logic group into the second logic group and reconstructs data by using the fetched device as a failure alternate device, accordingly recovering the redundancy.

Even in the device array system 8 corresponding to RAID-5 as well, during normal operation the hot spare (which is used as a failure alternate device for the device 16 failure) is not included in the device array unit 12. Accordingly, all of the devices 16 belong to any one of the logic groups and are in the operating state in which the accessing operation is received and executed.

Therefore, a hot spare patrol is not needed, a collision between device access by the hot spare patrol and device access based on a host request does not occur, and the device array system 8 performance can be guaranteed.

When the failed device of the second logic group is exchanged for the normal device 16 in the device array system 8, the failure processing unit 38 reconstructs the same data as that of the failure alternate device into the exchanged device and returns the failure alternate device into the first logic group, accordingly reconstructing the original data.

The present invention implementing RAID-1 to RAID-5 is explained herein below.

When the device array system 8 of the present invention corresponds to the combination of RAID-1 to RAID-5, the construction control unit 36 and failure processing unit 38 of the controller 10 are constructed as follows. First, as logic groups of the device array unit 12, the controller 10 constructs a first logic group and a second logic group. The first logic group stores in a plurality of devices data and a Hamming code corresponding to RAID-2. The second logic group stores in a plurality of devices data and parity corresponding to RAID-1, RAID-3, RAID-4, or RAID-5.

In this case, when the device 16 of the second logic group corresponding to RAID-1, RAID-3, RAID-4, or RAID-5 having a lower redundancy has failed and the redundancy is lost, the failure processing unit 38 fetches a Hamming code device 16 of the first logic group into the second logic group and reconstructs data by using the fetched device as a failure alternate device, accordingly recovering the redundancy.

In another aspect of the device array system 8 of the present invention in which RAID levels are combined, when the device 16 of the second logic group corresponding to RAID-1, RAID-3, RAID-4, or RAID-5 has failed and the redundancy is lost, the failure processing unit 38 changes the first logic group corresponding to RAID-2 to a logic group of RAID-3, fetches one of a plurality of Hamming code devices released from the first logic group into the second logic group, and reconstructs data by using the fetched device as a failure alternate device, accordingly recovering the redundancy.

In another aspect of the device array system 8 of the present invention in which RAID levels are combined, as logic groups of the device array unit 12, the construction control unit 36 first constructs a first logic group and a second logic group. The first logic group stores the same data into a plurality of devices 16. The second logic group stores data and parity into a plurality of devices 16. In this case, when one of the multiplexing devices of the first logic group and the redundancy is lost, the failure processing unit 38 fetches the parity device of the second logic group into the first logic group and reconstructs data by using the fetched device as a failure alternate device, accordingly recovering the redundancy.

As a specific example, the construction control unit 36 constructs a duplicating logic group (RAID-1) in which the same data has been stored into two devices as a first logic group and constructs a logic group corresponding to RAID-3 or RAID-4 in which the parity device is fixed as a second logic group. In this case, when one of the devices of the duplicating logic group has failed and the redundancy is lost, the failure processing unit 38 fetches the parity device of the logic group of RAID-3 or RAID-4 as a failure alternate device and reconstructs data, accordingly recovering the redundancy.

Further, another aspect of the device array system 8 of the present invention in which RAID levels are combined is now explained. As logic groups of the device array unit 12, the construction control unit 36 first constructs a first logic group in which the same data has been stored into a plurality of devices 16, and constructs a second logic group in which data and parity have been stored into a plurality of devices 16. When the device of the second logic group has failed and the redundancy is lost, the failure processing unit 38 fetches one device 16 of the first logic group into the second logic group and reconstructs data by using the fetched device as a failure alternate device, accordingly recovering the redundancy.

For example, the construction control unit 36 constructs a multiplexing logic group in which the same data has been stored into three or more devices as a first logic group and constructs a parity logic group corresponding to RAID-3, RAID-4, or RAID-5 as a second logic group. In the above-mentioned example, the first logic group has at least a triplicated redundancy (i.e., at least 3 devices storing the same data). In this case, when the device of the second logic group of RAID-3, RAID-4, or RAID-5 having a lower redundancy has failed and the redundancy is lost, the failure processing unit 38 fetches one device from the first logic group having the at least triplicated redundancy into the second logic group and reconstructs data by using the fetched device as a failure alternate device, accordingly recovering the redundancy.

In the device array system corresponding to the combination of RAID levels as well, during normal operation a hot spare (which is used as a failure alternate device for the device failure) exists, but resides in the device array unit 12. Accordingly, all of the devices belong to any one of the logic groups and are in the operating state in which the accessing operation is received and executed. The hot spare is not a separate or specific device, but is allocated when needed as an alternate device for a failed device from other, redundant devices in the device array system 8 of the present invention. Therefore, no hot spare patrol is needed, a collision between the device access by the hot spare patrol and the device access based on the host request does not occur, and the system performance can is guaranteed.

In the device array unit 12 of the present invention, I/O devices 16 such as magnetic disk drives, magneto-optical disk drives, semiconductor memories, magnetic tape apparatuses, or other types of storage devices are used as the devices 16. In addition, and also as part of the present invention, the foregoing I/O devices 16 could be used in combination with each other in the disk array unit 12, using a mix of magnetic disk drives, magneto-optical disk drives, semiconductor memories, magnetic tape apparatuses, or other types of storage devices.

The preferred embodiments of the present invention are explained as follows:

1. Construction and functions of the device array system 8 of the present invention;
2. The device array system 8 of the present invention implementing RAID-1;
3. The device array system 8 of the present invention implementing RAID-2;
4. The device array system 8 of the present invention implementing RAID-3 or RAID-4; and
5. The device array system 8 of the present invention implementing RAID-5.

1. Construction and Functions of the Device Array System 8 of the Present Invention FIG. 2 is a block diagram showing a hardware construction of a device array system 9 of the present invention. The device array system 9 of the present invention comprises device array controller 10 and device array unit 12. The device array controller 10 is connected as an external storage system to the host computer 14. The device array unit 12 comprises, for example, 24 devices 16-00 to 16-35.

Magnetic disk drives are examples of devices 16-00 to 16-35 shown in FIG. 2. Positions of the 24 devices 16-00 to 16-35 provided for the device array unit 12 are defined by six ports P0 to P5 of the device controller 10 and four ranks R0 to R3, as shown in FIG. 2. In each of the four ranks R0 to R3, six devices are hierarchically connected to the device array controller 10 so that the six devices in each of the four ranks are accessed in parallel. That is, each of the 24 devices 16-00 to 16-35 can be generally expressed as a device 16-Ri, Pi by using a port number Pi and a rank number Ri.

Device paths 25-0 to 25-5 extend out, respectively, from the ports P0 to P5 of the device array controller 10 to the device array unit 12. Four devices are connected by rank to each of the device paths 25-0 to 25-5. For example, the devices 16-00, 16-10, 16-20, and 16-30 are connected to the device path 25-0.

The device array controller 10 comprises a microprocessor unit (MPU) 18 and a host adapter 20. In addition, device adapters 24-0 to 24-5 are each connected to a control bus 26 connected the MPU 18. The host adapter 20 comprises a cache unit 22, is connected to the host computer 14 by a channel path 27, and displays input/output requests transmitted by the host computer 14.

An access request such as a write request or read request transmitted from the host computer 14, is received by the host adapter 20, and is transmitted to the MPU 18. The MPU 18 constructs logic groups corresponding to a designated RAID level for the device array unit 12 at the time of activation of the device array system 8, buffers write data in response to the write request, and allows a plurality of devices included in the designated logic group in the device array unit 12 to execute a write process by parallel processing of the device adapters 24-0 to 24-5.

In a read process, the MPU 18 similarity combines read data of the devices obtained from the device array unit 12 by parallel reading processes of the device adapters 24-0 to 24-5, and transmits the read data to the host computer 14 via the host adapter 20.

In the device array system 8 of the present invention, any one of the following systems can be constructed by the depending on the functioning of the construction control of the MPU 18:

| | |
|---|---|
| (1) | a device array system 8 corresponding to RAID-1; |
| (2) | a device array system 8 corresponding to RAID-2; |
| (3) | a device array system 8 corresponding to RAID-3 or RAID-4; |
| (4) | a device array system 8 corresponding to RAID-5; |
| (5) | a device array system 8 having a combination of RAID levels |

When the device array system 8 is set up, the MPU 18 constructs a plurality of logic groups corresponding to the RAID level designated at that time by a dip switch, software, or the like, for devices 16-00 to 16-35 of the device array unit 12 as targets. The logic groups are a set of device groups constructing one RAID level. Further, the device array controller 10 of the present invention comprises a bridge circuit 30 and connects another device array controller 10 via the bridge circuit 30, accordingly enabling a duplicated construction of the device array controllers 10 to be obtained. When the device array controllers 10 are constructed in duplicate, the device paths 25-0 to 25-5 from the two device array controllers 10 are connected as individual paths to the devices 16-00 to 16-35, respectively, for the device array unit 12. The device array unit 12 is accessed independently from each of the device array controllers 10.

FIG. 3 is a block diagram of functions of the device array system 8 shown in FIG. 2. As shown in FIG. 3, the device array controller 10 of the present invention comprises a host accessing unit 32, a device accessing unit 34, the construction control unit 36, and the failure processing unit 38. The host accessing unit 32 comprises the host adapter 20 and the cache unit 22, and the device accessing unit 34 comprises the device adapters 24-0 to 24-5. The construction control unit 36 and the failure processing unit 38 are realized by functions of the MPU 18 shown in FIG. 2, but not shown in FIG. 3.

The construction control unit 36 constructs a plurality of logic groups corresponding to a RAID level designated at system setup time from the devices 16-00 to 16-35 of the device array unit 12 as targets. Although the plurality of logic groups constructed by the construction control unit 36 are different depending upon the RAID level designated, a logic group of a lower redundancy and a logic group of a higher redundancy are constructed.

The failure processing unit 38 executes a corresponding process, explained below, when a device failure occurs during a process being executed based on an access request transmitted from the host computer 14 to the plurality of logic groups as targets constructed by the construction control unit 36. The corresponding failure processes executed by the failure processing unit 38 are mainly divided into a corresponding process when a device in the logic group having the lower redundancy has failed and a corresponding process when a device in the logic group having the higher redundancy has failed.

When the device in the logic group having the lower redundancy has failed, a device in the logic group having the higher redundancy is fetched as a failure alternate device, accordingly recovering the redundancy. It is a condition in this instance that the redundancy of the logic group of the higher redundancy is not below a predetermined threshold value even when the failure alternate device is removed from the logic group of the higher redundancy and allocated to the logic group of the lower redundancy.

After recovering the redundancy by fetching the failure alternate device from the logic group of the higher redundancy to the logic group of the lower redundancy in which the device failed, the failed device is exchanged for a normal device. In a recovery process after exchanging the failed device, the same data as that of the failure alternate device is recovered to the exchanged device, and the failure alternate device is subsequently returned to the original logic group of the higher redundancy serving as a fetching destination, accordingly allowing the original data to be recovered.

On the other hand, when a device in the logic group of the higher redundancy has failed, since the redundancy of the logic group is not lost, the failed device is is connected and the process is continued.

After the failed device was exchanged for the normal device, the original data is reconstructed and the original redundancy is recovered.

Figure 4:
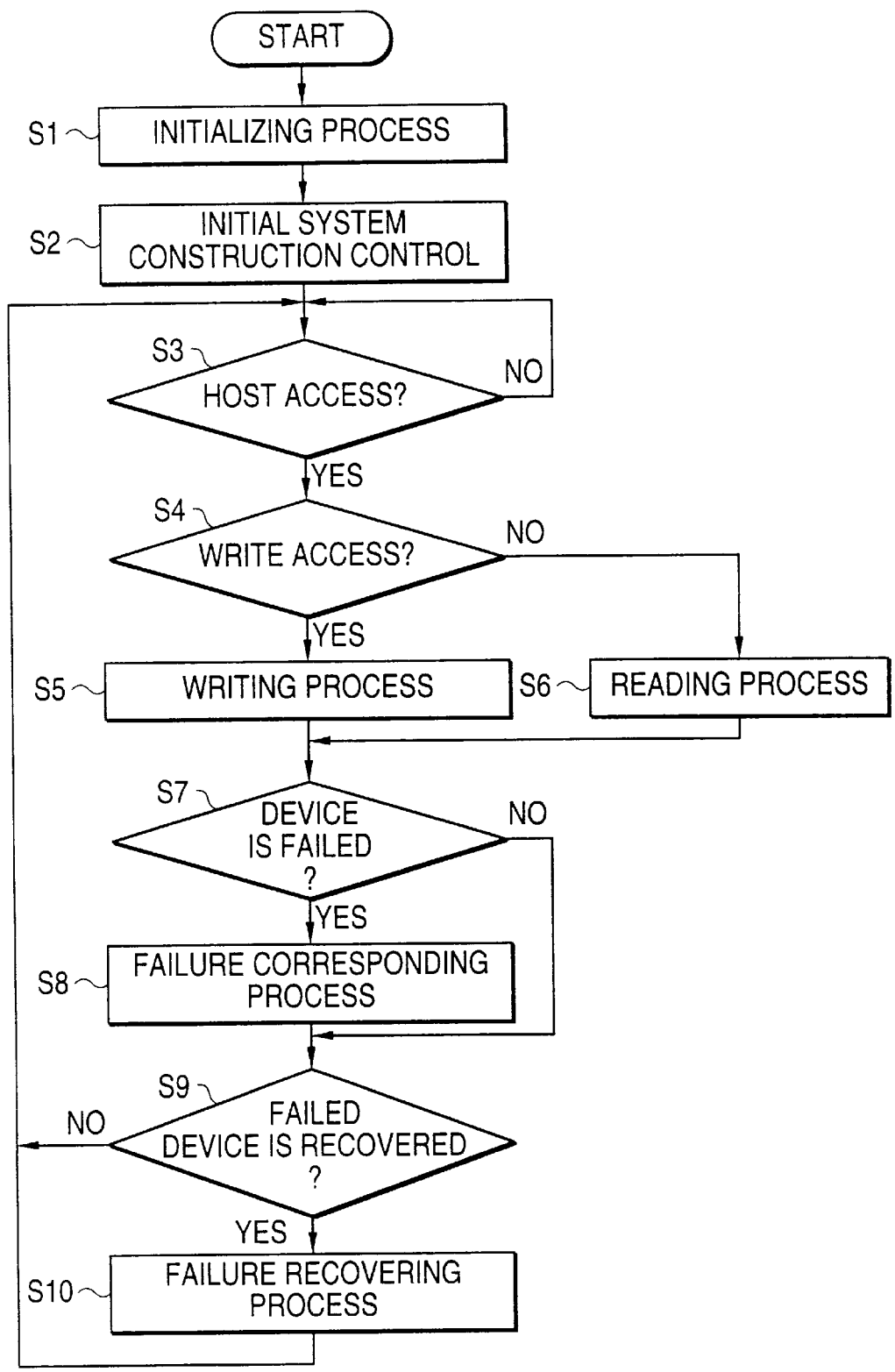
FIG. 4 is a flowchart showing fundamental processes of the present invention.

FIG. 4 is a flowchart showing a general processing operation of the device array system 8 shown in FIG. 3. When the device array system 8 is started by turning on a power source, an initializing process is executed in step S1.

Subsequently, in step S2, construction control by the construction control unit 36 provided for the disk array controller 10 shown in FIG. 3 is executed. The plurality of logic groups constructed by the construction control are determined depending on a RAID level designated by a dip switch or by software at system setup time.

When the system construction control in step S2 is completed, the device array system 8 of the present invention enters a normal operating state.

An access request transmitted by the host computer 14 is checked in step S3. When the access request is transmitted by the host computer 14 in step S3, the processing routine advances to step S4 and a check is made to determine whether the access request is a write access or not. If the access request is a write access, the processing routine advances to step S5 and a writing process to the disk array unit 12 is executed to a specified logic group as a target. The writing process is a parallel writing process to all of the devices belonging to the logic group.

On the other hand, in the case of a read access, the processing routine advances to step S6 and a reading process is executed to the designated logic group. In the system corresponding to RAID-1, the reading process reads from any one of the plurality of devices belonging to the logic group.

In RAID-2, RAID-3, and RAID-4, parallel reading processes of the data devices belonging to the logic group are executed. Further, in the device array system 8 corresponding to RAID-5, the reading process is a read to a specified device belonging to the logic group.

Subsequently, a device drive failure is checked in step S7. If the device failure occurs in a specified logic group, step S8 follows and a corresponding failure process corresponding to the RAID level implemented by the device array system 8 at that time is executed.

When redundancy is lost due to the device failure, the redundancy can be consequently recovered by fetching the failure alternate device from another logic group. Subsequently, in step S9, a check is made to determine whether the failed device has been recovered, that is, if the failed device has been exchanged for a normal device. When the failure alternate device is exchanged for the normal device, a system recovery process is executed in step S10, and the plurality of logic groups corresponding to the RAID level initially established in the device array system 8 in step S2 is recovered.

The details of the processing operation shown in the flowchart of FIG. 4 and corresponding to each RAID level as a target implemented on the device array system 8 of the present invention is subsequently described.

2. Device Array System 8 Corresponding to RAID-1

Figure 5:
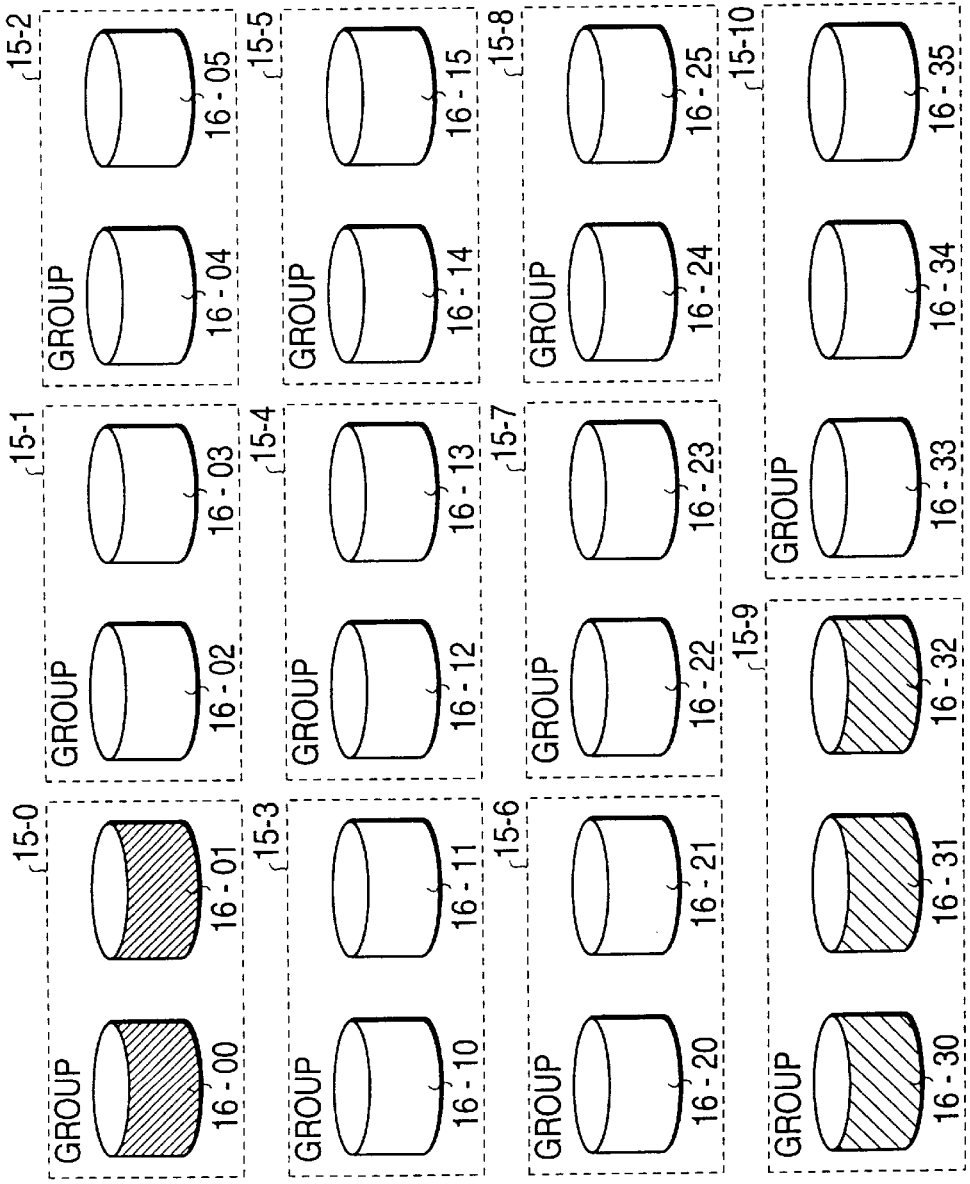
FIG. 5 is an explanatory diagram of a logic group construction in a system of the present invention corresponding to RAID-1.

FIG. 5 is an explanatory diagram of logic groups in the device array unit 12 constructed by the construction control of the device array system 8 corresponding to RAID-1 according to the present invention.

The RAID-1 level includes a mirrored disk construction in which the same data is stored in two devices. In the device array system 8 corresponding to RAID-1 of the present invention, logic groups of duplicated devices and logic groups of triplicated devices are constructed for the 24 devices 16-00 to 16-35 as targets provided for the device array unit 12.

That is, logic groups 15-0 to 15-8 are constructed as duplicating logic groups and logic groups 15-9 and 15-10 are constructed as triplicating logic groups.

That is, each the logic groups 15-0 to 15-8 has two devices (16-00 and 16-01) to (16-24 and 16-25), respectively, which are mirrored devices and in each of which the same data has been stored.

On the other hand, logic group 15-9 has three devices 16-30, 16-31, and 16-32, accordingly forming the triplicated devices in each of which the same data has been stored. Similarity, logic group 15-10 has also the triplicating construction in which the same data has been stored in each of the devices 16-33, 16-34, and 16-35.

When the construction of the logic groups of RAID-1 as mentioned above is generally expressed, the following first logic groups and second logic groups are constructed. The first logic groups 15-0 to 15-8 in each of which the same data has been stored into N devices (where N is an integer of 2 or more), accordingly multiplex the data. The second logic groups 15-9 and 15-10 in each of which the same data has been stored into at least the (N+1) devices, also accordingly multiplex the data. FIG. 5 shows the logic groups of the device array system 8 of the present invention corresponding to RAID-1 of the minimum construction when N=2.

Figure 6:
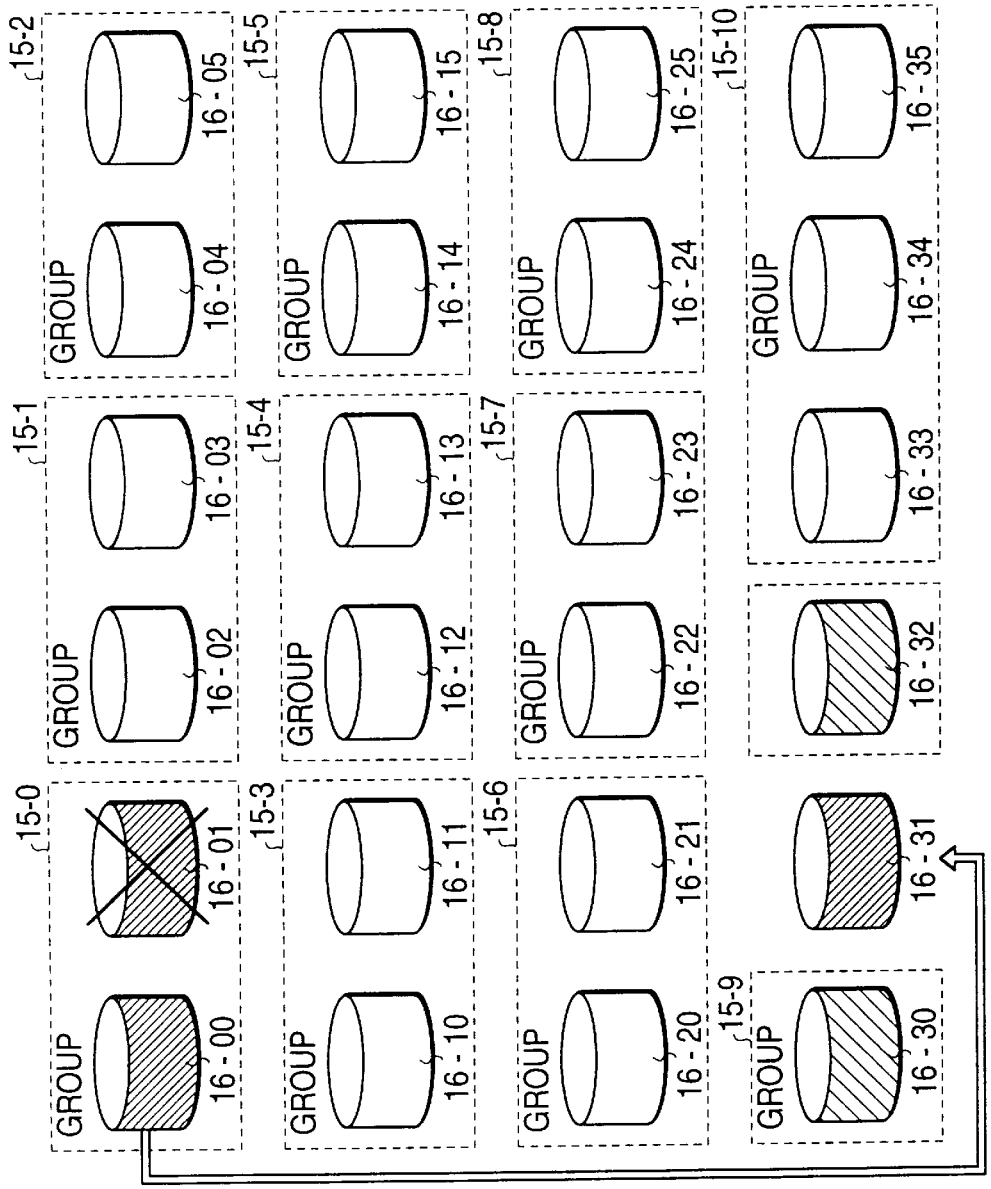
FIG. 6 is an explanatory diagram of a corresponding process when a group device of a low redundancy has failed in the system corresponding to RAID-1 shown in FIG. 5.

FIG. 6 shows a corresponding process when the device 16-01 in the logic group 15-0 of the lower redundancy in the device array system 8 corresponding to RAID-1 of FIG. 5 has failed. When the device 16-01 in the logic group 15-0 of the lower redundancy has failed, a specified device, for example, the device 16-31 in a logic group of a higher redundancy, for instance, the logic group 15-9 shown originally in FIG. 5 is fetched into the logic group 15-0 in which a failure of the device occurred and is used as a failure alternate device, as indicated in FIG. 6.

The same data as that of the failed device 16-01 is recovered into the failure alternate device 16-31 fetched into the group 15-0 in which the device failure occurred. Specifically, the data of the normal device 16-00 is copied to the failure alternate device 16-31. Consequently, the redundancy of the logic group 15-0 in which the device 16-01 had failed is recovered.

On the other hand, although the logic group 15-09 from which the failure alternate device 16-31 has been fetched originally had the triplicating construction as shown in FIG. 5, when the failure alternate device 16-31 is provided as the failure alternate device, the logic group 15-09 effectively has the duplicating construction having the two devices 16-30 and 16-32, as shown in FIG. 6.

Although the redundancy of logic group 15-09 deteriorates, the redundancy itself is not lost.

That is, in the system corresponding to RAID-1 of the present invention, when the failure alternate device is fetched from the logic group of the higher redundancy and is provided for the device failure of the logic group of the lower redundancy, the device is fetched under a condition that the redundancy would not drop below a predetermined threshold by the fetching of the failure alternate device and therefor be lost.

Figure 7:
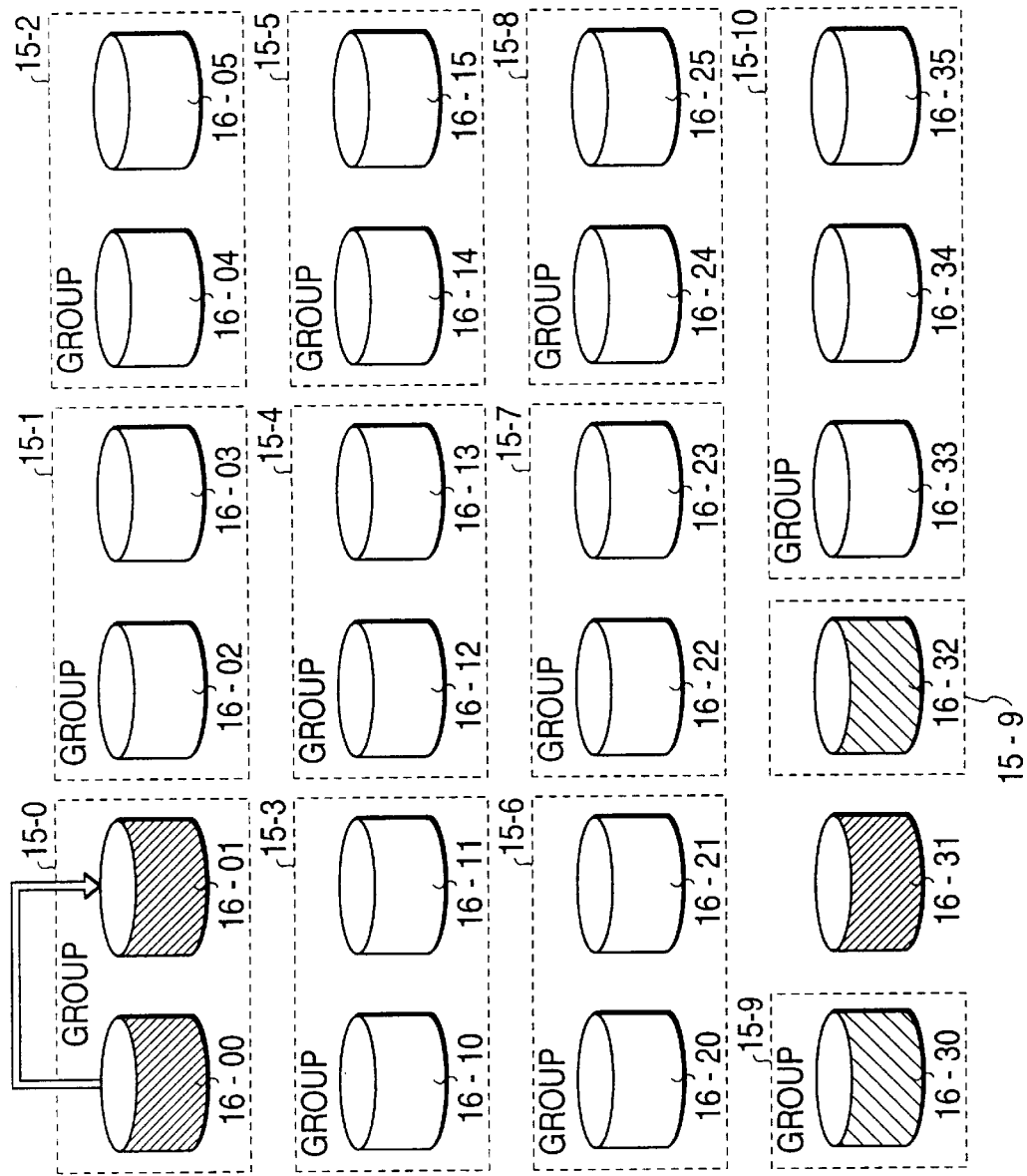
FIG. 7 is an explanatory diagram of a recovery process when a failed device is exchanged in FIG. 6.

FIG. 7 is an explanatory diagram of a recovery process after the device 16-01 failed in the logic group 15-0 in FIG. 6 and is exchanged for a normal device.

When the device 16-01 failed in the logic group 15-0 and is exchanged for a normal device 16-01, the data of the device 16-00, which is functioning normally, is copied to the exchanged device 16-01, accordingly recovering the data to device 16-01. When the data recovery is finished, the failure alternate device 16-31 is disconnected, and the device 16-01 in which the data recovery had been executed is fetched into the group, accordingly reconstructing the logic group 15-0 to the original redundancy of same.

Figure 8:
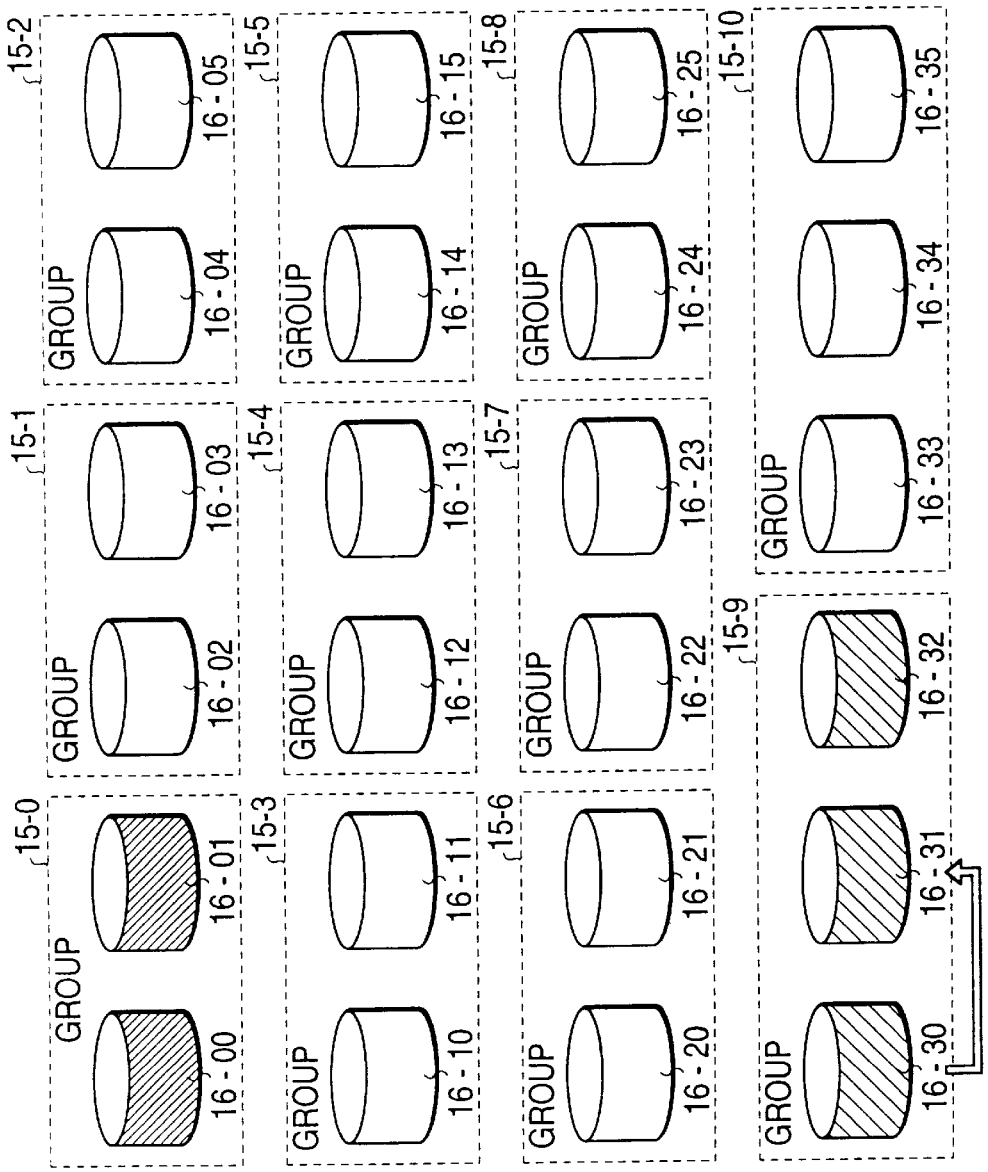
FIG. 8 is an explanatory diagram of a recovery process of a failure alternating device which is executed subsequently to FIG. 7.

Subsequently, the failure alternate device 16-31 disconnected from the logic group 15-01 in FIG. 7 is returned to the original logic group 15-9 as shown in FIG. 8. Then, data of the device 16-30 in the logic group 15-9 is copied to the returned device 16-31 and the data is recovered, accordingly reconstructing the original triplicating logic group 15-9.

Figure 9:
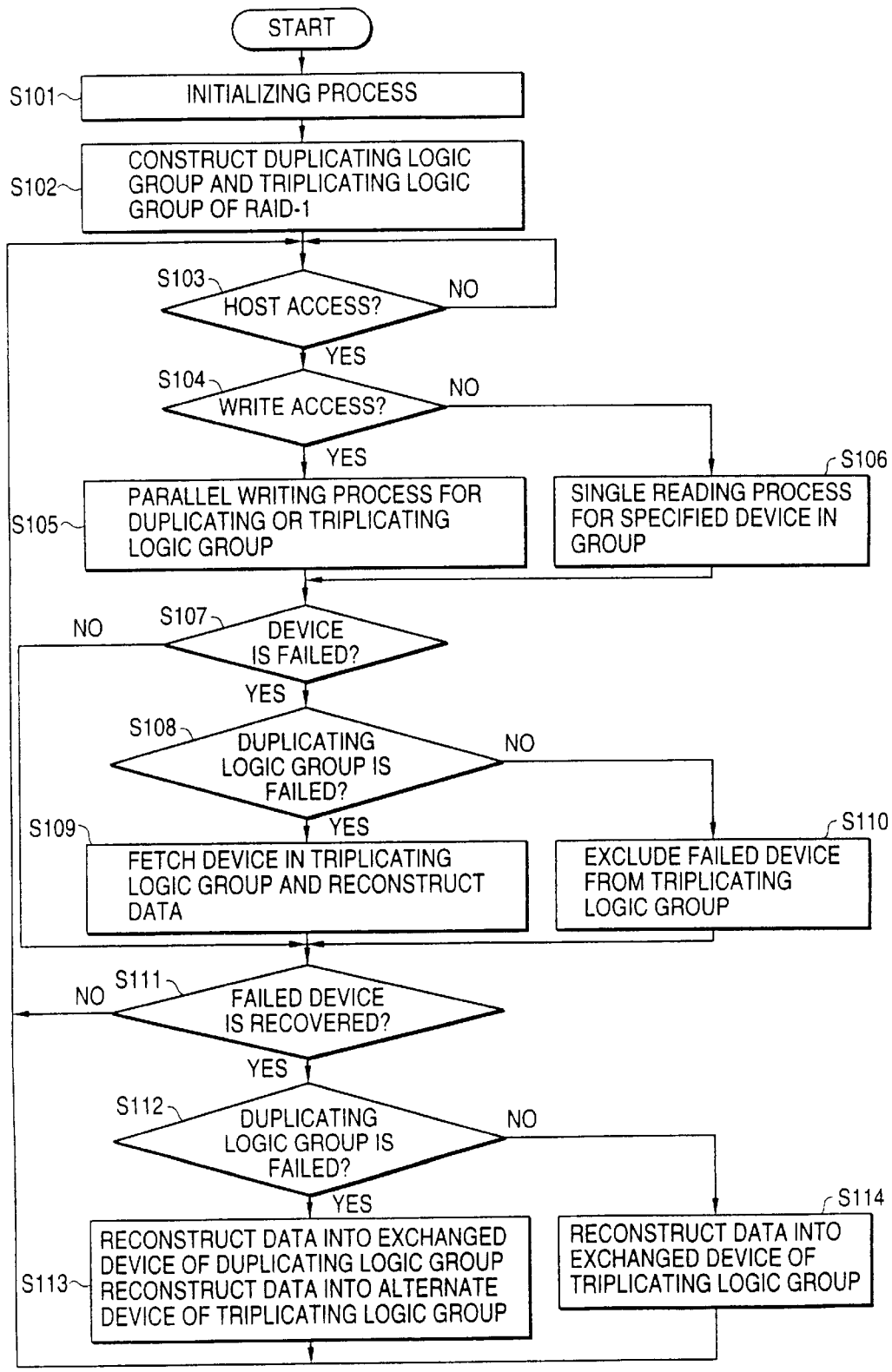
FIG. 9 is a flowchart for the processing operation of the system according to the present invention corresponding to RAID-1.

FIG. 9 is a flowchart showing a processing operation of the device array system 8 corresponding to RAID-1 shown in FIGS. 5 to 8.

As shown in FIG. 9, when a system power source is turned on, an initializing process is first executed in step S101. Subsequently, in step S102, the duplicating logic group and the triplicating logic group of RAID-1 are constructed as shown in FIG. 5. Subsequently, in step S103, the system waits for an access from the host. When there is a host access, a check is made to see whether the host access is a write access or not in step S104.

When the host access is a write access, in step S105, a writing process for writing the write data received from the host in parallel is executed to the duplicating logic group or the triplicating logic group as a target to be accessed. On the other hand, when the host access is a reading process, the processing routine advances to step S106 and the sole reading process of a specified drive in each logic group is executed.

When the drive failure is discriminated during the access in step S107, a check is made to determine whether the drive failure is a device failure in the duplicating logic group having the lower redundancy in step S8. If the drive failure is the device failure in the duplicating logic group, step S109 follows. A drive is fetched from the triplicating logic group of the higher redundancy and the data is recovered by using the fetched drive as a failure alternate drive, accordingly reconstructing the duplicating logic group.

On the other hand, when the drive failure is a device failure in the triplicating logic group of the higher redundancy, the processing routine advances to step S110, the failed drive is disconnected from the triplicating logic group and is excluded, and the group operates as a duplicating logic group.

When the process corresponding to the device failure in step S109 or S110 is finished, a check is made to determine whether the failed drive has been recovered, that is, whether the failed drive has been exchanged for a normal drive or not in step S111. When the failed drive is exchanged, a check is made to see whether the failure has occurred in the duplicating logic group or not in step S112.

When the failure occurs in the duplicating logic group, in step S113, the same data as that of the other, corresponding device in the group is recovered to the exchanged device in the duplicating logic group as shown in FIG. 7. Subsequently, as shown in FIG. 8, the device from the triplicating logic group which had acted as the failure alternate device in replacing the failed device in the duplicating logic group is returned to the original triplicating logic group and the data is recovered thereto accordingly.

When it is determined that the failure occurred in the triplicating logic group in step S112, step S114 follows and the data is recovered in the replaced device in the triplicating logic group, accordingly allowing the redundancy to be recovered.

Figure 10:
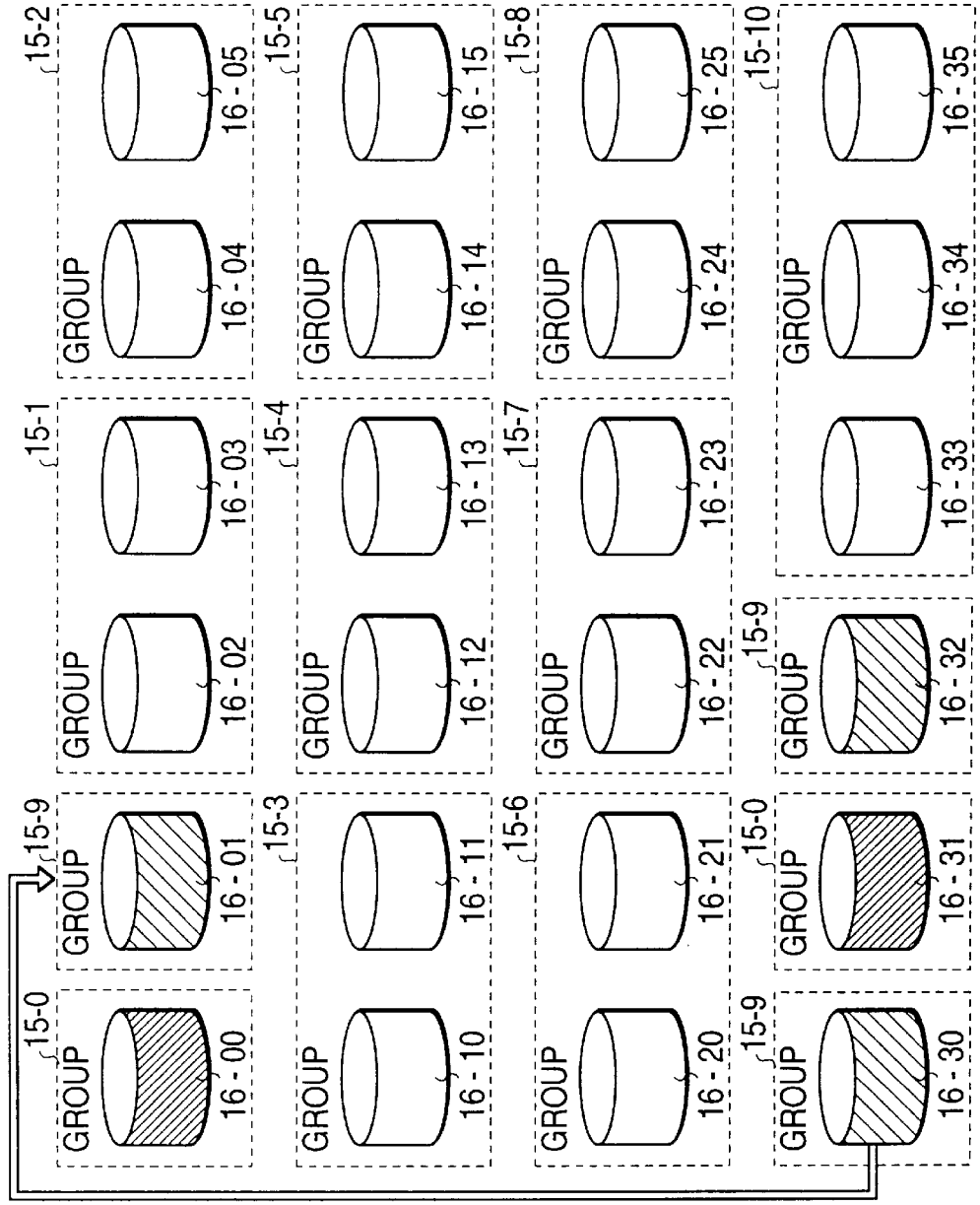
FIG. 10 is an explanatory diagram of another recovery process when the failed device is exchanged in FIG. 6.

FIG. 10 shows another processing form of the recovery process when the failed device in the logic group of the lower redundancy is exchanged for the normal device in the device array system 8 corresponding to RAID-1.

In the failure recovery process shown in FIG. 10, after exchanging the failed device 16-01 for the normal device, the exchanged device 16-01 is not returned to the original logic group 15-0 but is fetched into the logic group 15-9 from which the failure alternate device 16-31 was taken out. Then, the same data as that of the device 16-30 is recovered to the normal device. The logic group 15-9 of the triplicating logic group comprises the three devices 16-30, 16-01, and 16-32.

In the duplicating logic group 15-0, the logic group 15-0 of duplicating construction is continuously maintained by the two devices, the normal device 16-00 and the device 16-31 which was fetched as a failure alternate device.

In the recovery process after the device exchange shown in FIG. 10, two operations of the data reconstruction for returning the exchanged device to the original logic group and the data reconstruction for returning the failure alternate device to the original logic group were necessary as shown in FIGS. 7 and 8. Alternatively, it is sufficient to reconstruct only the data to the exchanged device (the device for which the failed device was exchanged), so that the reconstructing process after exchanging the failed device can be executed in a shorter time.

Figure 11:
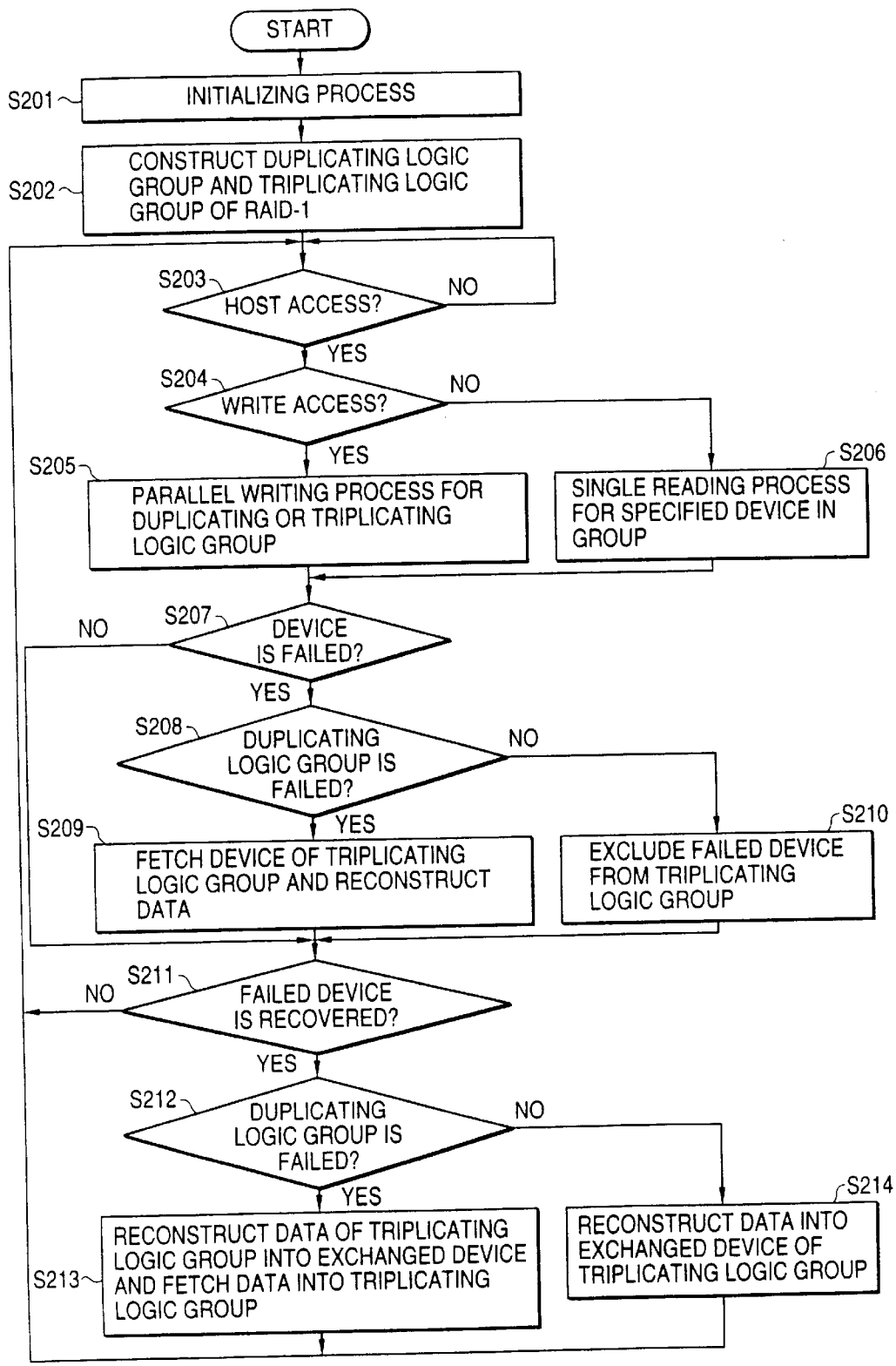
FIG. 11 is a flowchart for the processing operation of the system of the present invention corresponding to RAID-1.

FIG. 11 is a flowchart for the processing operation of the device array system 8 implementing RAID-1 and corresponding to the failure recovery process of FIG. 10. Steps S201 to S212 and S214 in the flowchart are the same as steps S101 to S112 and S114, respectively, in FIG. 9 and the failure recovery process in step S213 is different.

That is, in step S213 in FIG. 11, when the failed device 16-01 in the logic group 15-0 of the lower redundancy in FIG. 10 is exchanged for a normal device, the failure alternate device 16-31 remains part of the duplicating logic group 15-0 in place of device 16-01 even after the exchange, and the data of the device 16-30 in the logic group 15-9 (which currently has a duplicating construction with devices 16-30 and 16-32 because device 16-31 has become a member of logic group 15-0) is copied into exchanged device 16-01, accordingly reconstructing the data. The exchanged device 16-01 is fetched into the logic group 15-9, accordingly reconstructing the original triplicating logic group 15-9.

Figure 12:
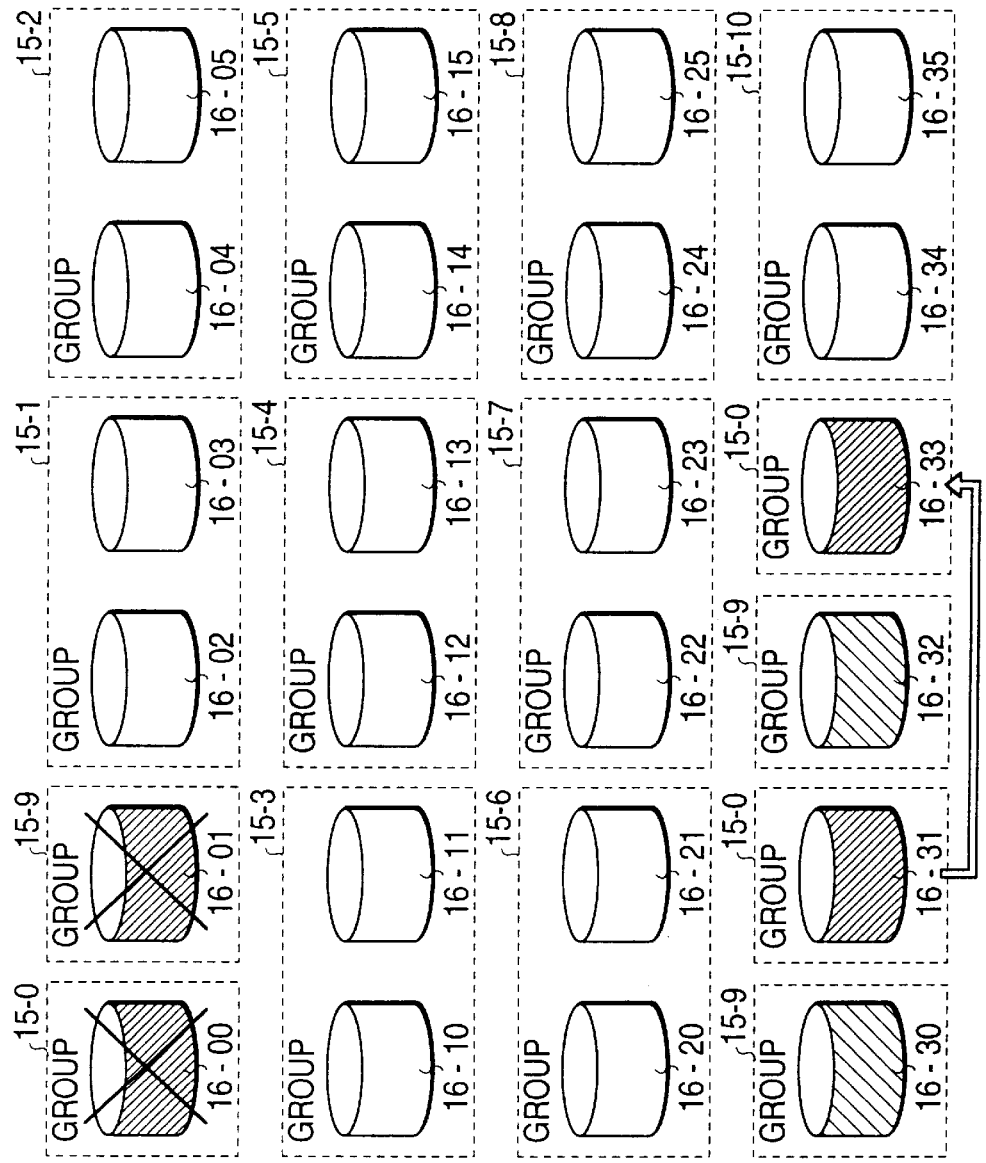
FIG. 12 is an explanatory diagram of a corresponding process when a plurality of devices are sequentially failed in the system corresponding to RAID-1.

FIG. 12 shows a corresponding process when two devices 16-01 and 16-00 in the duplicating logic group 15-0 of the lower redundancy sequentially fail in the device array system 8 corresponding to RAID-1, as shown in FIG. 5.

For example, if device 16-01 in the duplicating logic group 15-0 fails first, then device 16-31 in the triplicating logic group 15-9 is fetched, the data is reconstructed as described above, and the duplicating construction of logic group 15-0 is recovered.

Next, if device 16-00 in the same logic group 15-0 subsequently fails before the failed device 16-01 is exchanged for a normal device, then device 16-33 in another triplicating logic group 15-10 is fetched, the data stored on the device 16-31 which executed the failure alternative at the time of the first device failure (device 16-01) is copied to the device 16-33 and the data is reconstructed, accordingly recovering the redundancy of the duplicating construction. The duplicating logic group 15-0 is therefore constructed, at this time, by the two devices 16-31 and 16-33, which were used in the logic groups 15-9 and 15-10, respectively, as a failure alternative.

For such device failures in the logic group of lower redundancy as described above, if logic groups having a higher redundancy than that of the number (N) of devices provided for the logic group of the lower redundancy exist in the device array system 8 of the present invention, the devices are fetched from the logic groups having a higher redundancy than that of the number (N) and used as failure alternate devices for the sequential failure of all of the devices of the logic group of the lower redundancy. Accordingly, the redundancy of the lower redundancy logic groups is maintained, without reducing the redundancy of the logic groups having the higher redundancy below that of the logic groups having the lower redundancy. Therefore, system redundancy in the device array system 8 of the present invention is maintained at least to the number (N).

Figure 13:
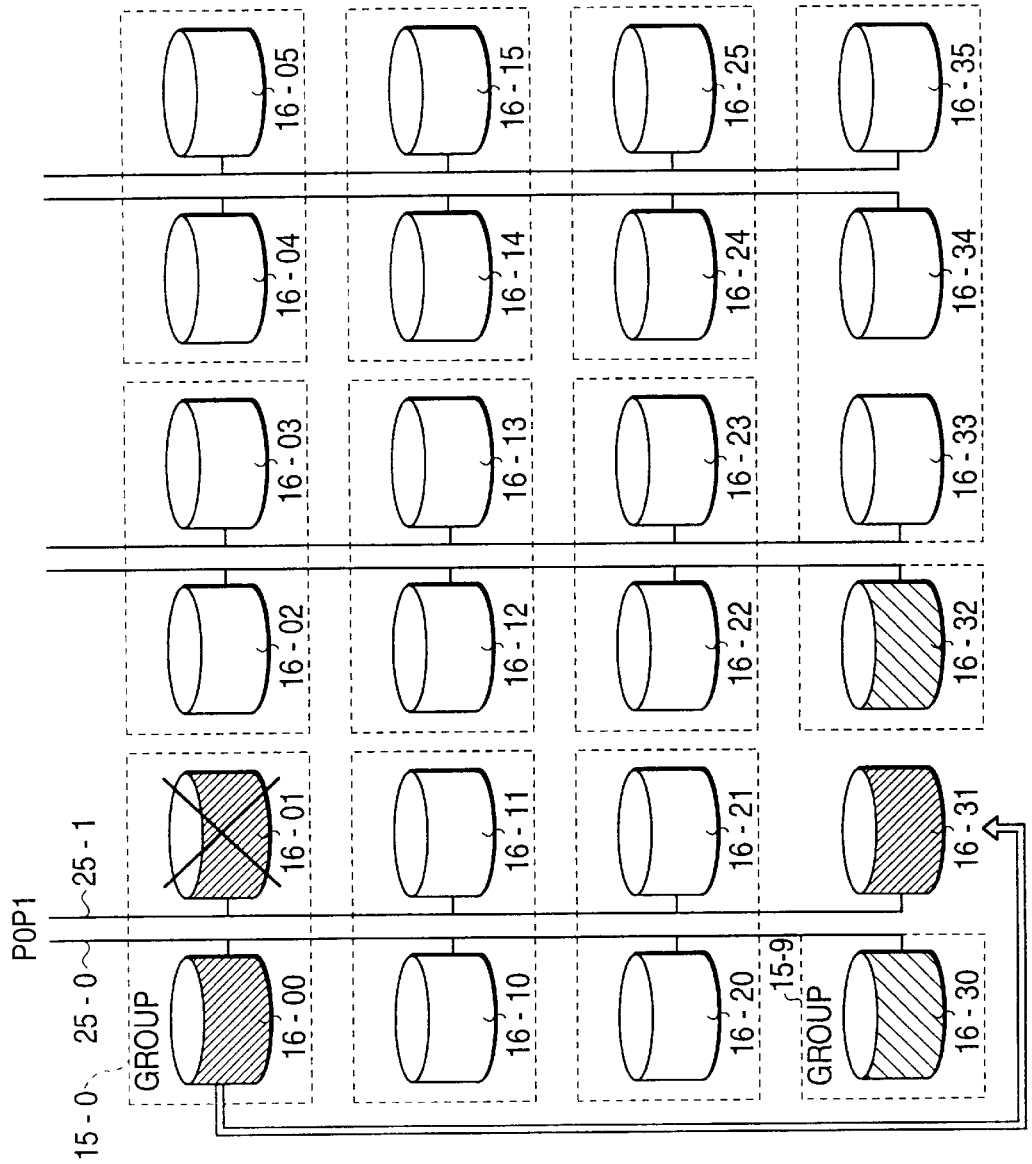
FIG. 13 is an explanatory diagram of a port selection when a failure alternating device is fetched in the system corresponding to RAID-1.

FIG. 13 is an explanatory diagram of a port selection in the disk array system 8 of the present invention corresponding to RAID-1 when the failure alternate device is fetched from the logic group of the higher redundancy during the device failure in the logic group of the lower redundancy. For example, when the device 16-01 in the duplicating logic group 15-0 of the lower redundancy has failed, any one of the devices 16-30, 16-31, and 16-32 provided for the higher redundancy, triplicating logic group 15-9 is fetched as a failure alternate device to the logic group 15-0.

In this case, the failed device 16-01 in the logic group 15-0 is connected to the device path 25-1 of the port P1. When the device 16-30 in the logic group 15-9 is fetched as a failure alternate device and the data is reconstructed, the devices 16-00 and 16-30 in the logic group 15-0 after completion of the correspondence to the failure are connected to the same device path 25-0 from the port P0.

When the devices 16-00 and 16-30 of the same logic group 15-0 are connected to the device path 25-0 of the same port P0, the two write accesses are necessary when writing the same data to the devices 16-00 and 16-30, so that accessing performance deteriorates. For the failure of the device 16-01 in the logic group 15-0, therefore, the device 16-31 in the logic group 15-9 of the higher redundancy connected to the device path 25-1 of the same port P1 is preferably fetched as the failed device 16-01, accordingly allowing parallel accesses to the fetched failure alternate device 16-31 to be performed together with the original device 16-00 by independent ports P0 and P1.

Figure 14:
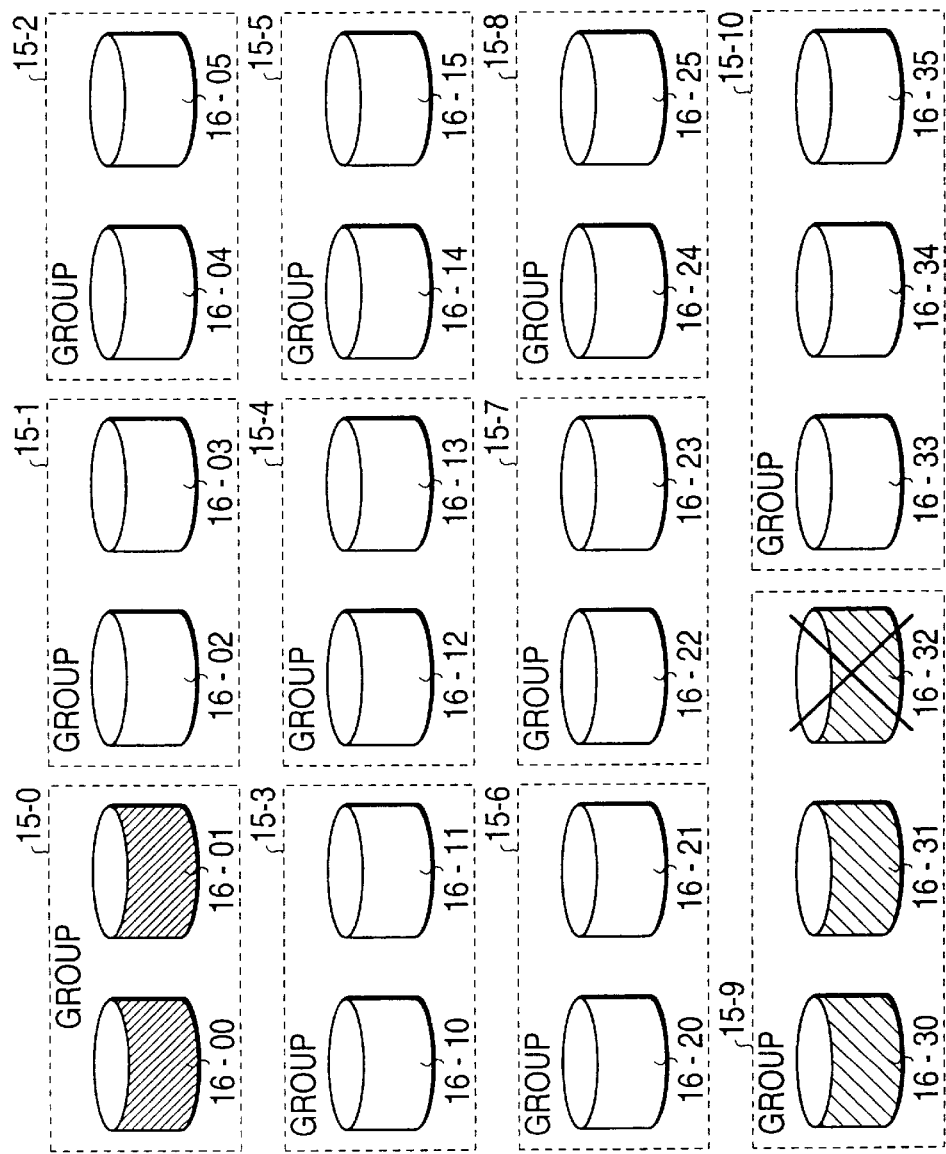
FIG. 14 is a corresponding explanatory diagram when a group device of a high redundancy has failed in the system corresponding to RAID-1.

FIG. 14 shows a corresponding process when the device 16-32 in the triplicated logic group 15-9 of the higher redundancy has failed in the device array system 8 corresponding to RAID-1 of the present invention. If device 16-32 in the logic group 15-9 of the higher redundancy fails, the redundancy of logic group 15-9 deteriorates but is not lost because both devices 16-30 and 16-31 are redundant devices of failed device 16-32, and, accordingly, devices 16-30 and 16-31 continue to operate in a duplicating construction in logic group 15-9. The recovery of the redundancy by fetching a device from another logic group is not consequently executed and the operation of the logic group 15-9 is continued in a state in which the redundancy of the duplicated construction by the devices 16-30 and 16-31 is reduced.

When the failed device 16-32 is exchanged for a normal device, the data of another device in the group, for example, the device 16-30 is copied to the exchanged device, and the data is reconstructed, accordingly recovering the original redundancy of logic group 15-9 of the triplicating construction.

Figure 15:
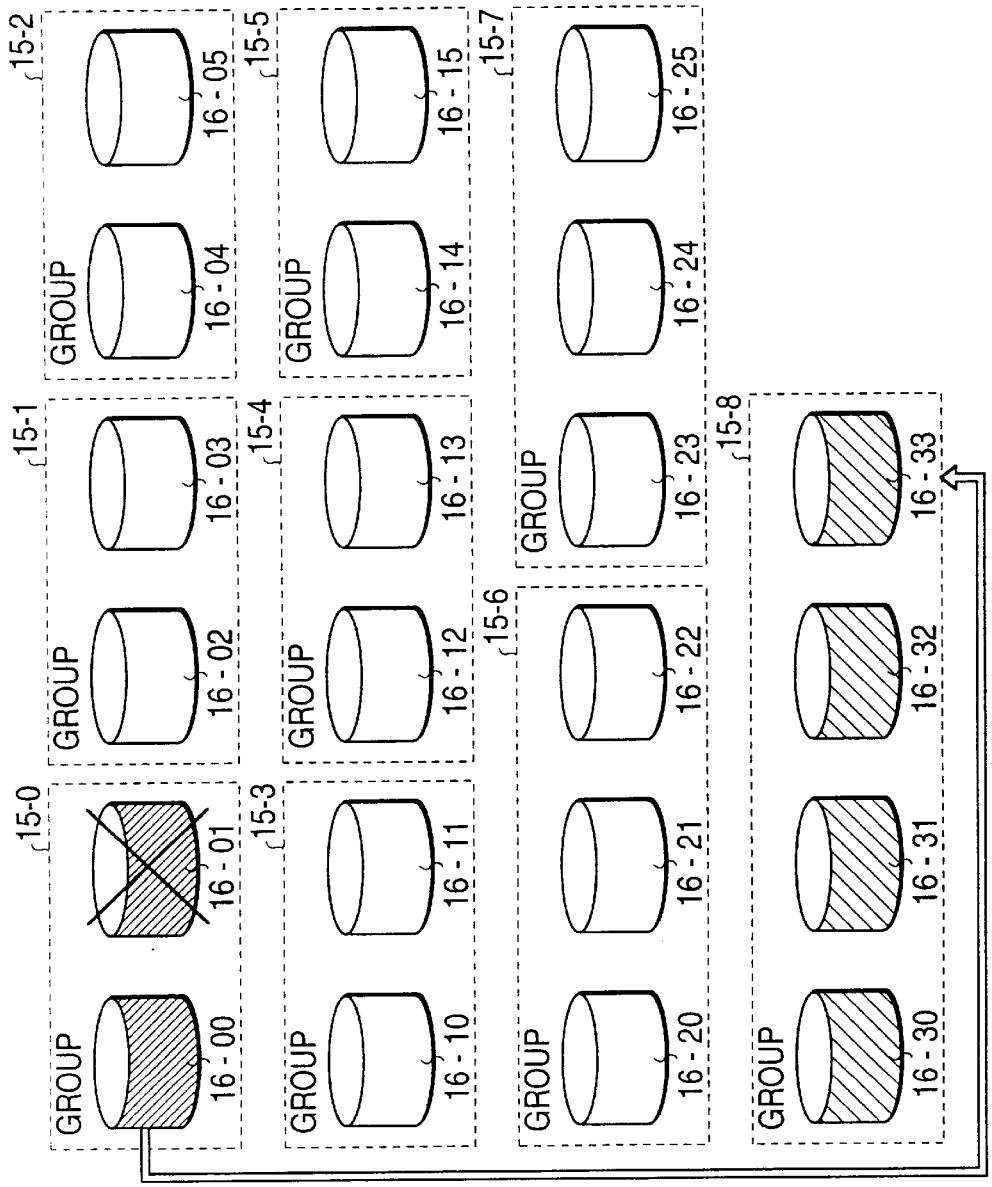
FIG. 15 is an explanatory diagram of a corresponding failure process of a system corresponding to RAID-1 in which a redundancy is hierarchically set.

FIG. 15 shows another embodiment of the device array system 8 corresponding to RAID-1 according to the present invention. In the embodiment shown in FIG. 15, redundancies of a plurality of logic groups are hierarchically raised.

With respect to the logic groups 15-0 to 15-5, the logic groups of the duplicating construction are constructed in a manner similar to FIG. 5. With respect to the logic groups 15-6 and 15-7, however, logic groups of a triplicating construction are constructed. With respect to the logic group 15-8, further, a logic group of a quadruplicating construction is constructed.

Therefore, when it is assumed that the multiplexing number which determines the redundancy of each of the logic groups 15-0 to 15-5 is equal to (N), the number of devices of each of the logic groups 15-6 and 15-7 of a next higher redundancy is set to (N+1), and the number of devices of the logic group 15-8 of a further higher redundancy is set to (N+2).

In case of the construction of the logic groups in which the numbers of multiplexed devices are hierarchically constructed to N, (N+1), and (N+2) as mentioned above, for example, when the device 16-01 in the logic group 15-0 of the lowest redundancy has failed, a specific device in the quadruplicated logic group 15-8 of the highest redundancy among the logic groups of the highest redundancies, for example, the device 16-33, is fetched and the data is reconstructed by using the fetched device as a failure alternate device, accordingly recovering the redundancy of the logic group 15-0.

One device from each of the triplicating logic groups 15-6 and 15-7 of the higher redundancy can be provided as a failure alternate device when a device fails in any one of logic groups 15-0 to 15-5 having a lower redundancy, without losing redundancy in the triplicating group providing the failure alternate device. Accordingly, in the triplicating groups 15-6 and 15-7 of the higher redundancy, one device for a failure stage by which the redundancy is not lost can be provided for the device failure in any one of the logic groups 15-0 to 15-5 of the lower redundancy. Further, the logic group 15-8 of the highest redundancy can provide up to two devices by which the redundancy is not lost.

Figure 16:
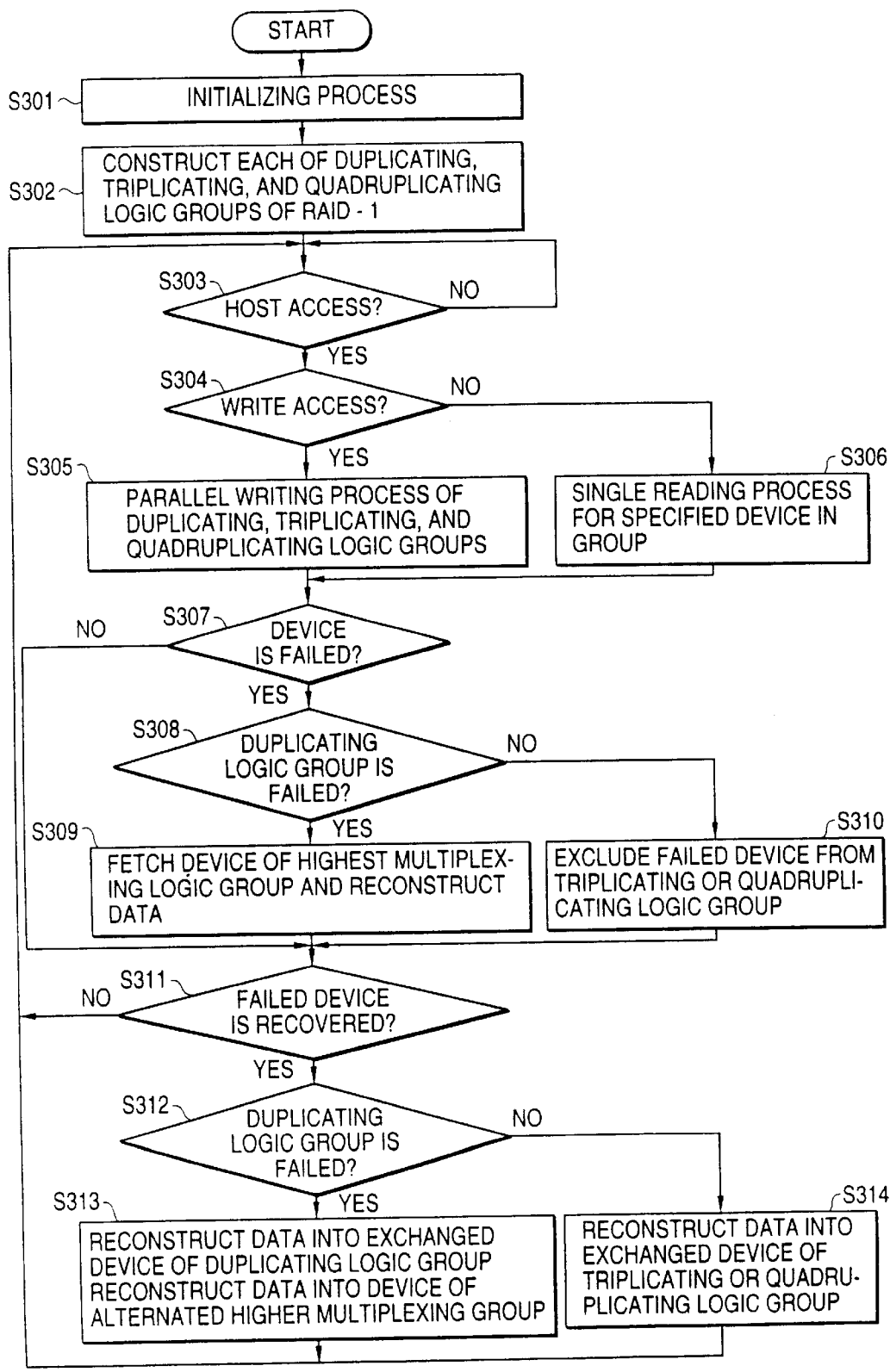
FIG. 16 is a flowchart for the processing operation of the system corresponding to RAID-1 in FIG. 15.

FIG. 16 is a flowchart for the processing operation when the logic groups of the hierarchical redundancies in FIG. 15 are constructed. In FIG. 16, after an initializing process in step S301 is performed, in step S302, duplicating, triplicating, and quadruplicating logic groups of RAID-1 are constructed as shown in FIG. 15. When a write access is determined in step S304 in response to an access from the host in step S303, the processing routine advances to step S305 and parallel writing processes to the devices included in the group are executed in correspondence with each of the duplicating, triplicating, and quadruplicating logic groups.

On the other hand, with respect to a read access, a single reading process to a specified device in each group is executed in step S306. When the device failure is determined in step S307 during the access, if the device failure is determined to be in the duplicating logic group in step S308, step S309 follows. A multiplexing logic group having the highest redundancy, specifically a drive in the logic group of the quadruplicating construction, is fetched and the data is reconstructed as explained above, accordingly recovering the redundancy.

On the other hand, if a device failure occurs in a logic group other than the logic group of the duplicating construction, that is, the device failure in the logic group of the triplicating or quadruplicating construction occurs, the redundancy is not lost by the device failure. Therefore, the recovery of the redundancy by fetching a device from the other logic group is not executed, but only an excluding process disconnecting the failed device from the group is performed, as explained above.

After the corresponding failure process in step S309 or S310 finishes, when the recovery process of the failed drive such that the failed drive is exchanged for the normal drive is determined in step S311, the processing routine advances to step S312.

In case of the device failure in the logic group of the duplicating construction in step S312, the data is reconstructed into the exchanged device in the logic group of the duplicating construction and the original duplicating logic group is constructed in step S313. The same data as that of the other device in the original group is reconstructed into the device in which the failure alternative was performed, accordingly reconstructing the original logic group of the higher redundancy.

On the other hand, when the device failure occurs in the triplicating or quadruplicating logic group and the failed device is exchanged, the data of the other device in the group is reconstructed into the exchanged device in step S314, accordingly reconstructing the logic group having the original redundancy.

Figure 17:
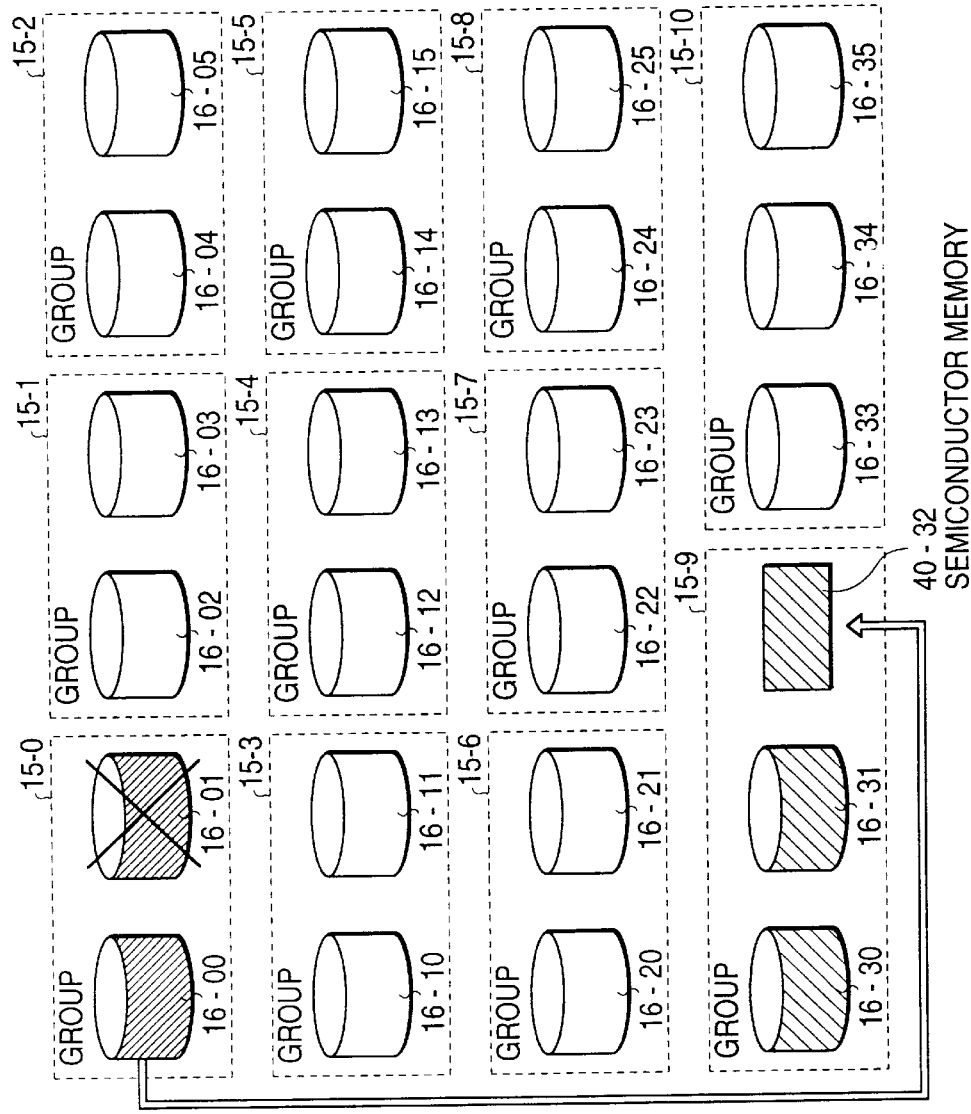
FIG. 17 is an explanatory diagram of an system corresponding to RAID-1 in which a semiconductor memory is provided for a group device of a high redundancy.

FIG. 17 shows another embodiment of the device array system 8 corresponding to RAID-1. In the embodiment shown in FIG. 17, a semiconductor memory having a high accessing speed is partially provided as a device of the device array unit 12.

In FIG. 17, all of the logic groups 15-0 to 15-8 of a lower redundancy are hard disk drives. In the logic group 15-9 of a higher redundancy, however, although the devices 16-30 and 16-31 are hard disk drives, a semiconductor memory 40-32 is used as another device. The devices 16-33 to 16-35 of the logic group 15-10 of a higher redundancy are hard disk drives.

In the case where the semiconductor memory 40-32 is provided for the logic group 15-9 of a higher redundancy, for example, if the device 16-01 of the logic group 15-0 of a lower redundancy has failed, the semiconductor memory 40-32 having a high accessing performance in the logic group 15-9 of a higher redundancy is fetched as a failure alternate device and the data is reconstructed, accordingly recovering the redundancy.

By using the semiconductor device 40-32 as a failure alternate device for the device failure, the data can be recovered in a short time at the time of the failure alternative and the redundancy of the logic group in which the device failure occurred can be recovered at a high speed. With respect to the failure recovery process when the failed device 16-01 is exchanged for a normal device, the semiconductor memory 40-32 in which the failure alternative was performed is returned to the original logic group 15-9, so that the process to recover the data can be executed at a high speed.

3. Device array system 8 corresponding to RAID-2

Figure 18:
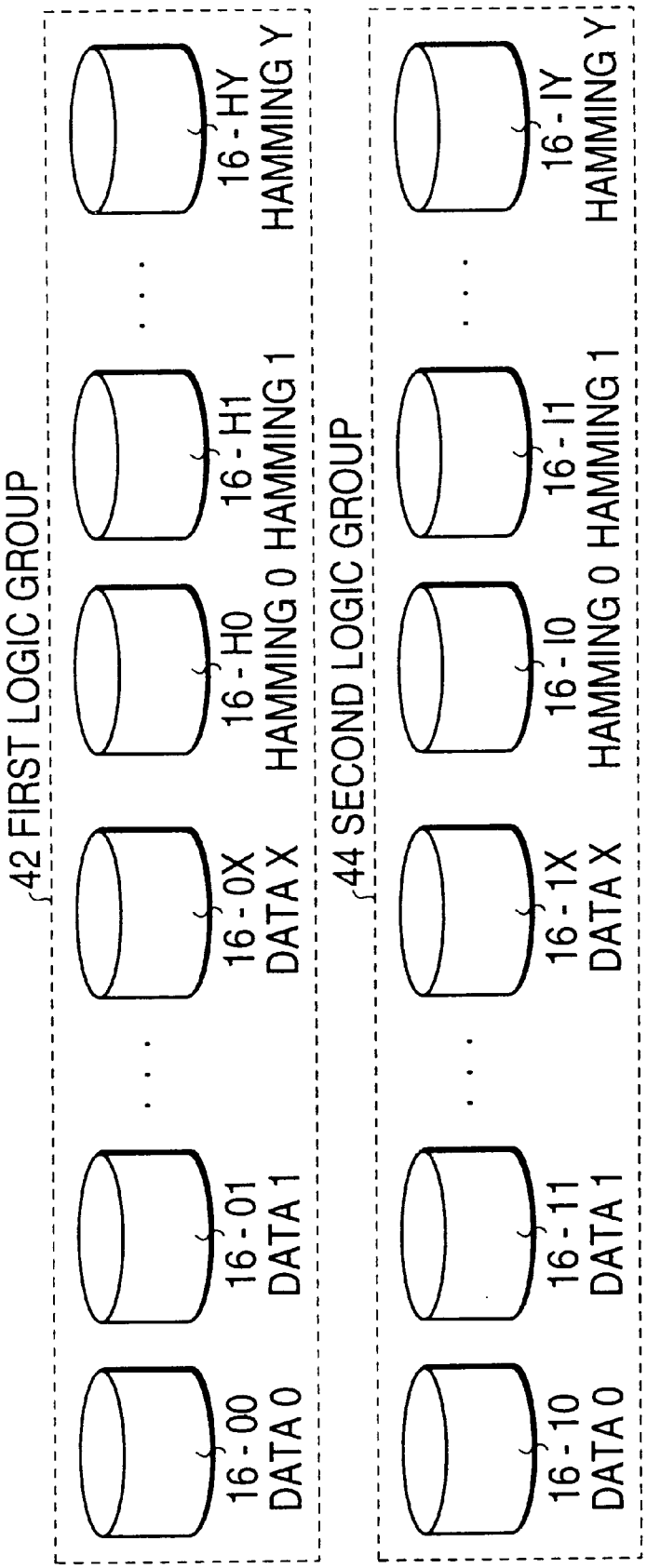
FIG. 18 is an explanatory diagram of a logic group construction in a system of the present invention corresponding to RAID-2.

FIG. 18 is an explanatory diagram of logic groups for the device array unit 12 constructed by a construction control of an RAID-2 corresponding device array system 8 of the present invention.

In FIG. 18, a first logic group 42 and a second logic group 44 corresponding to RAID-2 are constructed. The first logic group 42 corresponding to RAID-2 is constructed by data devices 16-00, 16-01, . . . , and 16-0X, and Hamming code devices 16-H0, 16-H1, . . . , and 16-HY. In data devices 16-00, 16-01, . . . , and 16-0X, data 0, 1, . . . , and X divided into a predetermined data length, for example, a sector unit, have been stored. In Hamming code 16-H0, 16-H1, . . . , and 16-HY, Hamming codes 0, 1, and Y have been stored as error correction codes of the data 0 to X.

For example, the first logic group 42 of RAID-2 is constructed by four data devices 16-0 to 16-03 and three Hamming code devices 16-H0 to 16-H2. In a manner similar to the first logic group 42, the second logic group 44 is also constructed by data devices 16-10 to 16-1X, in which the data 0 to X have been stored, and Hamming code devices 16-I0 to 16-IY, in which the Hamming codes 0 to Y for error detection and correction have been stored.

Figure 19:
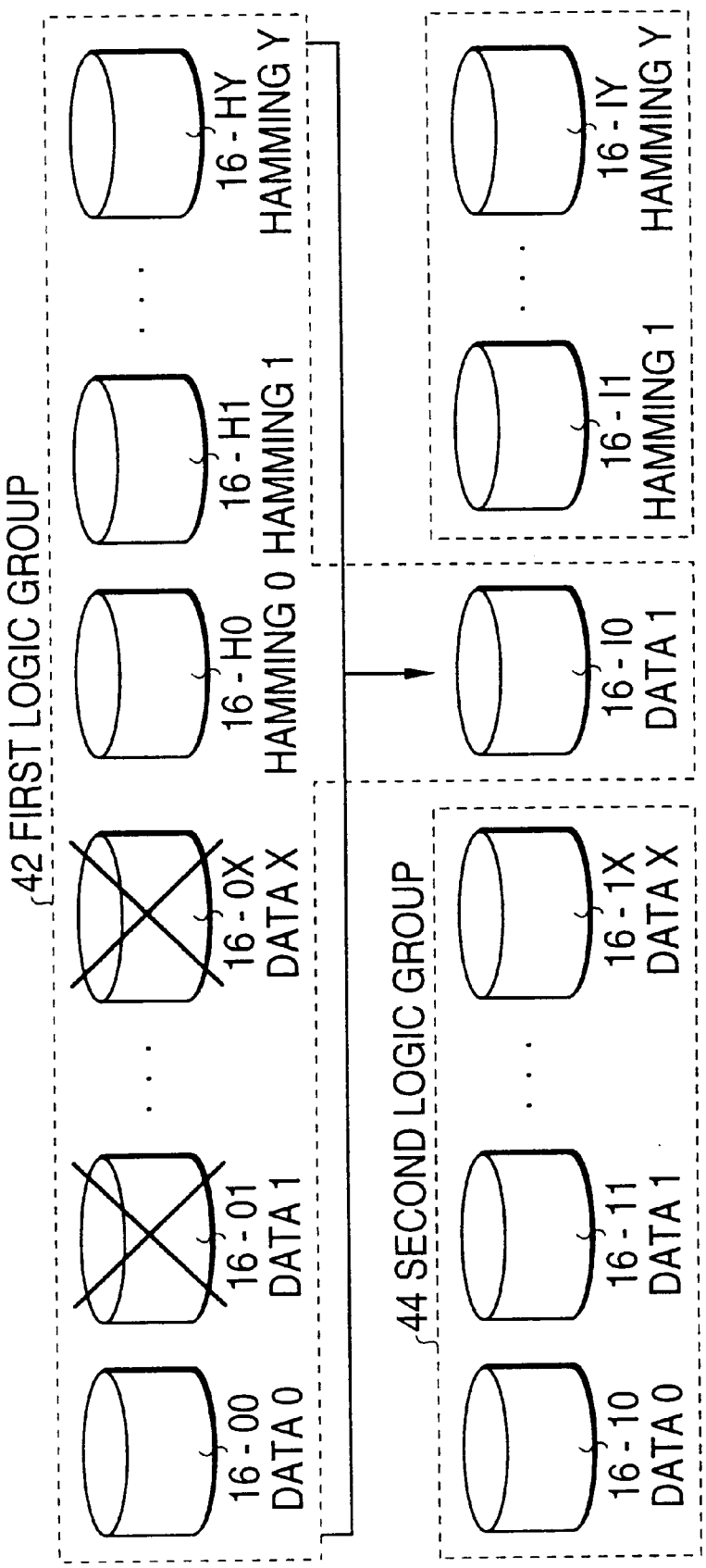
FIG. 19 is an explanatory diagram of a corresponding failure process in the system corresponding to RAID-2 in FIG. 18.

With respect to the first logic group 42 and second logic group 44 of such a RAID-2 corresponding device array system 8 as shown in FIG. 18, if device failures occur in the data device 16-01 and the data device 16-0X in the first logic group 42 as shown in FIG. 19, the data of the failed devices can be recovered by using the Hamming codes 0 to Y of the Hamming code devices 16-H0 to 16-HY. However, the redundancy deteriorates.

In order to recover at least part of the redundancy of the first logic group 42 which was deteriorated due to the device failures, any one of the devices provided for the normal second logic group 44 is fetched into the first logic group 42 in which the device failures occurred, accordingly reconstructing the data of the failed device.

As shown in FIG. 19, the Hamming code device 16-I0 in the second logic group 44 is fetched into the first logic group 42 whose redundancy was deteriorated by the failure of the data devices 16-01 and 16-0X, and, for example, the data 1 of the failed data device 16-01 is reconstructed, and the redundancy of the first logic group 42 is recovered to the level of redundancy accorded by the failure of only the data device 16-0X.

When the failure alternate device is fetched from the second logic group 44 to the first logic group 42 in which the device failure occurred, the failure alternate device is provided as an alternate to the failed device under the prerequisite condition that by the disconnection of the device, the redundancy of the second logic group 44 is not. lower than the redundancy of the first logic group 42 which serves as a fetching destination and in which the device failure occurred.

Figure 20:
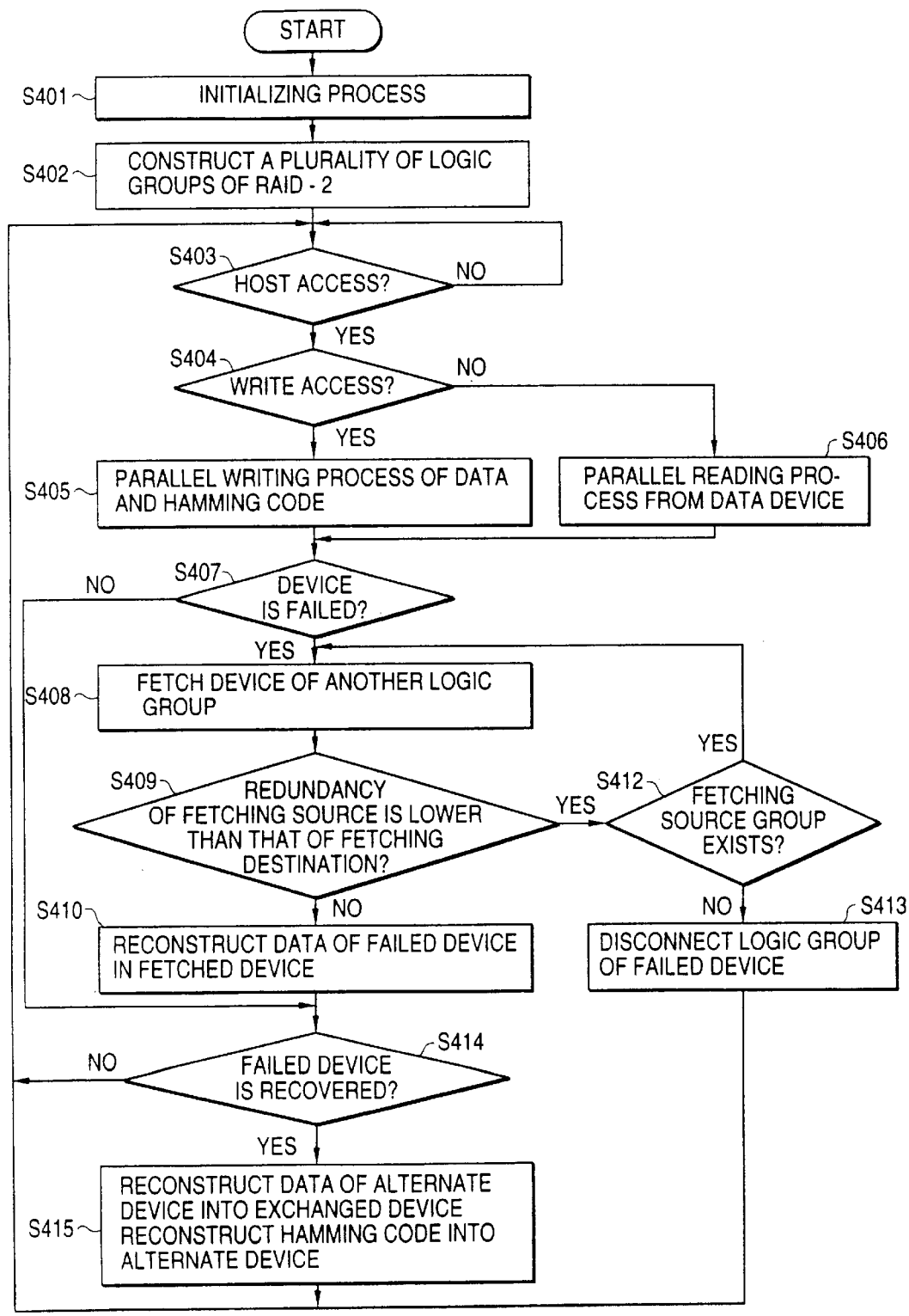
FIG. 20 is a flowchart for the processing operation of the system of the present invention corresponding to RAID-2.

FIG. 20 is a flowchart for the processing operation of the RAID-2 corresponding device array system 8 shown in FIGS. 18 and 19. As shown in FIG. 20, first, at the time of set-up in response to the power-on of the device array system 8, an initializing process is executed in step S401. Subsequently in step S402, a plurality of logic groups of RAID-2 as shown in FIG. 18 are constructed. In step S403, the host access is discriminated.

When there is a write access as determined in step S404, step S405 follows. Data divided into the data devices of the designated logic group and the Hamming codes of the divided data are formed, and parallel writing processes are executed to the device included in the logic group.

On the other hand, in case of the read access, step S406 follows and parallel reading processes are executed from the data drives of the designated logic group. When the data of the specific device has been lost by the reading process, by calling the corresponding Hamming code of the Hamming device, the lost data of the device can be reconstructed.

In step S407, the device failure during the access is checked. When there is a device failure, step S408 follows and the device of the other logic group is fetched. In this instance, a check is made in step S409 to determine whether the redundancy of the logic group on the fetching source side is lower than the redundancy on the fetching destination side in which the device failure occurred. If NO, step S410 follows and the data of the failed drive is reconstructed into the fetched device, accordingly recovering the redundancy of the logic group in which the drive failure occurred.

On the other hand, in step S409, when the redundancy of the logic group serving as a device fetching source would be deteriorated more than the redundancy on the fetching destination side in which the device failure occurred due to the device fetching, the device cannot be fetched. Therefore, step S412 follows and the presence or absence of the logic group of another fetching destination is discriminated. If there is a logic group of another fetching destination, the processing is returned to step S408 and the device is fetched. If there is no logic group of the device fetching destination, the failed device is disconnected from the logic group in step S413 and the redundancy is not recovered.

In step S410, the recovery process of the redundancy of the logic group in which the device failure occurred finishes, using the fetched device. Then, after the completion of the recovery of the failed device by exchanging the failed device for a normal device is determined in step S414, in step S415 the data of the failed medium device is reconstructed into the normal exchanged device obtained due to the correction or the like, accordingly reconstructing the redundancy of the logic group in which the device failure occurred to the original redundancy. Subsequently, the same data or Hamming code as that upon assembling of the original logic group is reconstructed in the failure alternate device, accordingly recovering the redundancy of the failed device fetching source into that of the initial state.

4. Device Array System 8 Corresponding to RAID-3 or RAID-4

Figure 21:
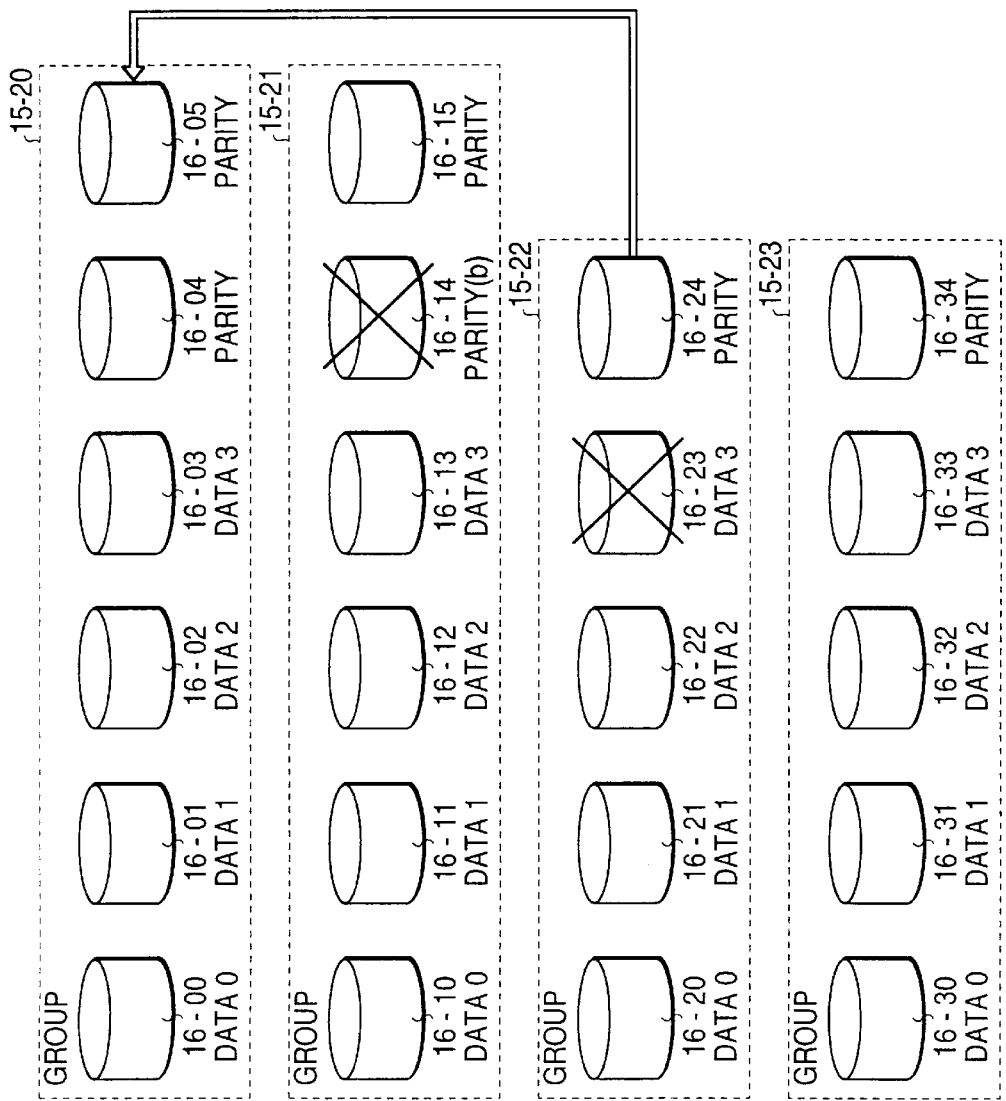
FIG. 21 is an explanatory diagram of a logic group construction by multiplexing of a parity device and a corresponding failure process in a system in the present invention corresponding to RAID-3 or RAID-4.

FIG. 21 is an explanatory diagram of a logic group constructed by a device array system 8 of the present invention corresponding to RAID-3 or RAID-4. In FIG. 21, even in either RAID-3 or RAID-4, a fundamental logic group is constructed by a data device in which a plurality of data has been stored and one parity device in which a parity obtained from the data of each data device has been stored. With respect to the logic group of RAID-3 or RAID-4 as mentioned above, according to the present invention, two parity disks are provided for a partial logic group in a plurality of logic groups, the same parity is stored, and the parity is duplicated, accordingly raising the redundancy.

In the logic groups of FIG. 21, the parity duplication is executed with respect to two logic groups 15-20 and 15-21. For example, in the logic group 15-20, the data 0 to 3 are respectively stored into four data devices 16-00 to 16-03, and the parity obtained from the data 0 to 3 is stored in the parity device 16-04. Further, the parity device 16-05 is provided, and the same parity is stored in parity device 16-05 as is stored in parity device 16-04, accordingly duplicating the parity. With respect to the logic group 15-21 as well, four data devices 16-10 to 16-13 and two duplicated parity devices 16-14 and 16-15 are provided, and respectively store data and parity.

On the other hand, with regard to the logic groups 15-22 and 15-23, the logic group of ordinary RAID-3 or RAID-4 is constructed by four data devices 16-20 to 16-23 and 16-30 to 16-33, respectively, and the parity devices 16-24 and 16-34, respectively.

As mentioned above, in the RAID-3 or RAID-4 corresponding device array system 8, the logic group of a higher redundancy and a logic group of a lower redundancy of only the parity are constructed by parity multiplication. Then, for example and as shown in FIG. 21, when the data device 16-23 of the logic group 15-22 of a lower redundancy has failed, one parity device 16-05 of the logic group 15-20 of a higher redundancy due to the parity duplication explained above is fetched as a failure alternate device into the logic group 15-22 in which the device failure occurred, accordingly reconstructing the data of the failed device 16-23.

Figures 22A, 22B:
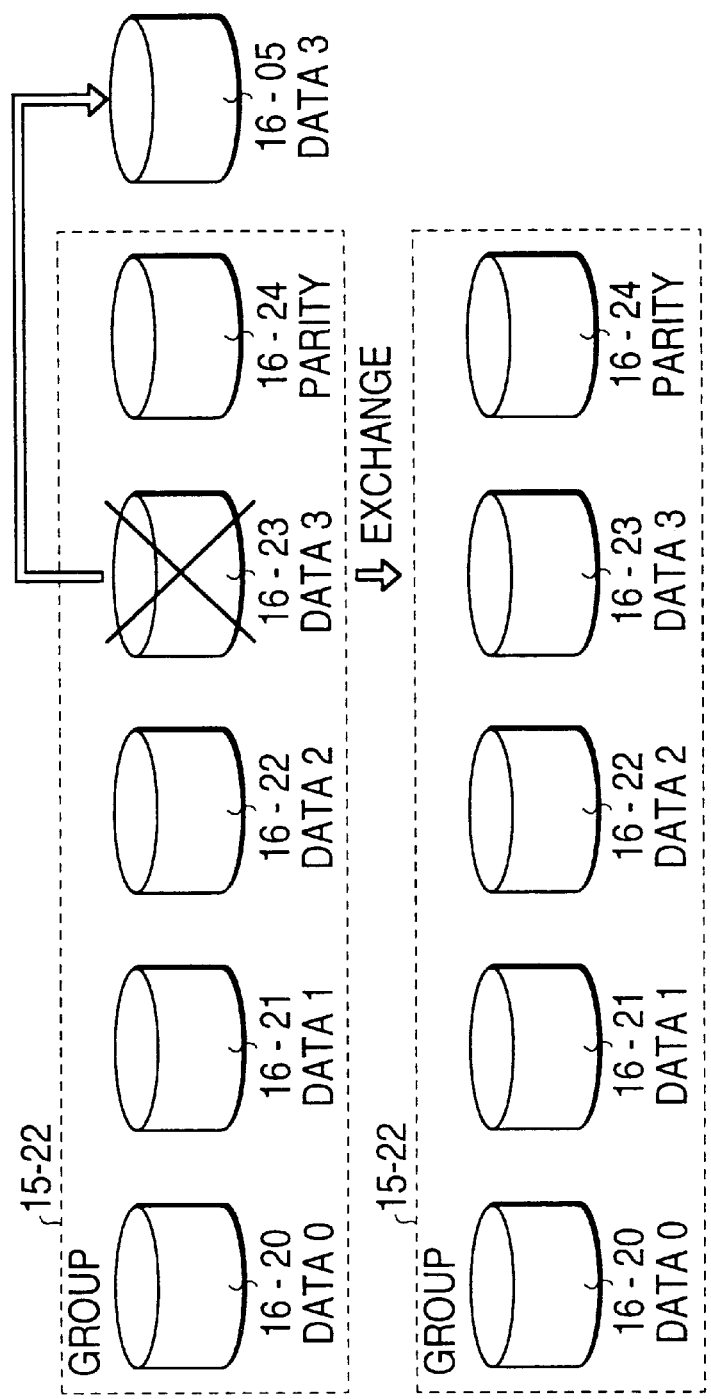
FIGS. 22(A) and 22(B) are explanatory diagrams of a recovery process when a failed device in FIG. 21 is exchanged.

FIGS. 22(A) and 22(B) show a failure recovery process in the case in which the failed device 16-23 of the logic group 15-22 in FIG. 21 is exchanged for a normal device. FIG. 22(A) shows a state in which the data 3 of the failed device 16-23 of the logic group 15-22 is reconstructed in the failure alternate device and the redundancy is recovered. In the case of FIG. 22(A), the parity device 16-05, of the logic group 15-20 in which the parity duplication is performed as shown in FIG. 21, is fetched as a failure alternate device.

In this state, when the failed device 16-23 is exchanged for the normal device, as shown in FIG. 22(B), the same data 3 as that of the failure alternate device 16-05 is reconstructed in the normal data device 16-23 after the exchange. When the original data 3 is reconstructed in the exchanged data device 16-23, the original data 3 is reconstructed from the data 0 to 2 and the parity stored, respectively, in the data devices 16-20 to 16-22 and parity device 16-24 of the logic group 15-22. Alternatively, original data 3 is reconstructed by copying the data of the failure alternate device 16-05 fetched from another logic group as shown in FIG. 22(A).

After completion of the recovery of the redundancy of the logic group 15-22 by the reconstruction of the data for the exchanged device 16-23 of the failure alternate device as shown in FIG. 22(B), the failure alternate device 16-05 is returned to the original logic group 15-20 shown in FIG. 21, and the data in the parity device 16-05 is reconstructed by copying the data in the parity device 16-04, accordingly recovering the redundancy of the parity duplication of the logic group 15-20.

Figure 23:
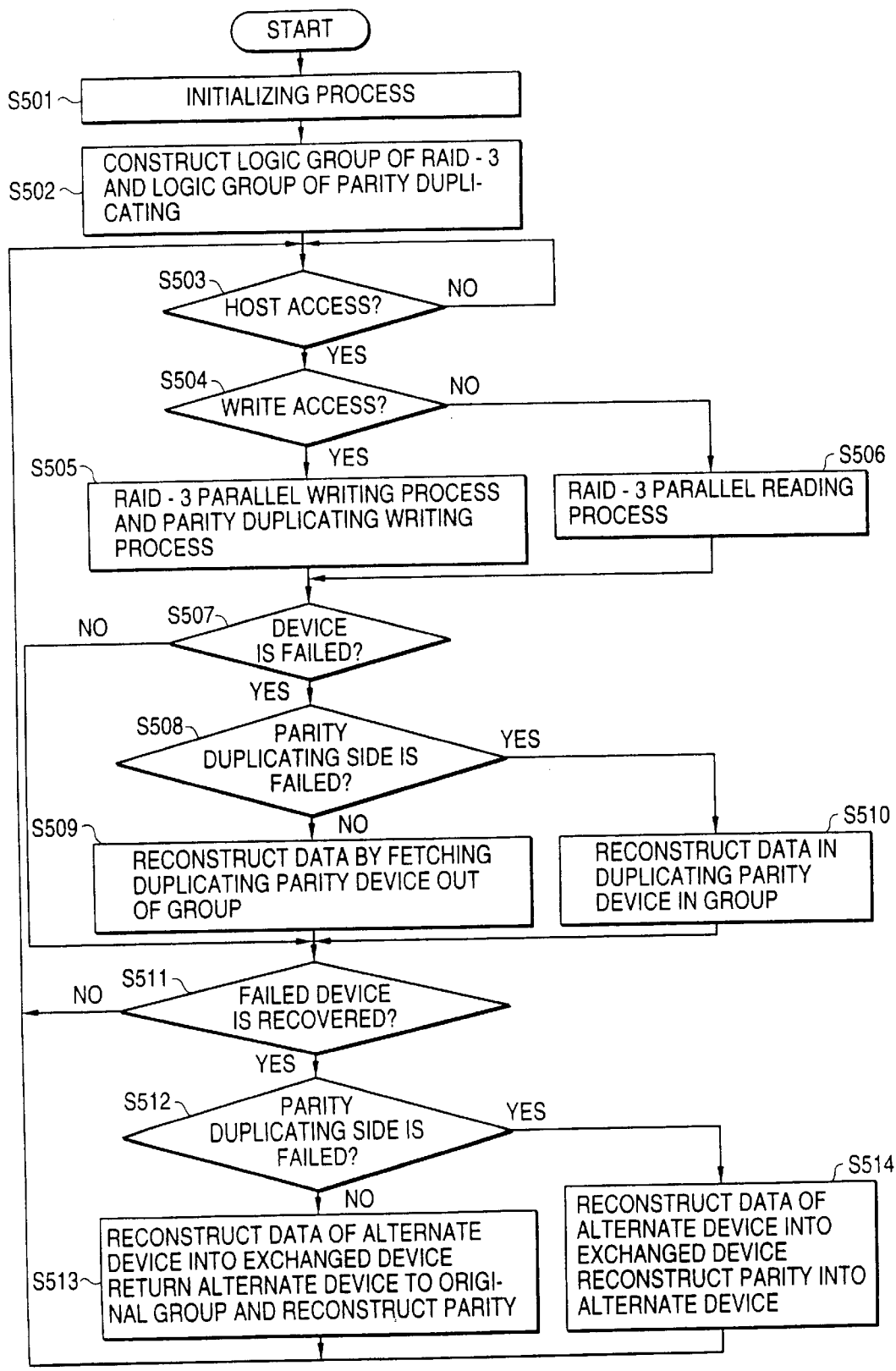
FIG. 23 is a flowchart for the processing operation of the system corresponding to FIGS. 21 and 22(A) and 22(B) in the system of the present invention corresponding to RAID-3 or RAID-4.

FIG. 23 is a flowchart for the processing operation of the RAID-3 corresponding device array system 8 in FIGS. 21 and 22(A) and 22(B). When the device array system 8 is activated by turning on the power source, first in step S501, an initializing process is executed. In step S502, a logic group of RAID-3 and a logic group in which the parity duplication was performed are constructed as shown in FIG. 21. In step S503, when a host access is received, step S504 follows.

When the host access is a write access, step S505 follows, and host data is divided into, for example, sectors for every data device and, further, parity is formed from the divided sector data. In this instance, in the case in which the logic group on the accessing destination side is the logic group 15-20 or 15-21 in FIG. 21, parallel writing processes of the sector data for four data devices and the same parity data for two parity disks are executed.

In case of a read access, step S506 follows and parallel reading processes of the data devices of the designated logic group are executed. When the device failure is discriminated in step S507 during the access of the logic group, a check is made to determine whether the device failure in the logic group on the parity duplicated side has occurred in step S508.

When the device failure of the logic group on the parity duplicated side has not occurred, then the device failure has occurred on the side of the logic group 15-22 or 15-23 of RAID-3 in FIG. 21, and step S509 follows.

In step S509, a logic group of a higher redundancy having a duplicating parity device in the group, for example, one of the two parity devices of the logic group 15-20 shown in FIG. 21, is fetched as a failure alternate device and the data lost by the device failure is reconstructed as explained above, accordingly recovering the redundancy.

On the other hand, in the case of a device failure of the logic group on the parity duplicating side, step S510 follows. When the failed device is the data device, the data of the failed device is reconstructed in one of the duplicated parity devices, as explained above.

When the failed device is one of the duplicated parity disks, since the redundancy is not lost by the parity, the failed parity device is disconnected and no particular failure alternative process is executed.

After the end of the corresponding process for the device failure in step S509 or S510, if the recovery by exchanging the failed device for the normal device is discriminated in step S511, a check is made in step S512 to determine whether the device failure has occurred on the parity duplicating side.

If the device failure has not occurred on the parity duplicating side (the logic group having duplicate parity disks), for example, if the device failure has occurred on in logic group 15-22 as shown in FIG. 22(A), which does not duplicate the parity disks, then the failed device is exchanged for the a normal device, and step S513 follows. In step S513, the data of the failure alternate device is reconstructed in the exchanged device and the failure alternate device is subsequently returned to the original logic group, accordingly reconstructing the redundancy by the duplicating parity disk.

On the other hand, if the device failure had occurred on the parity duplicating side, step S514 follows and the data of the failure alternate device (which, in step S510, is one of the duplicate parity disks) is reconstructed in the exchanged device. Subsequently, the parity is reconstructed in the one of the duplicate parity disks used as the failure alternate device by copying the parity from the other of the duplicate parity disks, accordingly recovering the redundancy by the parity-duplication.

Figures 24A, 24B:
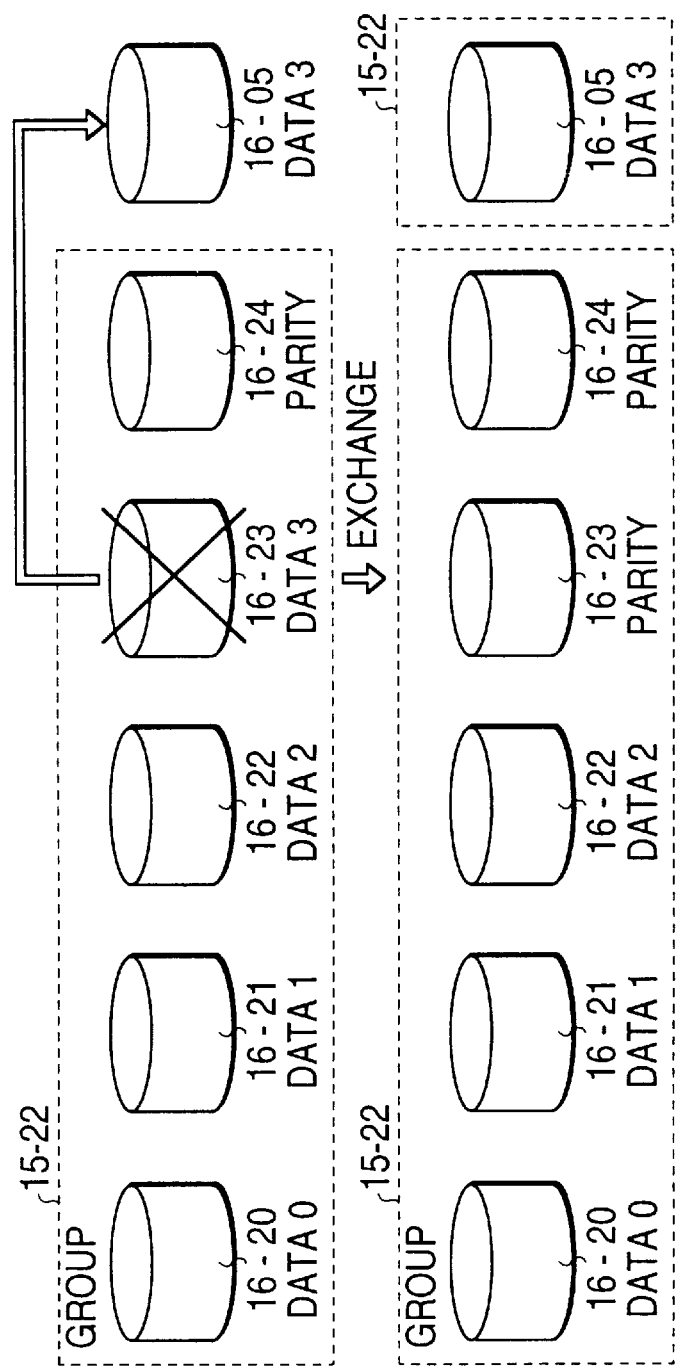
FIG. 24(A) and 24(B) are explanatory diagrams of another recovery process when the failed device in FIG. 21 is exchanged.

FIGS. 24(A) and 24(B) show another embodiment of a failure recovery process in the device array system 8 of the present invention corresponding to RAID-3.

In the embodiment shown in FIGS. 24(A) and 24(B), a failure alternate device is exchanged for a normal device after a redundancy was recovered. The redundancy was recovered in the embodiment shown in FIGS. 24(A) and 24(B) by fetching the failure alternate device from the parity duplicating side in response to a device failure in a logic group in which a low redundancy of parity duplication is not performed.

FIG. 24(A) shows a state in which in response to a failure of the data device 16-23 of the same logic group 15-22 as that in FIG. 22(A), one parity device 16-05 from the logic group 15-20 in which the parity was duplicated in FIG. 21 is fetched as a failure alternate device and the data 3 (previously stored in device 16-23 before failure thereof) is reconstructed in the failure alternate device 16-05.

After that, when the failed device 16-23 is exchanged for a normal device, as shown in FIG. 24(B), the same parity as that of the parity device 16-24 of the logic group 15-22 is reconstructed in the exchanged device 16-23.

The failure alternate device 16-05 fetched from the other logic group due to the failure of the device 16-23 is left in the logic group 15-22 storing data 3. Thus, when the failed device is exchanged, the logic group 15-22 in which the device failure occurred is reconstructed as a logic group having the parity duplication in which the parity data has been stored in two parity devices 16-23 and 16-24.

Therefore, in another embodiment of the present invention, a logic group having a failed device and which did not include parity duplication before the device failed is reconstructed as a logic group having parity duplication after every device failure by the exchange of the failed device for a normal device, as explained above with reference to FIGS. 24(A) and 24(B), accordingly enabling the one of the duplicate parity devices to be available as a device failure alternative to be performed for another logic group in which parity duplication is not executed.

Figure 25:
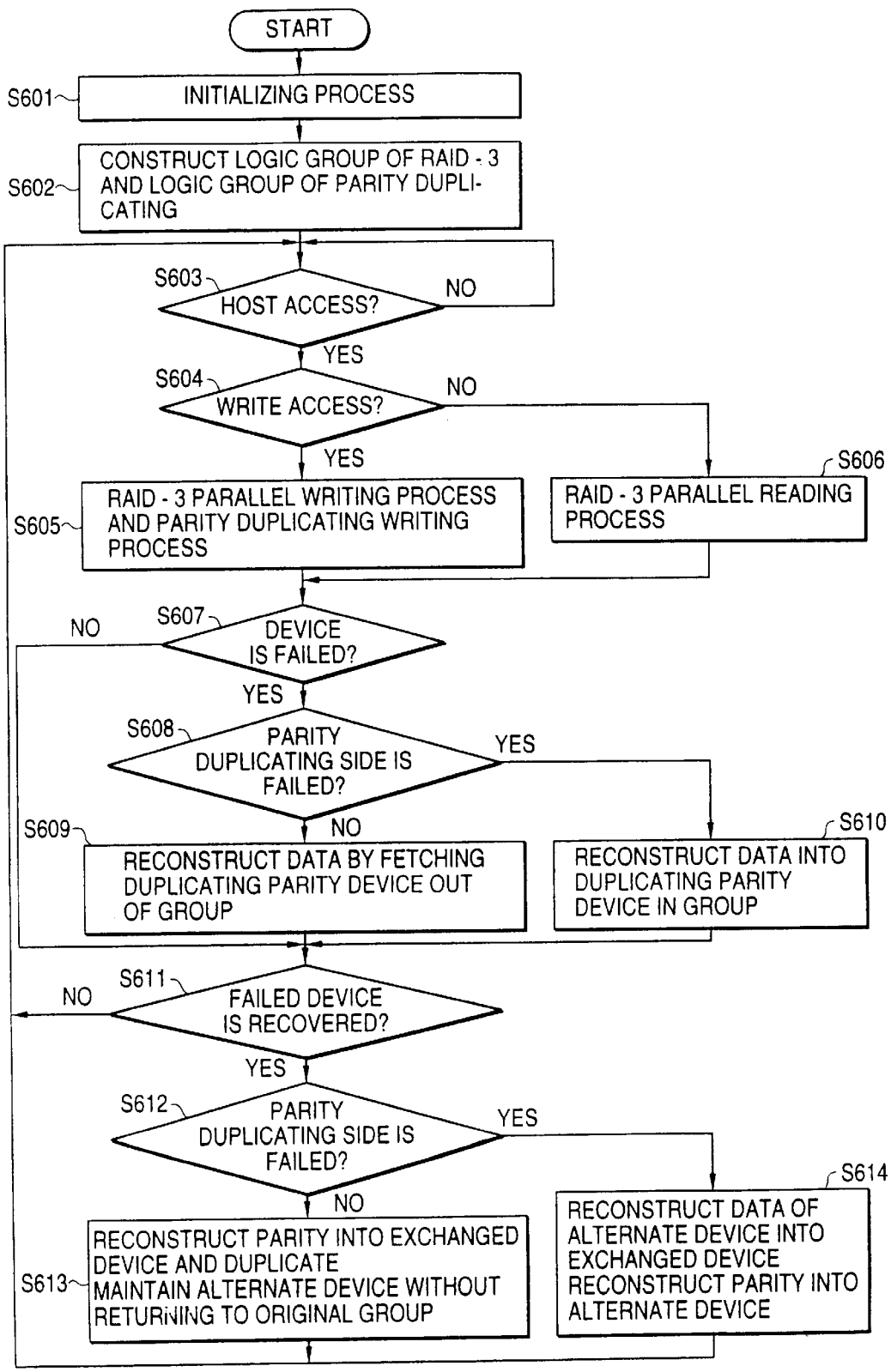
FIG. 25 is a flowchart for the processing operation of the corresponding to FIGS. 24(A) and 24(B) of the system of the present invention corresponding to RAID-3 or RAID-4.

FIG. 25 is a flowchart for the processing operation of the embodiment of the present invention shown in FIGS. 24(A) and 24(B). In the flowchart of FIG. 25, steps S601 to S612 and step S614 are the same as steps S501 to S512 and step S514, respectively, in FIG. 23. However, for the failure recovery process in step S613 in FIG. 25 differs from step S513 in FIG. 23. Therefore, the explanations of steps S601 to S612 and step S614 are not repeated herein.

As shown in step S613 in FIG. 25, after completion of the corresponding failure recovery process for the device failure in the logic group 15-22 in which the parity duplication is not performed as shown and explained with reference to FIGS. 24(A) and 24(B), the failed device 16-23 is exchanged for a normal device. In addition, and also in step S613 of FIG. 25, the parity of the logic group 15-22 is reconstructed in the exchanged device, and parity duplication is performed as explained above with reference to FIGS. 24(A) and 24(B). Further in step S613, the failure alternate device fetched from the other logic group (the logic group having duplicating parity before providing the failure alternate device) is not returned to the original group in which the failure alternate group was functioning (the other logic group), but is maintained as is, storing recovered data in the logic group 5-22 as shown in FIGS. 24(A) and 24(B).

Figure 26:
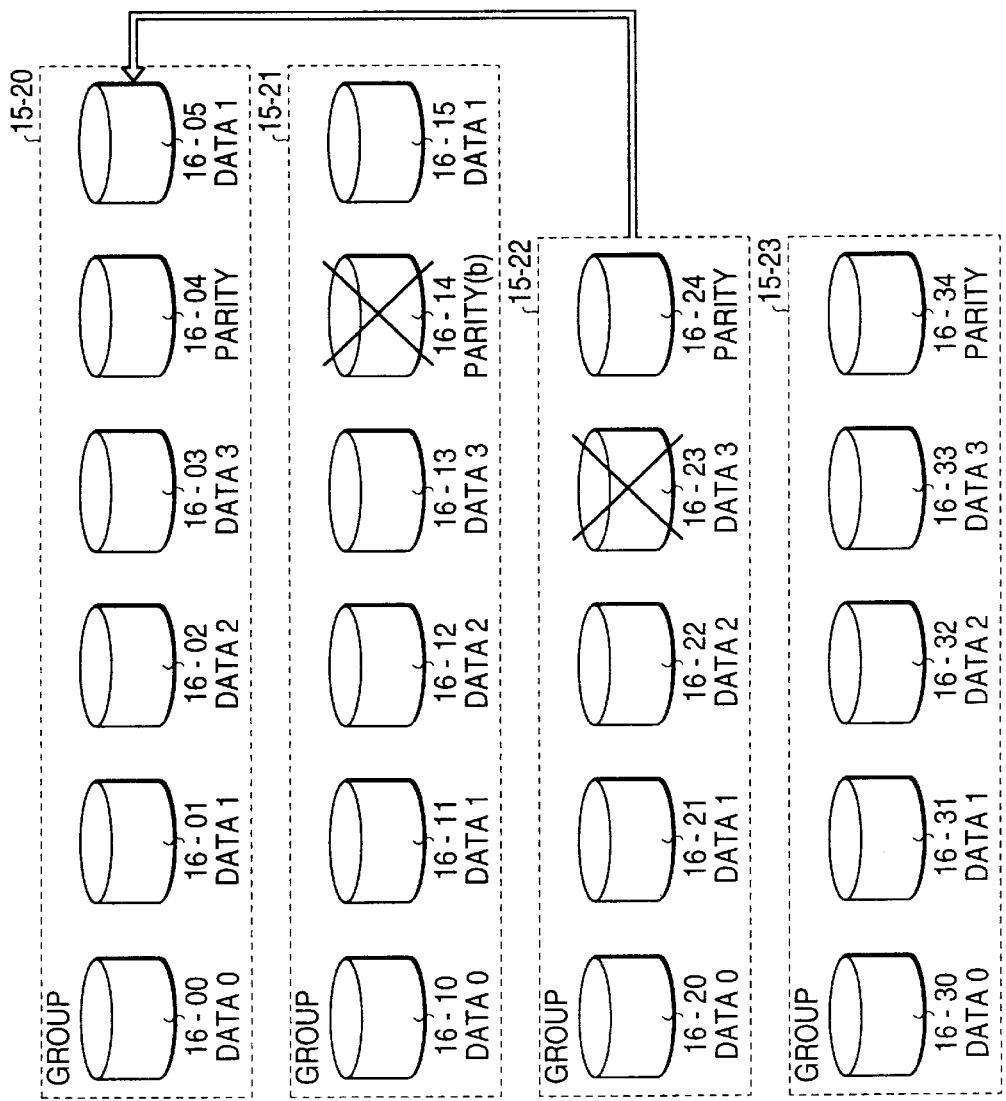
FIG. 26 is an explanatory diagram of a logic group construction by multiplexing of a part of data devices and a corresponding failure process in a system of the present invention corresponding to RAID-3 or RAID-4.

FIG. 26 shows another embodiment of logic groups constructed by the device array system 8 corresponding to RAID-3 or RAID-4.

Although the parity duplication of the logic group has been performed in the embodiment of FIG. 21, in the embodiment of the present invention shown in FIG. 26, a part of a plurality of data devices of the logic group is duplicated, instead having the parity of the logic group duplicated. That is, a part of the data devices is duplicated in logic groups 15-20 and 15-21, but logic groups 15-22 and 15-23 are ordinary logic groups of RAID-3 or RAID-4 in which a part of the data devices is not duplicated.

For example, in the logic group 15-20, in addition to the data devices 16-00 to 16-03 respectively storing data 0 to 3 and the parity device 16-04 storing parity, data device 16-05 is further added. As shown in FIG. 26, the same data 1 as that stored in data device 16-01 is duplicated and 15 stored in device 16-05.

As shown in FIG. 26, in addition to the data devices 16-10 to 16-13 and parity device 16-14, the data device 16-15 is also added to the logic group 15-21, and data device 16-15 stores a duplicate copy of the data 1 which is stored in data device 16-11, accordingly duplicating the data.

In such a RAID-3 or RAID-4 corresponding device array system 8 of the present invention having a logic group in which part of the data is duplicated, the data device storing the duplicate data can be used a failure alternate device if a device in a logic group having a lower redundancy has failed. For instance, in the embodiment of the present invention shown in FIG. 26, if data duplication is not performed in logic group 15-22 of a lower redundancy and the data device 16-23 of the logic group 15-22 has failed, the data device 16-05 in which the data 1 of the logic group 15-20 has been duplicated and stored is fetched and the data of the failed device 16-23 is reconstructed in data device 16-05, accordingly recovering the redundancy.

On the other hand, and also as shown using the example of FIG. 26, the data 1 stored in data device 16-11 of logic group 15-21 is duplicated in data device 16-15 of logic group 15-21. If the parity device 16-14 in logic group 15-21 of FIG. 26 fails, the parity of the failed parity device 16-14 is reconstructed in the data device 16-15 in which the data 1 was multiplexed, accordingly reconstructing the redundancy.

When either one of the data devices 16-11 and 16-15 in which the data 1 was duplicated has failed in the logic group 15-21 of FIG. 26, the failure alternative of fetching of a failure alternative device from the within logic group 15-21 or from another logic group is not performed because merely disconnecting from logic group 15-21 a failed one of the data devices 16-11 or 16-15 in which the data duplication was performed is sufficient.

Figure 27:
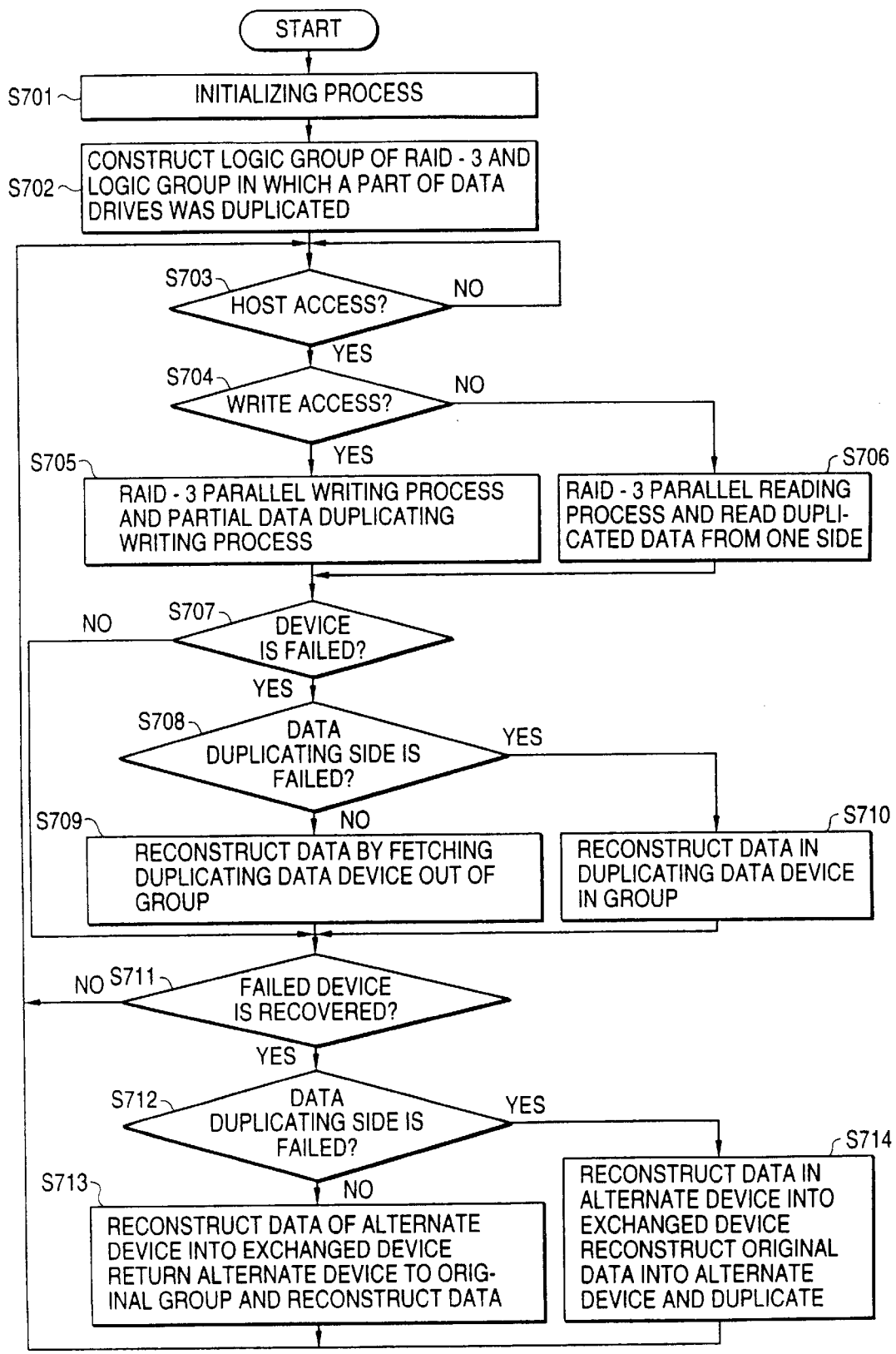
FIG. 27 is a flowchart for the processing operation of the system in FIG. 26 corresponding to RAID-3 or RAID-4.

FIG. 27 is a flowchart showing the processing operation of the RAID-2 corresponding device array system 8 in which a part of the data was duplicated, as shown in FIG. 26.

As shown in FIG. 27, when the device array system 8 is activated by power-on, an initializing process is executed in step S701. After that, in step S702, a logic group of RAID-3 and a logic group in which a partial data device was duplicated are constructed as shown in FIG. 26.

When a host access is discriminated in step S703, a check is made to determine whether the host access is a write access in step S704. If the host access is a write access, step S705 follows and parallel writing processes corresponding to RAID-3 are executed. In this case, if the access is a write access to the logic group in which the partial data was duplicated, for example, the logic group 15-20 or 15-21 in FIG. 26, then in addition to the ordinary RAID-3 parallel writing processes, a writing process of the duplicated data for the duplicated data devices is simultaneously executed.

In case of a read access, step S706 follows and parallel reading processes of RAID-3, which include parallel reading processes of the data stored in a plurality of data devices, are executed for the designated logic group as a target. In this case, the reading process from one device is executed with respect to two data devices in which the duplicated data is stored.

When the device failure is discriminated in step S707 during the access in step S705 or S706, step S708 follows and a check is made to determine whether the device failure has occurred on the data duplicating side. When the device failure has not occurred on the data duplicating side, step S709 follows. As in the case of a failure of the data device 16-23 of the logic group 15-22 in FIG. 26, the data device 16-05 of the logic group 15-20, in which a part of the data was duplicated, is fetched as a failure alternate device and the data is reconstructed, accordingly recovering the redundancy.

When the device failure is on the data duplicating side, as in the case of logic group 15-21 in FIG. 26, the data of the failed device is reconstructed in either one of the data devices 16-11 and 16-15, both of which are storing duplicated data 1. If either data device 16-11 or data device 16-15, in which the data 1 was duplicated, experiences the device failure, the reconstructing process by the device alternative in the logic group is not executed, as explained above.

After completion of the corresponding process for the device failure in step S709 or S710, the presence or absence of the recovery for exchanging the failed device for a normal device is checked in step S711. When the device is exchanged, a check is made in step S712 to determine whether the device failure has occurred on the data duplicating side.

When the device failure has not occurred on the data duplicating side, step S713 follows and the data of the failure alternate device fetched from another logic group is reconstructed in the exchanged device, accordingly recovering the redundancy. Subsequently, the failure alternate device fetched from another logic group is returned to the original logic group and the original data is reconstructed, accordingly recovering the redundancy of the logic group of the device fetching source.

When the device failure occurs in the logic group on the data duplicating side, step S714 follows. In step S714, the data of the failure alternate device is reconstructed in the exchanged device, and the original data is reconstructed in the failure alternate device (which originally stored duplicate data of one of the data devices in logic group 15-21 shown in the example of FIG. 26), accordingly duplicating the data stored therein. If the failed device is one device of the duplicated data devices, then after the failed device is exchanged for a normal device, the data of the remaining data device in the pair of duplicated data devices on the data duplicating side which has been operating normally is reconstructed in the exchanged device by copying the data from the remaining data device of the pair of duplicated data devices, accordingly recovering the redundancy by the duplicating data device.

Although the processing operation of the RAID-3 corresponding device array system 8 has been shown as an example in the flowcharts of FIGS. 23, 25, and 27, the operations of a RAID-4 corresponding device array system 8 of the present invention are similar to those of the RAID-3 corresponding device array system 8, except that the writing process and reading process of the data for each logic group are individually executed on a data unit basis for every data device, for example, on a sector unit basis of the data device, in a RAID-4 corresponding device array system 8.

5. Device Array System 8 Corresponding to RAID-5

Figure 28:
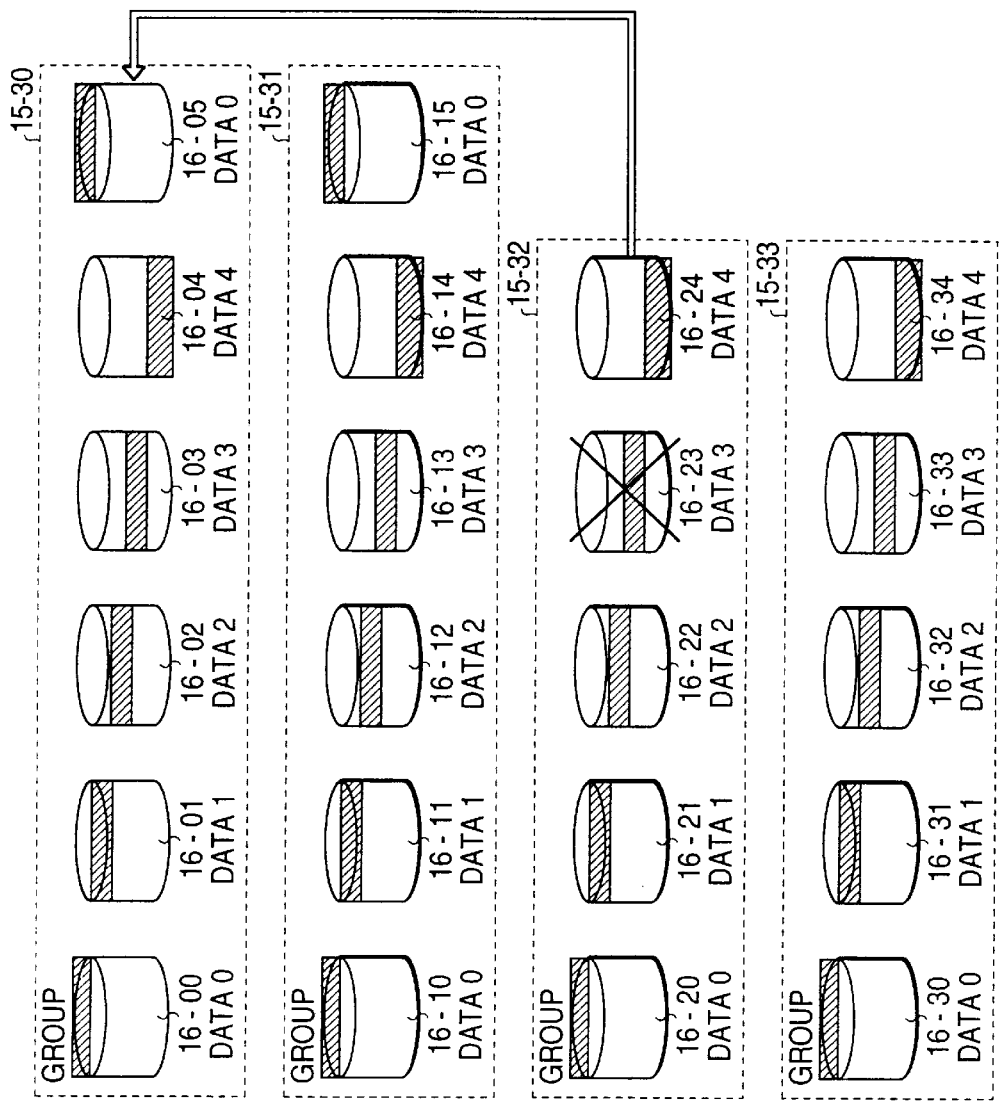
FIG. 28 is an explanatory diagram of a logic group construction and a corresponding failure process in a system of the present invention corresponding to RAID-3 or RAID-4.

FIG. 28 is an explanatory diagram of a logic group which is constructed for the device array unit 12, as a target, of the RAID-5 corresponding device array system 8 according to the present invention. A logic group corresponding to RAID-5 comprises, for example, five devices (16-Z0 through 16-Z4, in which Z=0, 1, 2, 3, or 4), as shown in logic groups 15-30 to 15-33 of FIG. 28, and parities are stored in different devices depending on the sector position. Device 16-05 of logic group 15-30 is a redundant device of another device within logic group 15-30, and device 16-15 of logic group 15-31 is a redundant device of another device within logic group 15-31, as explained below with respect to FIG. 28.

By way of the example shown in FIG. 28, in logic group 15-30, data 0 to data 4 are individually stored into each of the devices 16-00 to 16-04 and parities 0 to 4 are sequentially stored at different sector positions of the devices 16-00 to 16-04. The foregoing configuration also applies similarly to each of the remaining logic groups 15-31 to 15-33.

With respect to the logic groups 15-30 to 15-33 corresponding to RAID-5, according to the present invention, data devices 16-05 and 16-15 are also included in logic groups 15-30 and 15-31, respectively. The same data 0 and parity 0 as is stored in the devices 16-00 and 16-10 are respectively stored in data devices 16-05 and 16-15, accordingly duplicating one of the devices in each of the foregoing logic groups.

By such a duplication of one of the devices in each of the logic groups 15-30 and 15-31, the redundancy of each of logic groups 15-30 and 15-31 is increased, and the duplicate devices from each of logic groups 15-30 and 15-31 are available as failure alternate devices to recover the redundancy of the ordinary logic groups 15-32 and 15-33.

A device failure in the RAID-5 corresponding device array system 8 is processed as follows. Assume that the device 16-23 of the logic group 15-32 having a lower redundancy in FIG. 28 has failed. For such a failure of the device 16-23, one device 16-05, in which the data 0 in the logic group 15-30 having a higher redundancy was duplicated, is fetched as a failure alternate device and the data 3 of the failed device 16-23 is reconstructed into device 16-05, accordingly recovering the redundancy of the logic group 15-32.

On the other hand, when the device 16-14 of, for example, the logic group 15-31 of a higher redundancy has failed, one device 16-15 in which the data 0 was duplicated in the group is designated as a failure alternate device and the data 4 of the failed device 16-4 is reconstructed in device 16-15, accordingly recovering the redundancy of the logic group 15-31. In the logic group 15-31, when either one of the devices 16-10 and 16-15 in which the data 0 was duplicated has failed, the failure alternative of fetching a failure alternate device is not performed. The failed device is, however, disconnected.

During the failure recovery process after the failed device was exchanged for a normal device, at the time of the exchange of the failed device 16-23 of the logic group 15-32 of a lower redundancy, the original data 3 is reconstructed in the device 16-23 after the exchange and is returned to its normal logic group, which is logic group 15-32. In addition, the failure alternate device 16-05 is returned to the logic group 15-30 and the data 0 is reconstructed therein, accordingly recovering the redundancy due to the duplication of the data 0 between device 16-00 and 16-05.

With respect to the exchange of the device 16-14 in the logic group 15-31 of a higher redundancy, the original data 4 is reconstructed in the device 16-14 after the exchange of failed device 16-14 for a normal device, and the data 0 stored in device 16-10 for duplication is reconstructed in the alternate device 16-15 by copying same from device 16-10 to device 16-15, accordingly reconstructing the logic group 15-31 to the level of redundancy which logic group 15-31 had originally before device 16-14 failed.

Figure 29:
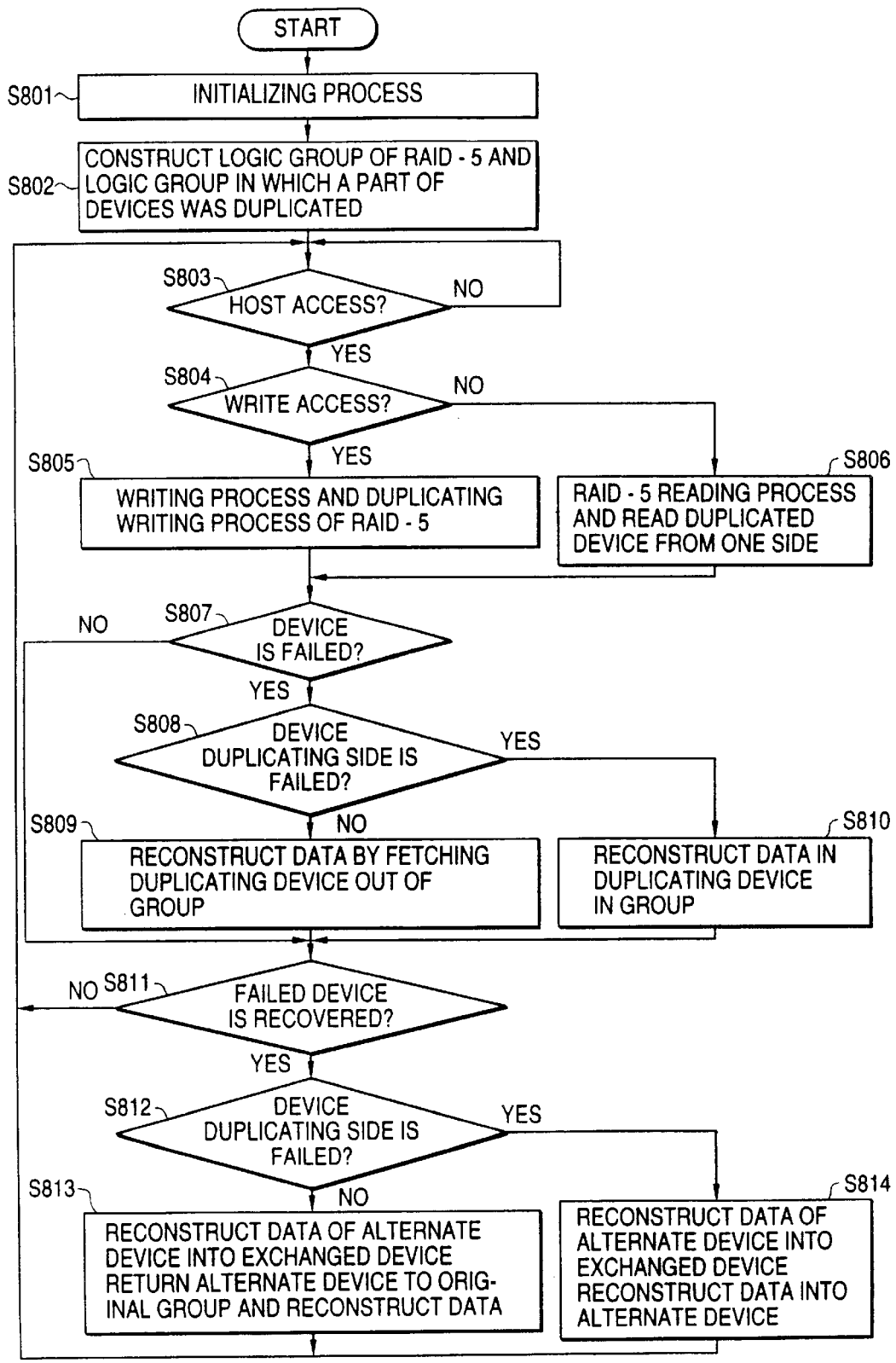
FIG. 29 is a flowchart for the processing operation of the system in FIG. 28 corresponding to RAID-5.

FIG. 29 is a flowchart of the device array system 8 corresponding to RAID-5 shown in FIG. 28. When the device array system 8 is activated by turning on the power source, an initializing process is executed in step S801. After that, a plurality of logic groups of RAID-5 are constructed in step S802. Further, a logic group of a higher redundancy in which part of the devices of the logic group are duplicated is constructed.

In response to a host access in step S803, when the access is a write access in step S804, step S805 follows and the writing process of RAID-5 is executed. In executing the writing process of RAID-5, in writing process to either of device 16-00 of the logic group 15-30 or device 16-10 of the logic group 15-31 in FIG. 28, multiple writing processes are executed for simultaneously writing the same data into the device 16-05 or 16-15, respectively, as part of a duplicated group.

In a read access, step S806 follows and the reading process of RAID-5 is executed. When the device of the read requesting destination is one of the duplicated devices in the logic group, the reading process is performed from only one of the duplicated devices.

When the device failure is discriminated in step S807 during the read or write access for the logic group, step S808 follows and a check is made to determine whether the device failure has occurred in the logic group having duplicated devices.

When the device failure has not occurred in a logic group having duplicated devices, specifically, if the device failure has occurred in a device in either of the logic group 15-32 or 15-33 in FIG. 28, step S809 follows. One of the duplicated drives from the logic group having duplicated drives is fetched as a failure alternate device, and the data of the failed device is reconstructed to the failure alternate device, accordingly recovering the redundancy.

If the device failure occurs in the logic group having duplicated devices, step S810 follows and the data of the failed device is reconstructed in one of the duplicated devices in the group. When the failed device is one of the duplicated devices, the data is not reconstructed, but the failed device is merely disconnected.

After such a corresponding process for the device failure was performed, the recovery for exchanging the failed device for a normal device is discriminated in step S811.

When step S812 determines the device failure did not occur in one of the logic groups having duplicated devices, step S813 follows. In step S813, the data of the failure alternate device is reconstructed in the exchanged device, accordingly recovering the redundancy.

Subsequently, the failure alternate device is returned to the original logic group from whence it was fetched and the data is reconstructed by copying from the other, corresponding duplicated device, accordingly recovering the redundancy of the logic group having the duplicated devices.

On the other hand, when the exchange of the failed drive is performed for the failed device in the logic group having duplicates drives, step S814 follows and the data of the failure alternate device in the logic group is reconstructed in the exchanged drive. Data from the other, corresponding duplicated device is subsequently reconstructed in the failure alternate device, accordingly duplicating the devices.

When the failed device is exchanged for a normal device because of a failure of one of the duplicated devices, the original data is reconstructed in the exchanged device by copying the data stored in the other, corresponding duplicated device, accordingly duplicating the devices in the logic group.

6. Device Array System 8 Having a Combination of RAID Levels

Figure 30:
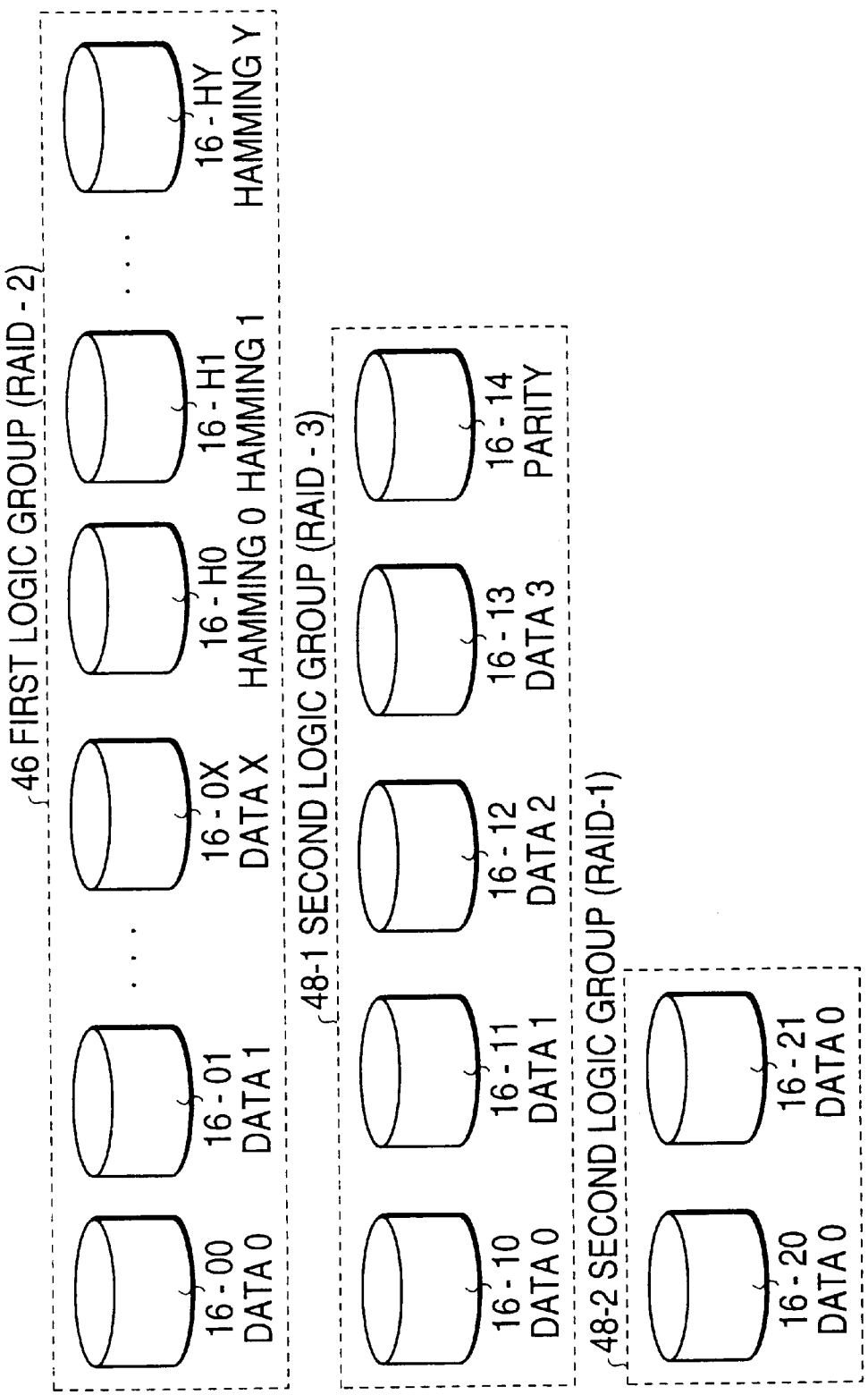
FIG. 30 is an explanatory diagram of a logic group construction in a RAID combination system of the present invention.

FIG. 30 shows a construction of a logic group for the device array system of the present invention, as a target, having a combination of devices implementing RAID-1, RAID-2, RAID-3, RAID-4, and RAID-5. In the embodiment of the present invention shown in FIG. 30, the logic group comprises a first logic group 46 corresponding to RAID-2, and second logic groups 48-1 and 48-2 other than RAID-2. Second logic groups 48-1 and 48-2 could have redundancy by parity, consistent with the present invention. In the example shown in FIG. 30, second logic group 48-1 has a redundancy by a parity, and second logic group 48-2 has a redundancy by mirroring.

In the above-mentioned example, in the first logic group 46, the data 0 to X are stored into the data devices 16-00 to 16-0X and the Hamming codes 0 to Y are stored in the Hamming code devices 16-H0 to 16-HY, in correspondence with RAID-2. On the other hand, in the second logic group 48-1 in the above-mentioned example, the data 0 to 3 are stored in the data devices 16-10 to 16-13 and the parity obtained from the data 0 to 3 is stored in the parity device 16-14, in correspondence with RAID-3.

The second logic group 48-2 is a logic group implementing RAID-1, and the same data 0 are stored in both of the devices 16-20 and 16-21 in a mirrored configuration, consistent with RAID-1.

In a logic group having a combination of RAID as described above, the redundancy of the first logic group 46 of RAID-2 using the Hamming codes would be higher than the redundancies of the second logic groups 48-1 of RAID-3 using the above-mentioned parity and 48-2 of RAID-1 after providing a failure alternate device. Accordingly, for a device failure in the second logic groups 48-1 and 48-2, the device of the first logic group 46 (of a higher redundancy after providing the failure alternate device) is fetched as a failure alternate device, accordingly recovering the redundancy in the second logic group having the device failure.

Figure 31:
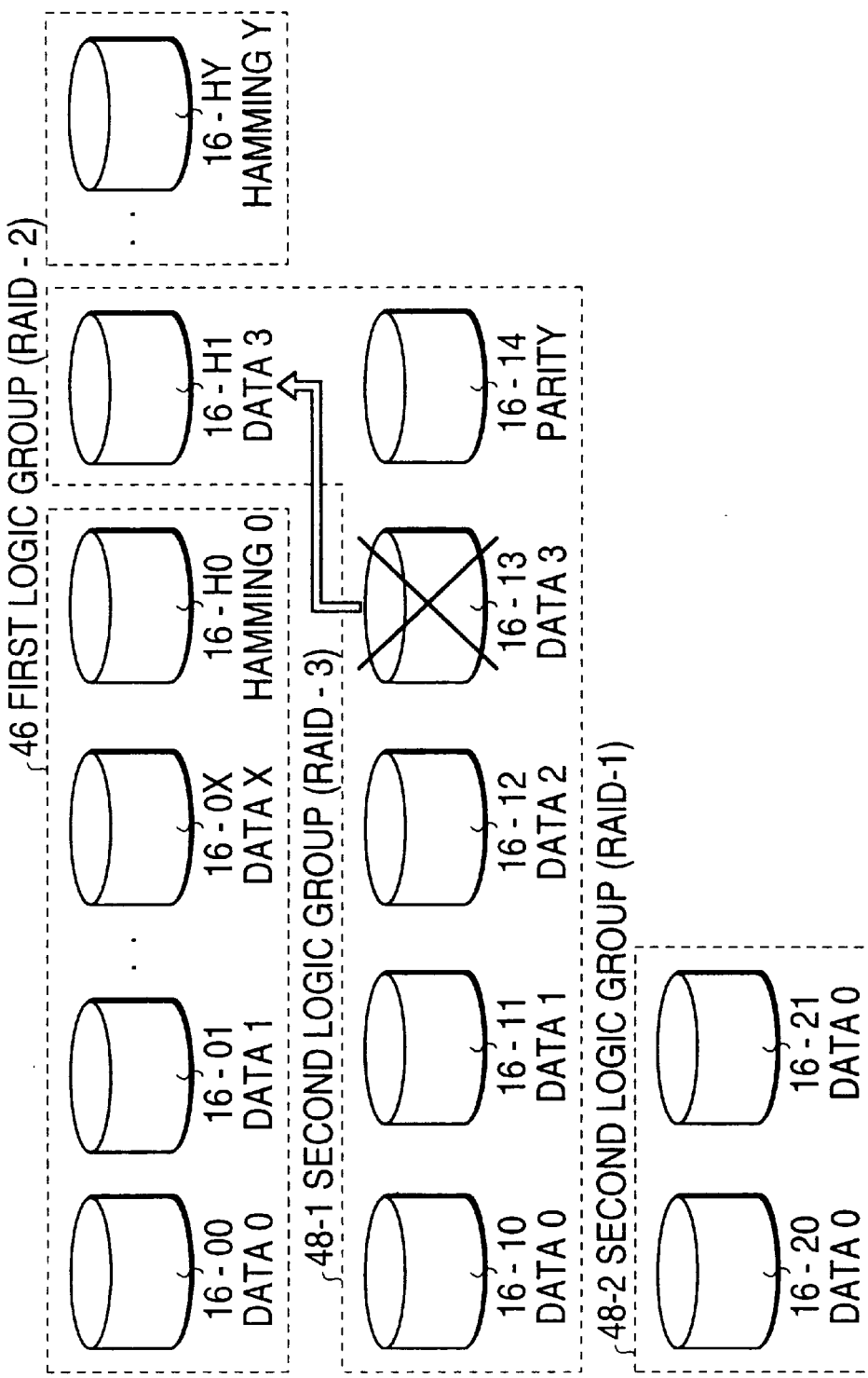
FIG. 31 is an explanatory diagram of a corresponding failure process in the RAID combination system in FIG. 30.

FIG. 31 shows an embodiment of the present invention in which the data device 16-13 of the second logic group 48-1 of RAID-3 has failed. As shown in FIG. 31, for example, the Hamming code device 16-H1 in the first logic group 46 of RAID-2 is fetched as a failure alternate device and the data 3 of the failed device 16-13 is reconstructed in the Hamming code device 16-H1, accordingly recovering the redundancy corresponding to RAID-3 of the second logic group 48-1.

In the first logic group 46, even if the Hamming code device 16-H1 is opened as a failure alternate device, the redundancy in logic group 46 is assured by the remaining data devices 16-00 to 16-0X and Hamming code devices 16-H0 and 16-H2 to 16-HY. Therefore, even though the redundancy of logic group 46 deteriorates, the redundancy is not lost.

Figure 32:
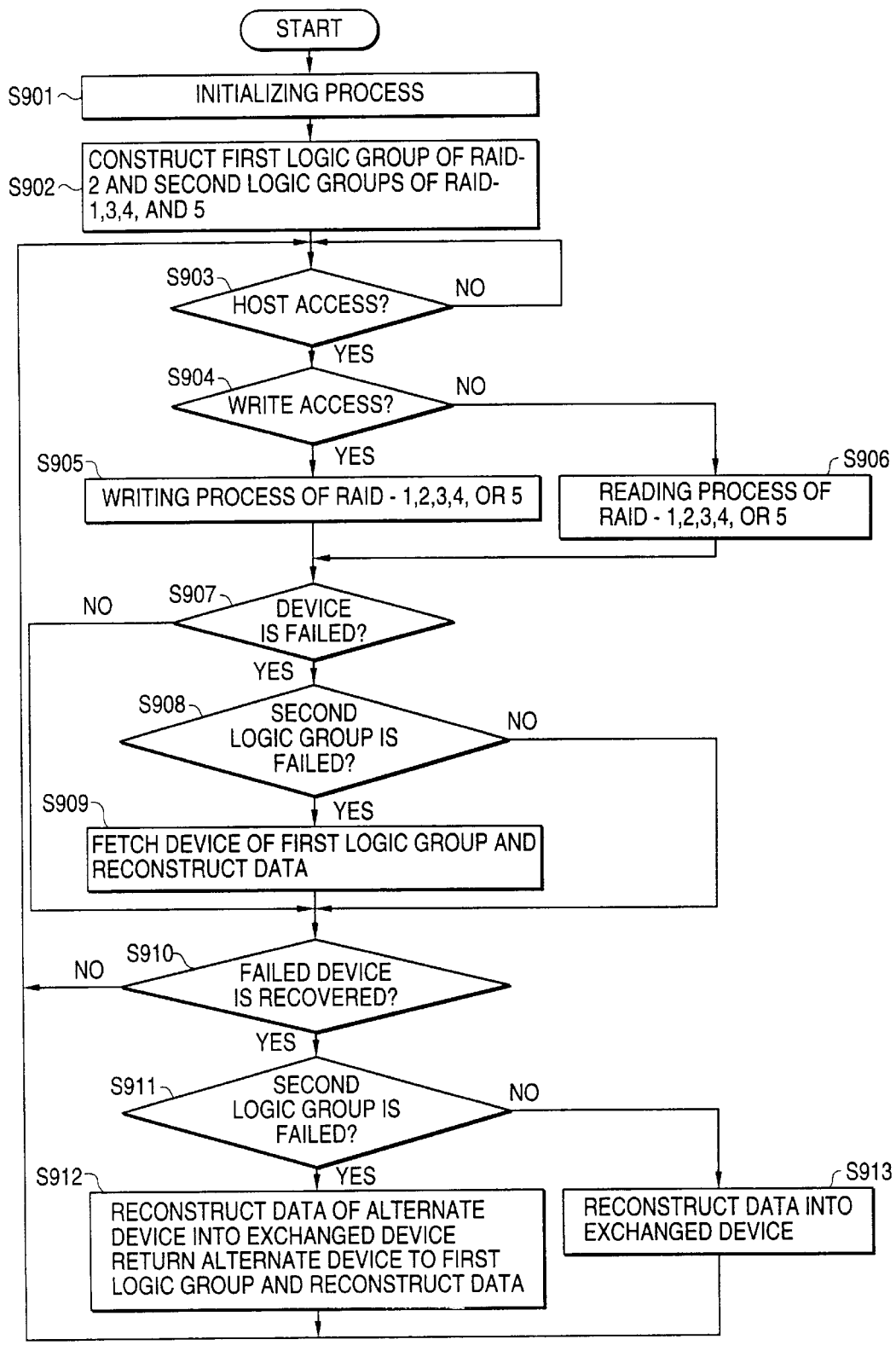
FIG. 32 is a flowchart for the processing operation of the RAID combination system in FIGS. 30 and 31.

FIG. 32 is a flowchart for the processing operation of the RAID combination device array systems 8 of FIGS. 30 and 31 of the present invention.

When the device array system 8 is activated by power-on, an initializing process is performed in step S901. After that, in step S902, the first logic group having a high redundancy of RAID-2 and the second logic groups including RAID-1 (having a mirrored disk configuration), and RAID-3, RAID-4, and RAID-5 (in which the redundancy depends on the parity) are constructed as shown in FIG. 30. In FIG. 30, although RAID-3 and RAID-1 are shown as examples of the second logic groups, RAID-4 and RAID-5 can be also used as, or included in, the second logic groups.

Subsequently, when a host access is discriminated in step S903, a check is made in step S904 to determine whether the host access is a write access. When the host access is a write access, step S905 follows and a writing process corresponding to the RAID form of the logic group serving as an accessing destination is executed. When the host access is a reading access, step S906 follows and a reading process corresponding to the RAID form of the accessing destination is executed.

When the device failure is discriminated in step S907 during the access of the writing or reading process of such logic groups, a check is made in step S908 to determine whether a device failure of the second logic group in which the redundancy is assured by parity or mirroring has occurred. When the device failure of the second logic group occurs, step S909 follows. The device of the first logic group of RAID-2 is fetched as a failure alternate device and the data is reconstructed, accordingly recovering the redundancy of RAID-1, 3, 4, or 5 as a second logic group.

On the other hand, in case of the device failure of the first logic group of RAID-2, the data reconstruction corresponding to the Hamming code of RAID-2 is merely executed and no special corresponding failure process is performed. Subsequently, when the exchange of the failed device to a normal device is discriminated in step S910, if step S911 determines that the device failure is in the second logic group side, step S912 follows.

In step S912, the data of the failure alternate device is reconstructed in the exchanged device, and the redundancy of the logic group receiving the failure alternate device is recovered to its original level. Subsequently, and also in step S912, the failure alternate device is returned to the first logic group, and the original data is reconstructed, accordingly similarly recovering the redundancy of the first logic group to its original level. On the other hand, if the device failure occurred in the first logic group, it is sufficient to merely reconstruct the original data into the exchanged device in step S913.

Figure 33:
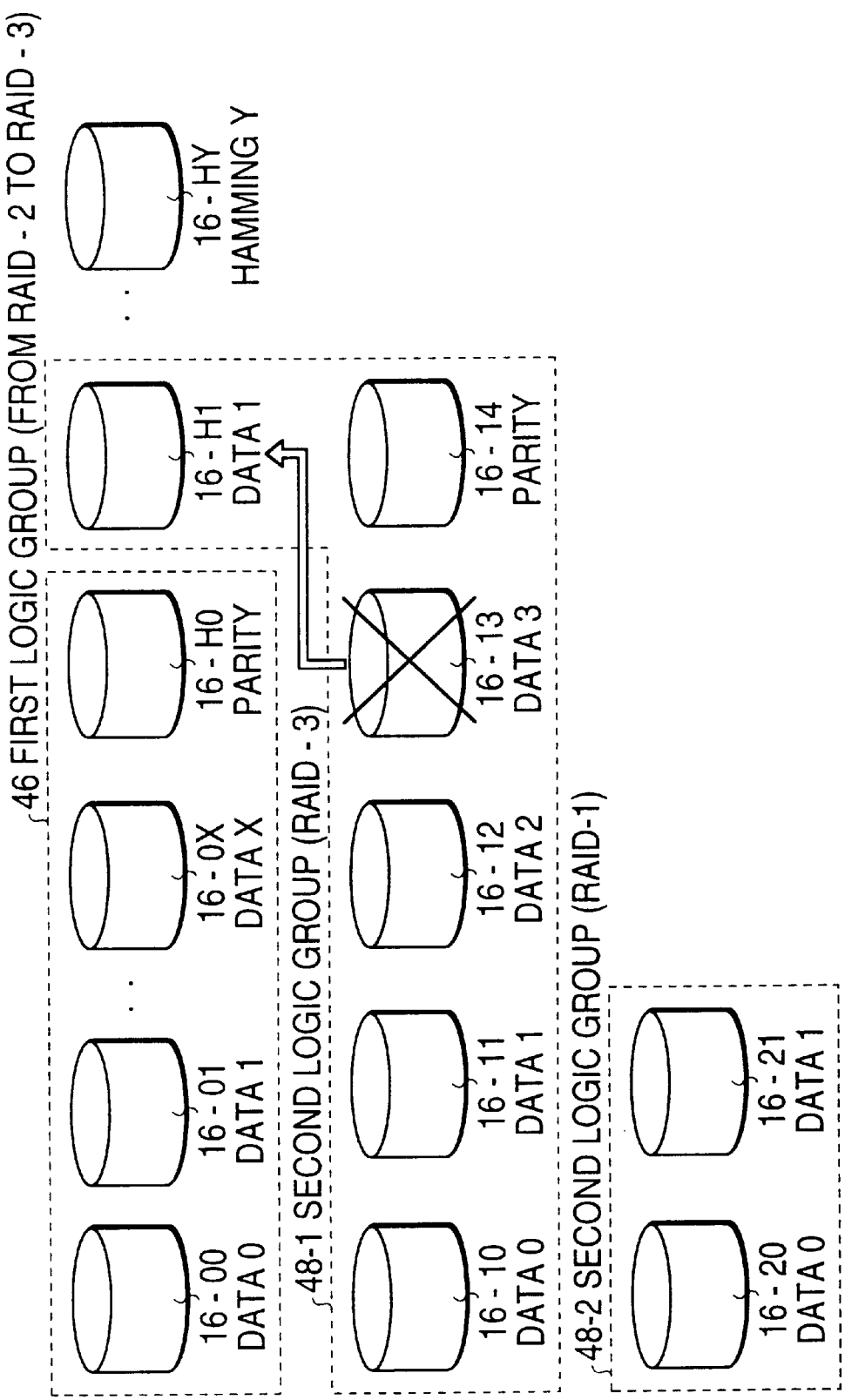
FIG. 33 is an explanatory diagram of a process for changing RAID-2 to RAID-3 and alternating when a device has failed in the RAID combination system.

FIG. 33 shows an embodiment of the present invention in which, with respect to a logic group comprising a combination of the RAID levels shown in FIG. 30, for a device failure in the second logic group, the first logic group 46 is changed from a logic group corresponding to RAID-2 as initially established to a logic group corresponding to RAID-3, and a plurality of the Hamming data devices used in RAID-2 become available as failure alternate disks, accordingly providing alternate devices for failed devices which may subsequently occur.

For example, when device 16-13 of the second logic group 48-1 serving as RAID-3 has failed, the first logic group 46 of RAID-2 which provides the failure alternate device is changed to the logic group of RAID-3 shown in the diagram. By changing to a logic group of RAID-3, only one Hamming code device 16-H0 is needed to store the parity obtained from the data 0 to X stored in the data devices 16-00 to 16-0X, and the remaining devices 16-H1 to 16-HY are disconnected from the first logic group 46.

Therefore, for the failed device 16-13 of the second logic group 48-1, for example, the first Hamming code device 16-H1 among the Hamming code devices 16-H1 to 16-HY opened by the change to RAID-3 is fetched into the second logic group 48-1, and the data 3 of the failed device 16-13 is reconstructed thereon, accordingly recovering the redundancy as RAID-3.

After the first logic group 46 was changed to RAID-3 in correspondence to the first device failure, the Hamming code devices opened by the above-mentioned change can be used as failure alternate devices for the device failure of the other devices in the second logic group. After all of the failed devices in the second logic group are exchanged for normal devices and the redundancy is recovered, all of the Hamming code devices 16-H0 to 16-HY which are necessary for the first logic group 46 to implement RAID-2 are returned to the first logic group 46. Therefore, by again changing to the first logic group 46 to RAID-2, the device array system 8 is prepared for a new device failure.

Figure 34:
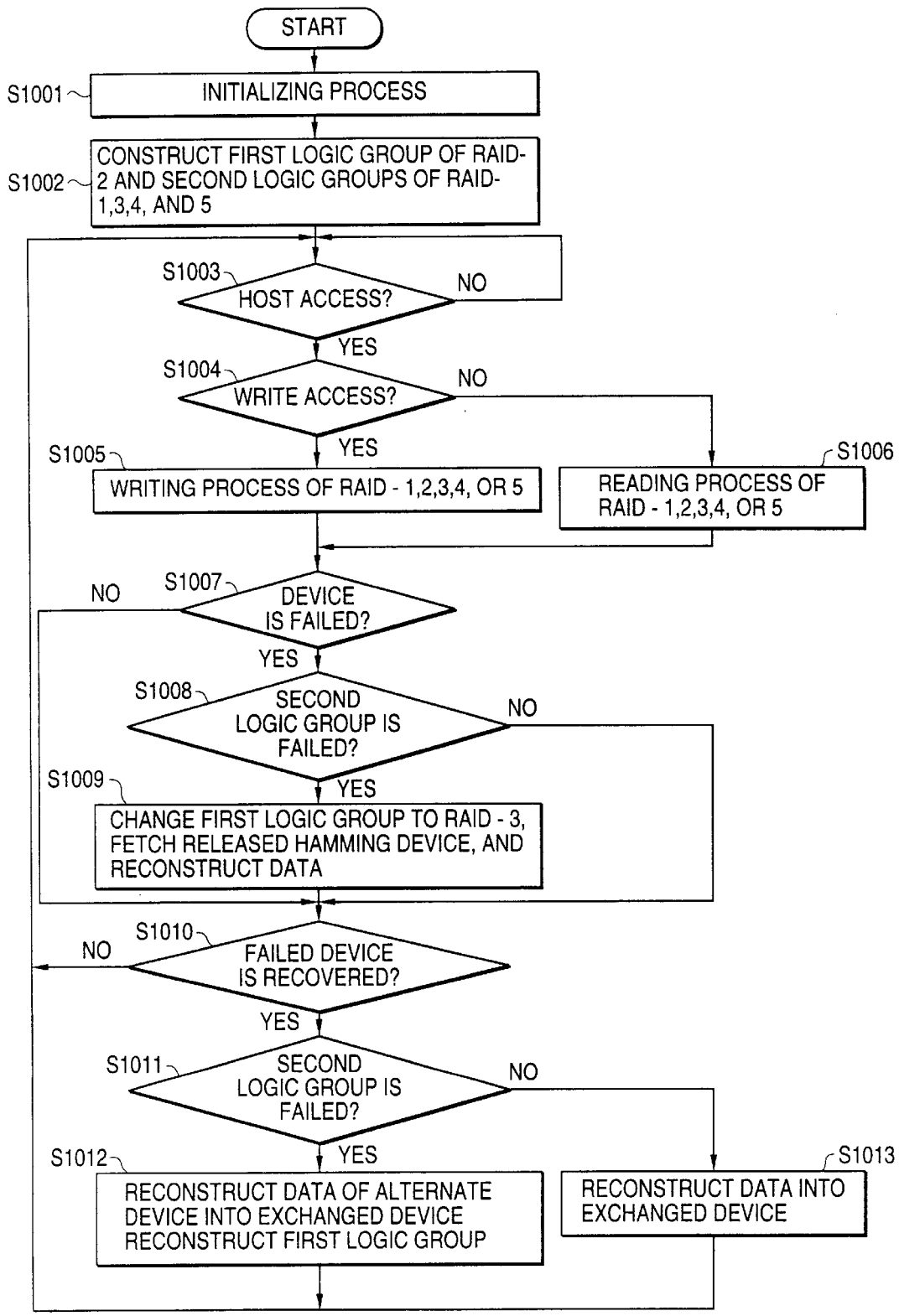
FIG. 34 is a flowchart for the processing operation of the RAID combination system in FIG. 33.

FIG. 34 is a flowchart for the processing operation of the present invention of changing the first logic group from RAID-2 to RAID-3 due to the need for providing failure alternate device for a failed device in FIG. 33.

In FIG. 34, steps S1001 to S1008 are the same as steps S901 to S908, respectively, in FIG. 32. According to a corresponding failure process for the device failure on the second logic group side in step S1009, the first logic group is changed from RAID-2 to RAID-3, the Hamming code devices other than the parity device used to implement RAID-3 are released, the released Hamming code devices are fetched as failure alternate devices, and the data is reconstructed in the fetched failure alternate devices, accordingly recovering the redundancy.

Steps S1010 and S1011 are self-explanatory.

According to a failure recovery process of the present invention in which the failed device of the second logic group is exchanged for a normal device after the corresponding failure process was performed, as shown in step S1012, the data of the failure alternate device is reconstructed in the exchanged device. Then, and also as shown in step S1012, the failure alternate device is subsequently returned to the first logic group, and if no other devices were fetched from the first logic group as failure alternate devices to provide for a failure alternative, the first logic group is changed from a RAID-3 corresponding logic group to a RAID-2 corresponding logic group, accordingly reconstructing the Hamming code devices.

Step S1013 is self-explanatory.

Figure 35:
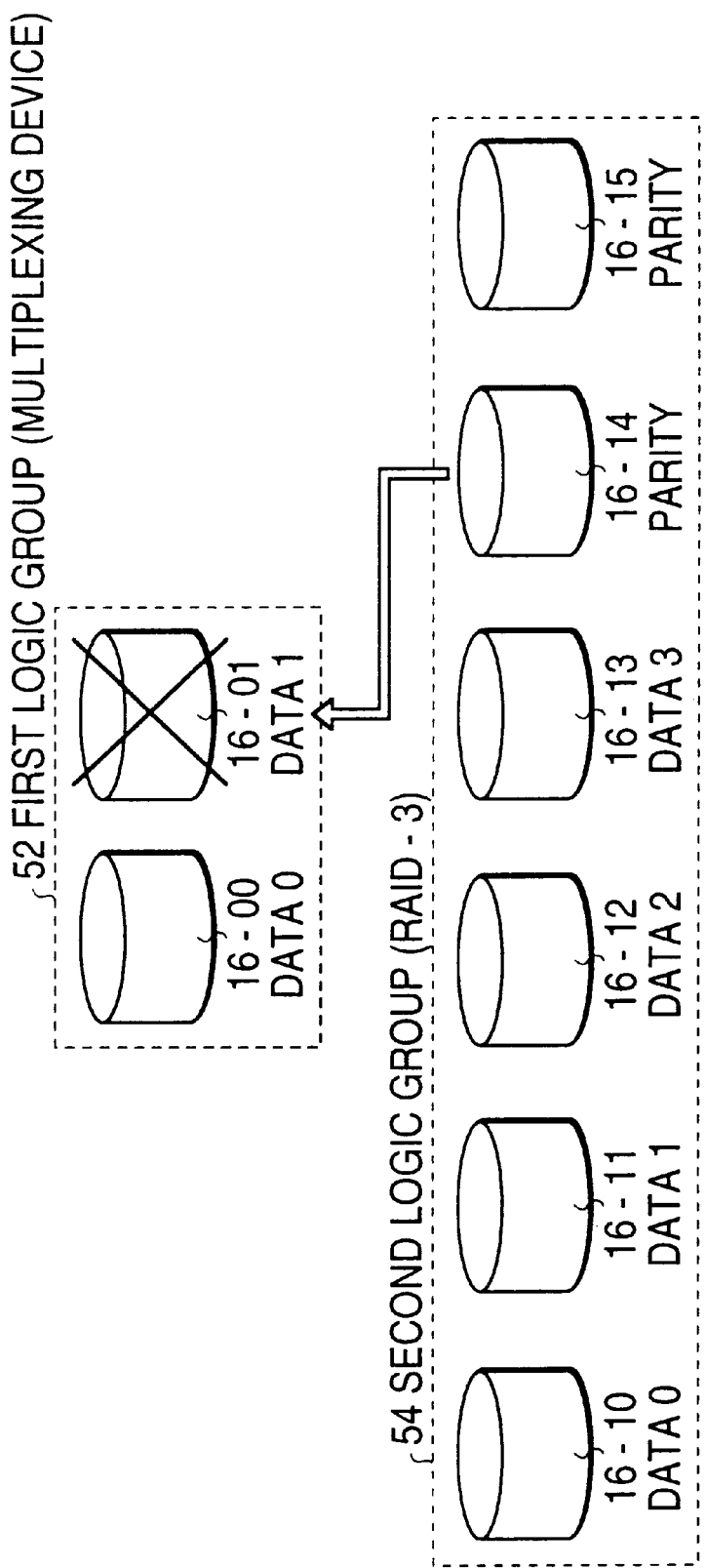
FIG. 35 is an explanatory diagram of a process for corresponding a device failure of multiplexing a logic group by alternating it to a device of a parity logic group in an RAID combination system.

FIG. 35 shows another logic group constructed by a device array system 8 of the present invention. The logic group shown in FIG. 35 comprises a combination of the RAID levels and is divided into a first logic group in which redundancy is assured by multiplication (or mirroring) of devices corresponding to RAID-1 in which the same data has commonly been stored in a plurality of devices, and a second logic group in which redundancy is assured by parity.

The first logic group 52 shown in FIG. 35 comprises duplicated devices 16-00 and 16-01 in each of which the same data 0. In addition, the second logic group 54 shown in FIG. 35 comprises four data devices 16-10 to 16-13 and a parity device 16-14, in accordance with RAID-3.

Further, parity device 16-15 is provided in order to raise redundancy, accordingly duplicating the parity data, in the second logic group 54 shown in FIG. 35.

In the first logic group 52 and second logic group 54 shown in FIG. 35, the redundancy of the second logic group 54, in which parity duplication is performed, is higher than that of the first logic group 52.

Therefore, for example, when device 16-01 has failed in the first logic group 52 of a lower redundancy, for instance, one parity device 16-14 in the duplicated devices of the second logic group 54 is fetched as a failure alternate device and the data of the failed device 16-01 is reconstructed in the failure alternate device, accordingly recovering the redundancy of the first logic group 52.

Figure 36:
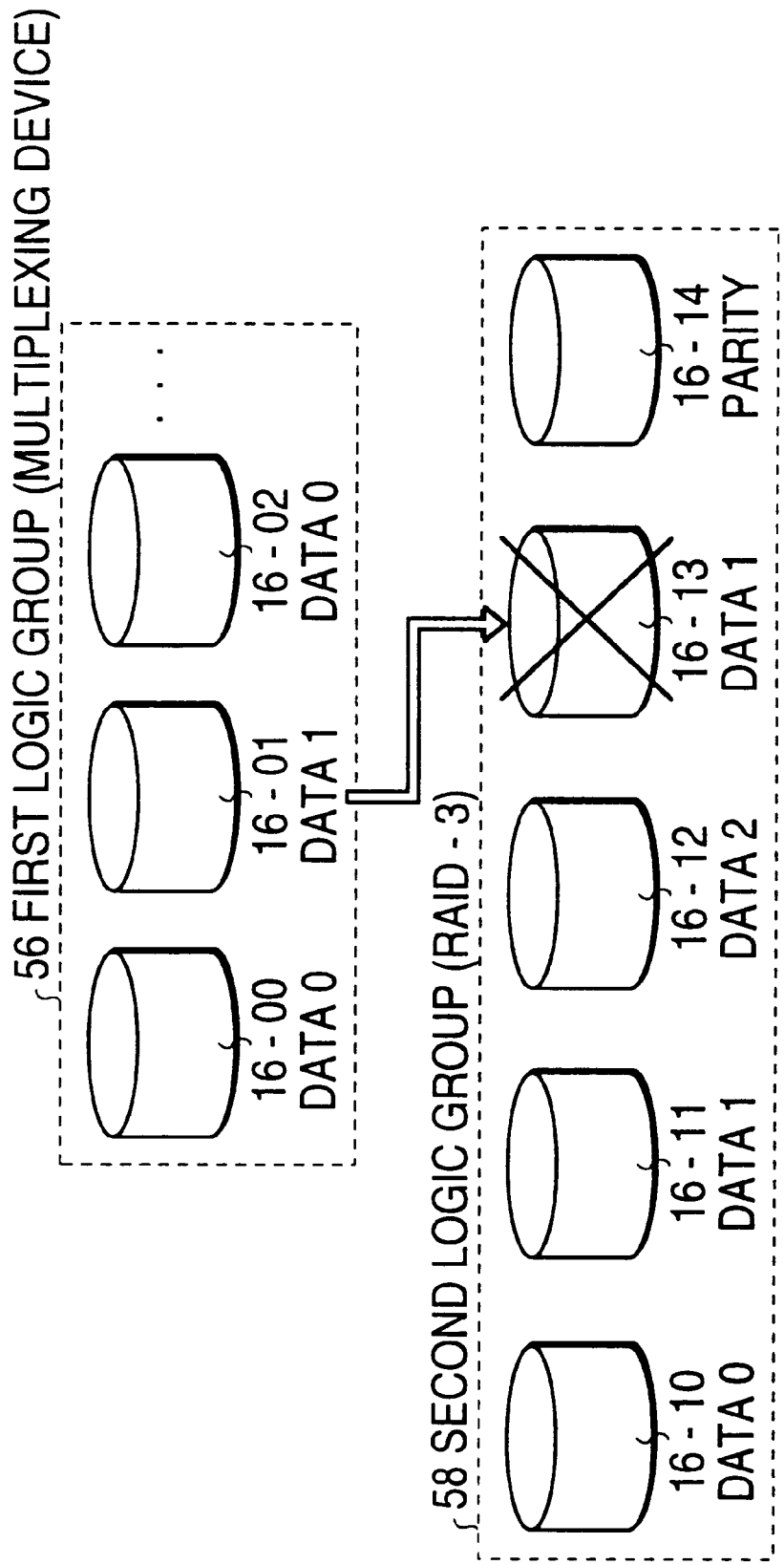
FIG. 36 is an explanatory diagram of a process corresponding to the device failure of the parity logic group by alternating it to the device of the multiplexing logic group in the RAID combination system.

FIG. 36 shows another embodiment of the present invention. In the embodiment shown in FIG. 36, a first logic group 56, in which redundancy is obtained by multiplexed devices storing the same data, and a second logic group 58 of RAID-3, in which redundancy is obtained by a parity device, are constructed. In the embodiment of FIG. 36, the devices are triplicated by providing in the first logic group 56 three devices 16-00 to 16-02 all storing the same data, accordingly for the first logic group 56 and raising the redundancy for the second logic group 58, in particular in the event that one of the devices in the second logic group 58 fails, as explained below.

If the device 16-13 of the second logic group 58 of RAID-3 of a lower redundancy has failed, then the device 16-01 of the first logic group 56 of a higher redundancy is fetched as a failure alternate device, and the data 3 which was stored in failed device 16-13 is reconstructed in the failure alternate device, accordingly recovering the redundancy of the second logic group 58.

In the first logic group 56, even if the device 16-01 is provided as a failure alternate device, since two devices 16-00 and 16-02 remain in the first logic group 56, the redundancy is not lost, although the redundancy deteriorates.

In the embodiments of the present invention shown in FIGS. 35 and 36, although RAID-3 has been shown as an example of the second logic groups 54 and 48, respectively, other levels, such as RAID-4 and RAID-5, can also be included. Further, in the first logic group 56 shown in FIG. 36, although the case of the triplication of the devices is shown as an example, the number of multiplication of the devices can be set to a proper multiplication number, so long as the number is at least a triplication.

Figure 37:
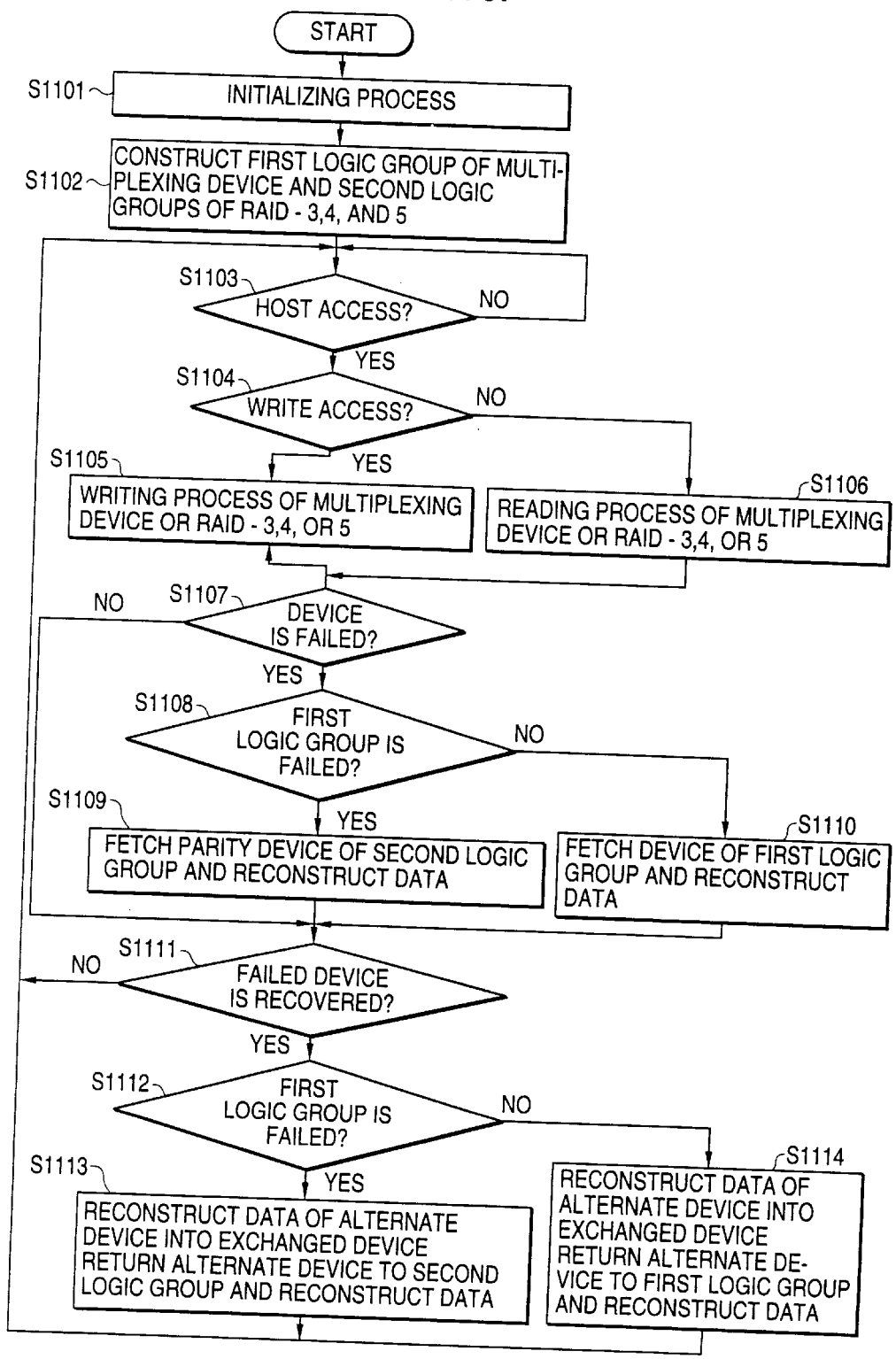
FIG. 37 is a flowchart for the processing operation of the RAID combination system in FIGS. 35 and 36.

FIG. 37 is a flowchart showing the processing operation for the embodiments of the present invention shown in FIGS. 35 and 36 as targets. When the device array system 8 is activated by power-on, an initializing process is executed in step S1101. Subsequently, a first logic group of the multiplexed drives and second logic groups of RAID-3, RAID-4, and RAID-5 are constructed in step S1102.

In constructing the logic groups, either one of the method of raising the redundancy on the second logic group 54 side as shown in FIG. 35 and the method of raising the redundancy on the first logic group 56 side is executed.

As shown in FIG. 37, reading and writing processes for a host access in steps S1103 to S1106 are processes corresponding to the multiplexed drives of RAID-1 or each of RAID-3, RAID-4, and RAID-5. When the device failure is discriminated in step S1107, a check is made in step S1108 to determine whether the device failure is a device failure of the first logic group as a multiplexing group. In case of the device failure of the first logic group, step S1109 follows. For example, the parity device of the second logic group as shown in FIG. 35 is fetched as a failure alternate device and the data is reconstructed, accordingly recovering the redundancy of the first logic group.

If the device failure is in a device in the second logic group, step S1110 follows. As shown in FIG. 36, a failure alternate device, which is a device from the first logic group, is fetched based on the prerequisite that the logic groups are constructed such that the redundancy on the first logic group 56 side is high. Then, and also in step S1110, the data is reconstructed, accordingly recovering the redundancy of the second logic group in which the device failure occurred.

When the recovery of the failed device by exchanging the failed device for a normal device is determined in step S1111, then whether the failure was a device failure on the first logic group side is determined in step S1112. If the device failure occurred on the first logic group side, then, in step S1113 the data of the failure alternate device is reconstructed in the exchanged device and, subsequently, the failure alternate device is returned to the second logic group and the data is reconstructed therein, accordingly reconstructing the original redundancy level in the second logic group.

If the device failure occurred on the second logic group side, then in step S1114 the data of the failure alternate device is reconstructed in the exchanged device and, subsequently, the failure alternate device is returned to the original first logic group, accordingly reconstructing the logic group state which was initially set.

The present invention is not limited by the numerical values shown in the foregoing embodiments. Although the foregoing embodiments have been shown using the example of the magnetic disk drives as devices of the device array unit 12, other proper input/output devices such as optical disk drives, magnetic tape apparatuses, or the like, can be used. Further, not only the same kind of devices but also a plurality of kinds of different input/output devices can be allowed to exist in combination in the device array unit 12.

According to the present invention as described above, in the normal operating state without any device failure, a hot spare which is used as a spare device for coping with a device failure does not exist in the device array unit and all of the devices belong to any one of the logic groups and are in an operating state in which they were accessed on the basis of a request from the host computer (or upper apparatus).

In the present invention, a hot spare patrol for verifying the function of a hot spare is unnecessary because an extra device fixed as hot spare is not necessary, a collision of the device access by the hot spare patrol and the device access based on the host request does not occur, and the performance of the device array system 8 is accordingly guaranteed.

Further, since the logic group of a higher redundancy is constructed in the logic group having a redundancy as a target to be accessed, the redundancy as a whole device array system 8 is further improved and the reliability for a data input/output request is further improved.

Moreover, in the conventional array disk system, the deterioration of the redundancy by disk failure is prevented by providing a hot spare disk. A hot spare disk is what is referred to as a spare disk and when a data device has failed, the hot spare disk is assembled into the logic group as a logic disk in place of the failed disk.

On the other hand, according to the present invention, a concept of the hot spare disk is eliminated and all disks are used as data devices. Thus, not only is the reliability improved by an increase in redundancy, but, also, the following special effects are obtained.

With respect to RAID-1, when a read request for the same logic disk is simultaneously generated, as many simultaneous processes as the degree of multiplexing of the logic disks is performed in the present invention. Therefore, by increasing the multiplexing degree of the logic disks, the waiting time for a reading process is, accordingly contributing to the improvement of the performance in the present invention.

As for RAID-3, by increasing the degree of multiplexing of any one of the disks constructing the logic disks in the logic group, the data is transferred by using the disk in which the positioning was first completed, so that it contributes to the improvement of the performance. For example, by using the disk on which a defective alternating link is adhered as a target, an increase in reliability and performance is derived.

With regard to RAID-5, the performance is improved by the dispersion of the accesses by striping. However, by multiplexing the physical disks on which the accesses are concentrated, the multiplexing process of the accesses can be performed due to the same reason as that of RAID-1, accordingly contributing to the improvement of the performance.

The many features and advantages of the present invention are apparent from the detailed specification and, thus, it is intended by the appended claims to cover all such features and advantages of the present invention which fall within the true spirit and scope of the present invention. Further, since numerous modifications and changes will readily occur to those skilled in the art, it is not desired to limit the present invention to the exact construction and operation illustrated and described, and accordingly all suitable modifications and equivalents may be resorted to, falling within the scope of the present invention.

| ELEMENT REFERENCE NUMERAL LIST | |
|---|---|
| 8: | device array system |
| 10: | disk array controller (controller) |
| 12: | device array unit |
| 14: | host computer (upper apparatus) |
| 15–00 ~ 15–33: | logic groups |
| 16, 16–00 ~ 16–35: | devices (disk drives) |
| 18: | MPU |
| 20: | host adapter |
| 22: | cache unit |
| 24–0 ~ 24–5: | device adapters |
| 26: | control bus |
| 28: | data bus |
| 30: | bridge circuit |
| 32: | host accessing unit |
| 34: | device accessing unit |
| 36: | construction control unit |
| 38: | failure processing unit |

What is claimed is:

1. A device array system coupled to a host computer and comprising:

a device array unit comprising:

a plurality of ports, each of said ports being assigned a port number, and a plurality of devices to input and output connected to each of the plurality of ports, said plurality of devices being organized into a plurality of ranks and said plurality of devices being accessed in parallel on a rank unit and port number basis; and a controller dividing said plurality of devices provided in said device array unit into a plurality of logic groups having a combination of RAID levels and accessing the plurality of devices on said logic group unit and port number basis in response to an access request from the host computer, said controller comprising:

a construction control unit constructing during activation of said device array system, as said logic groups, a first logic group in which same data is stored into (N) devices and multiplexed and a second logic group in which the same data is stored into at least (N+1) devices and multiplexed, and a failure processing unit fetching one of the at least (N+1) devices in said second logic group into said first logic group if one of the (N) devices in said first logic group has failed and redundancy is lost, and reconstructing data stored in the failed device by using said fetched device as a failure alternate device, thereby recovering the redundancy.

2. A device array system according to claim 1, wherein:

as said logic groups, said construction control unit constructs a first logic group in which same data is stored into two devices and is duplexed and a second logic group in which same data is stored into three devices and triplicated; and when one of the devices in said first logic group has failed and the redundancy is lost, said failure processing unit fetches one of the devices in said second logic group into said first logic group and reconstructs data stored in the failed device by using said fetched device as a failure alternate device, thereby recovering the redundancy.

3. A device array system according to claim 1, wherein when the failed device in said first logic group is exchanged for a normal device, said failure processing unit fetches the exchanged device into said first logic group, reconstructs the same data as that of said failure alternate device, and returns said failure alternate device into said second logic group, thereby reconstructing the original data.

4. A device array system according to claim 1, wherein when the failed device in said first logic group is exchanged for a normal device, said failure processing unit fetches the exchanged device into said second logic group, reconstructs the data, and leaves said failure alternate device as it is in said first logic group.

5. A device array system according to claim 1, wherein in the case where one device in said first logic group has failed and a redundancy is lost and the device in said second logic group is fetched into the first logic group and the data is reconstructed by using said fetched device as a failure alternate device and, subsequently, one device in said first logic group has failed, said failure processing unit fetches another device in the second logic group into the first logic group and reconstructs the data by using said fetched device as a second failure alternate device, thereby recovering the redundancy.

6. A device array system according to claim 1, wherein when the failure alternate device in said first logic group is fetched from said second logic group, said failure processing unit preferentially selects as the failure alternate device a device in the second logic group connected to the same port as that of said failed device.

7. A device array system according to claim 1, wherein in the case where the device in said second logic group has failed, said failure processing unit continues to execute the access request in a state in which said failed device is disconnected, and when said failed device is exchanged for a normal device, said failure processing unit returns said device to the second logic group and reconstructs the data therein.

8. A device array system according to claim 1, wherein said failure processing unit measures an error ratio of said plurality of devices provided for said device array unit to the accesses and, when said error ratio is equal to or larger than a predetermined value, said failure processing unit determines that the device has failed, and executes a corresponding process.

9. A device array system according to claim 1, wherein:
as said second logic group, said construction control unit constructs a plurality of second logic groups having different redundancies comprising (N+1) multiplexing and (N+2) multiplexing; and
when the device in said first logic group has failed and the redundancy is lost, said failure processing unit fetches the device in the group having a highest redundancy among said plurality of second logic groups into said first logic group and reconstructs the data by using said fetched device as a failure alternate device, thereby recovering the redundancy.

10. A device array system according to claim 1, wherein:
said device array unit comprises a magnetic disk drive and a semiconductor memory;
said construction control unit arranges at least one semiconductor memory into said plurality of devices in said second logic group; and
when the device in said first logic group has failed and the redundancy is lost, said failure processing unit assembles the semiconductor memory in said second logic group into said first logic group and reconstructs the data by using said assembled semiconductor memory as an alternate device of said failed device, thereby recovering the redundancy.

11. A device array system according to claim 1, wherein said device array unit comprises input/output devices comprising one of magnetic disk drives, magnetooptic disk drives, semiconductor memories, and magnetic tape apparatuses.

12. A device array system according to claim 1, wherein said device array unit comprises input/output devices comprising magnetic disk drive, magnetooptic disk drive, semiconductor memory, and magnetic tape apparatus.

13. A device array system comprising:
a device array unit comprising:
a plurality of ports, each of said ports being assigned a port number, and
a plurality of devices to input and output connected to each of the plurality of ports over a plurality of ranks and said plurality of devices being accessed in parallel on a rank unit and port number basis; and
a controller dividing said plurality of devices provided for said device array unit into a plurality of logic groups having a combination of RAID levels and accessing said plurality of devices on said logic group unit and port number basis in response to an access request from an upper apparatus, said controller comprising:
a construction control unit constructing during activation of the device array system the plurality of logic groups, each logic group comprising a predetermined redundancy, a data device storing data, and a Hamming code device storing a Hamming code corresponding to the data stored in said data device; and
a failure processing unit detecting when the device in a certain logic group has failed and a redundancy is below said predetermined redundancy, assembling a device for redundancy in another logic group into said logic group in which the device failure occurred under a condition such that the redundancy is not below said predetermined redundancy as a prerequisite, reconstructing the data by using said assembled device as a failure alternate device, thereby recovering the redundancy.

14. A device array system according to claim 13, wherein when said failed device is exchanged for a normal device, said failure processing unit reconstructs the same data as that of said failure alternate device into the exchanged device, returns said failure alternate device into the original logic group, and reconstructs the original Hamming code.

15. A device array system coupled to a host computer and comprising:
a device array unit comprising:
a plurality of ports, each of said ports being assigned a port number, and
a plurality of devices to input and output connected to each of the plurality of ports over a plurality of ranks and said plurality of devices being accessed in parallel on a rank unit and port number basis; and
a controller dividing said plurality of devices provided for said device array unit into a plurality of logic groups having a combination of RAID levels and accessing the plurality of devices on said logic group unit and port number basis in response to an access request from the host computer, said controller comprising:
a construction control unit constructing during activation of said device array system, as said logic groups, a first logic group in which data is divided and stored into each of a plurality of data devices and parities obtained from said storage data are stored into a plurality of parity devices and a second logic group in which data is divided and stored into a plurality of data devices and parities obtained from said storage data are stored in one parity device; and a failure processing unit detecting when the device in said second logic group has failed and a redundancy is lost, fetching one parity device in said first logic group into said second logic group, and reconstructing the data reconstructed by using said fetched parity device as a failure alternate device, thereby recovering the redundancy.

16. A device array system according to claim 15, wherein said construction control unit constructs a first logic group in which a parity device of RAID-3 is multiplexed and a second logic group of RAID-3.

17. A device array system according to claim 15, wherein said construction control unit constructs a first logic group in which a parity device of RAID-4 is multiplexed and a second logic group of RAID-4.

18. A device array system according to claim 15, wherein when the failed device in said second logic group is exchanged for a normal device, said failure processing unit reconstructs the same parity as that in said second logic group into said exchanged device, duplicates the parity device, and leaves the failure alternate device fetched from said first logic group into said second logic group as it is.

19. A device array system according to claim 15, wherein when the failed device in said second logic group is exchanged for a normal device, said failure processing unit reconstructs the same data as that in said failure alternate device into said exchanged device, returns said failure alternate device into the first logic group, and reconstructs the original parity.

20. A device array system coupled to a host computer and comprising:

a device array unit comprising:
a plurality of ports, each of said ports being assigned a port number, and
a plurality of devices to input and output connected to each of the plurality of ports over a plurality of ranks and said plurality of devices being accessed in parallel on a rank unit and a port number basis; and a controller dividing said plurality of devices provided for said device array unit into a plurality of logic groups having a combination of RAID levels and accessing the plurality of devices on said logic group unit and port number basis in response to an access request from said host computer, said controller comprising:
a construction control unit constructing during activation of said device array system, as said logic groups, a first logic group having a plurality of data devices in which data is divided and stored, one parity device to store the same parity obtained from said storage data, and at least one data multiplexing device in which the same data as that of a part of said plurality of data devices is stored and multiplexed and a second logic group having a plurality of data devices in which data is divided and stored and one parity device for storing parities obtained from said storage data, and a failure processing unit detecting when the device in said second logic group has failed and a redundancy is lost, and fetching one data multiplexing device in said first logic group into said second logic group and reconstructs the data by using said fetched data multiplexing device as a failure alternate device, thereby recovering the redundancy.

21. A device array system according to claim 20, wherein said construction control unit constructs a first logic group in which a part of the data devices of RAID-3 is multiplexed and a second logic group of RAID-4.

22. A device array system according to claim 20, wherein said construction control unit constructs a first logic group in which a part of the data devices of RAID-4 is multiplexed and a second logic group of RAID-4.

23. A device array system according to claim 20, wherein when the failed device in said second logic group is exchanged for a normal device, said failure processing unit reconstructs the same data as that in a specific data device in said second logic group into said exchanged device, duplicates a part of the data devices, and leaves the failure alternate device fetched from said first logic group into said second logic group as it is.

24. A device array system according to claim 20, wherein when the failed device in said second logic group is exchanged for a normal device, said failure processing unit reconstructs the same data as that in said failure alternate device into said exchanged device, returns said failure alternate device into the first logic group, and reconstructs the original data.

25. A device array system coupled to a host computer and comprising:

a device array unit comprising:
a plurality of ports, each of said ports being assigned a port number, and
a plurality of devices to input and output connected to each of the plurality of ports over a plurality of ranks and said plurality of devices being accessed in parallel on a rank unit and port number basis; and a controller dividing said plurality of devices provided for said device array unit into a plurality of logic groups having a combination of RAID levels and accessing the pluralitv of devices on said logic group unit basis in response to an access request from an upper apparatus, said controller comprising:
a construction control unit constructing during activation of said device array system, as said logic groups, a first logic group having a plurality of devices for storing data and a parity corresponding to RAID-5 and a multiplexing device to store the same data and parity as those of a part of said plurality of devices and a second logic group having a plurality of devices to store the data and a parity corresponding to RAID-5, and a failure processing unit determining when the device in said second logic group has failed and a redundancy is lost, and fetching the multiplexing device in said first logic group into said second logic group, and reconstructing the data by using said fetched multiplexing device as a failure alternate device, thereby recovering the redundancy.

26. A device array system according to claim 25, wherein when the failed device in said second logic group is exchanged for a normal device, said failure processing unit reconstructs the same data as that in said failure alternate device into said exchanged device, returns said failure alternate device into the first logic group, and reconstructs the original data.

27. A device array system coupled to a host computer and comprising:

a device array unit comprising:
a plurality of ports, each of said ports being assigned a port number, and
a plurality of devices to input and output connected to each of the plurality of ports over a plurality of ranks and said plurality of devices being accessed in parallel on a rank unit and port number basis; and a controller dividing said plurality of devices provided for said device array unit into a plurality of logic groups having a combination of RAID levels and for accessing said plurality of devices on said logic group unit basis in response to an access request from the host computer, wherein said controller comprises:

a construction control unit constructing during activation of said device array system, as said logic groups, a first logic group in which data and a Hamming code corresponding to RAID-2 are stored in a plurality of devices and a second logic group in which data and a parity corresponding to RAID-1, 3, 4, or 5, and a failure processing unit determining when the device in said second logic group has failed and a redundancy is lost, and fetching the Hamming code device in said first logic group into said second logic group and, reconstructing the data by using said fetched Hamming code device as a failure alternate device, thereby recovering the redundancy.

28. A device array system coupled to a host computer and comprising:

a device array unit comprising:

a plurality of ports, each of said ports being assigned a port number, a plurality of devices to input and output connected to each of the plurality of ports over a plurality of ranks and said plurality of devices being accessed in parallel on a rank unit and port number basis; and a controller dividing said plurality of devices provided for said device array unit into a plurality of logic groups having a combination of RAID levels and accessing said plurality of devices on said logic group unit and port number basis in response to an access request from the host computer, wherein said controller comprises:

a construction control unit constructing during activation of said device array system, as said logic groups, a first logic group in which data and a Hamming code corresponding to RAID-2 are stored into a plurality of devices and a second logic group in which data and a parity corresponding one of RAID-1, RAID-3, RAID-4, and RAID-5 are stored in a plurality of devices, and a failure processing unit determining when the device in said second logic group has failed and a redundancy is lost, changing said first logic group to a logic group of RAID-3, fetching one of a plurality of Hamming code devices released from the first logic group into said second logic group, and reconstructing the data by using said fetched Hamming code device as a failure alternate device, thereby recovering the redundancy.

29. A device array system coupled to a host computer and comprising:

a device array unit comprising:

a plurality of ports, each of said ports being assigned a port number, and a plurality of devices to input and output connected to each of the plurality of ports over a plurality of ranks and said plurality of devices can be accessed in parallel on a rank unit and port number basis; and a controller dividing said plurality of devices provided for said device array unit into a plurality of logic groups having a combination of RAID levels and accessing said plurality of devices on said logic group unit and port number basis in response to an access request from said host computer, wherein said controller comprises:

a construction control unit constructing during activation of said device array system, as said logic groups, a first logic group in which same data is stored into a plurality of devices and a second logic group in which data and a parity are stored into a plurality of devices, and a failure processing unit determining the device in said first logic group has failed and a redundancy is lost, fetching a parity device in said second logic group into said first logic group, and reconstructing the data by using said fetched parity device as a failure alternate device, thereby recovering the redundancy.

30. A device array system according to claim 29, wherein said construction control unit constructs, as said first logic group, a duplicating logic group in which same data is stored into two devices and constructs, as said second logic group, a logic group of RAID-3 or 4 in which a parity device is fixed.

31. A device array system coupled to a host computer and comprising:

a device array unit comprising:

a plurality of ports, each of said ports being assigned a port number, and a plurality of devices to input and output connected to each of the plurality of ports over a plurality of ranks and said plurality of devices being accessed in parallel on a rank unit and port number basis; and a controller dividing said plurality of devices provided for said device array unit into a plurality of logic groups having a combination of RAID levels and accessing said plurality of devices on said logic group unit basis in response to an access request from the host computer, wherein said controller comprises:

a construction control unit constructing during activation of said device array system, as said logic groups, a first logic group in which same data is stored into a plurality of devices and a second logic group in which data and a parity are stored into a plurality of devices, and a failure processing unit determining when the device in said second logic group has failed and a redundancy is lost, fetching one device in said first logic group into said second logic group, and reconstructing the data by using said fetched device as a failure alternate device, thereby recovering the redundancy.

32. A device array system according to claim 31, wherein said construction control unit constructs, as said first logic group, a multiplexing logic group in which same data is stored into at least three devices and constructs, as said second logic group, a logic group of one of RAID-3, RAID-4, and RAID-5.

33. A disk array system, comprising:

a disk array controller; and disk drives, coupled to the disk array controller, and storing data, said disk drives corresponding to each other in groups and organized into ranks and combinations of RAID levels upon activation of the disk array system, each of said disk drives being grouped into one of the groups, each one of the groups comprising redundant disk drives comprising at least two of the disk drives, wherein, if one of the disk drives in one of the groups having a lower level of redundancy fails, one of the disk drives in one of the group s having a higher redundancy replaces the failed disk drive, said disk drives being accessed by said disk array controller based upon the ranks and port numbers of the disk drives.

34. A method for providing an alternate device in place of a failed device in a device array apparatus in which the alternate device and the failed device are two of disk drives organized into ranks and a combination of RAID levels upon activation of the device array apparatus, said method comprising the steps of:

determining which of the devices has failed; and reconstructing data stored on the failed device of one of the RAID levels having a lower level of redundancy into another of the devices of another of the RAID levels having a higher level of redundancy an d which is storing redundant information, wherein the disk array apparatus accesses the disk drives based upon the ranks and upon respective port numbers of the disk drives.

35. The method according to claim 34, wherein the devices comprise disk drives.

36. The method according to claim 34, wherein the devices comprise semiconductor memory.

37. The method according to claim 34, wherein the devices comprise optical drives.

38. The method according to claim 34, wherein the devices comprise magnetic tape drives.

39. The method according to claim 34, wherein the devices comprise disk drives, semiconductor memory, optical drives, and magnetic tape.

40. An apparatus coupled to a host computer transmitting an instruction and comprising:

a device array unit comprising devices executing input/output based upon the instruction, one of said devices being redundant of another of said devices, said devices being organized into ranks and combinations of RAID levels upon activation of the device array unit; and a controller, coupled to the device array unit, determining which of the devices has failed, and reconstructing data stored on the failed device of one of the RAID levels having a lower level of redundancy into the one of said devices of another of the RAID levels having a higher level of redundancy and which is storing redundant data, said devices being accessed based upon the ranks and respective port numbers of the devices.

41. The apparatus according to claim 35, wherein the devices comprise disk drives.

42. The apparatus according to claim 35, wherein the devices comprise semiconductor memory.

43. The apparatus according to claim 35, wherein the devices comprise optical drives.

44. The apparatus according to claim 35, wherein the devices comprise magnetic tape drives.

45. The apparatus according to claim 35, wherein the devices comprise disk drives, semiconductor memory, optical drives, and magnetic tape.

46. The apparatus according to claim 35, wherein the devices correspond to RAID-1.

47. The apparatus according to claim 35, wherein the devices correspond to RAID-2.

48. The apparatus according to claim 35, wherein the devices correspond to RAID-3.

49. The apparatus according to claim 35, wherein the devices correspond to RAID-4.

50. The apparatus according to claim 35, wherein the devices correspond to RAID-5.

51. The apparatus according to claim 35, wherein the devices correspond to a combination of RAID-1, RAID-2, RAID-3, RAID-4, and RAID-5.

52. A method for providing an alternate device in place of a failed device in a device array apparatus in which the alternate device and the failed device are two of disk drives organized into ranks and a combination of RAID levels upon activation of the device array apparatus, said method comprising the steps of:

determining which of the devices has failed;

determining which of the devices are grouped together in a logic group having a relatively higher redundancy of data;

reconstructing data stored on the failed device into another of the devices which is storing redundant data in the logic group having the relatively higher redundancy, wherein the devices are accessed based upon the ranks and port numbers of the devices.

53. The method according to claim 52, wherein the devices correspond to a RAID.

54. An apparatus coupled to a host computer transmitting an instruction and comprising:

a device array unit comprising devices organized into ranks and combinations of RAID levels upon activation of the device array unit and executing input/output based upon the instruction, one of said devices being redundant of another of said devices, said devices being grouped into logic groups and accessed based upon the ranks and respective port numbers of the devices; and a controller, coupled to the device array unit, determining which of the devices has failed, and reconstructing data stored on the failed device into the one of said devices which is redundant and which is grouped into one of the logic groups having a relatively higher redundancy of data.

55. The apparatus according to claim 53, wherein the devices correspond to a RAID.

56. An apparatus coupled to a host computer transmitting an instruction and comprising:

means for storing data comprising devices executing input/output based upon the instruction, one of said devices being redundant of another of said devices, said devices being grouped into logic groups and organized into ranks and combinations of RAID levels upon activation of the apparatus; and means for determining which of the devices has failed and for reconstructing data stored on the failed device into the one of said devices which is redundant and which is grouped into one of the logic groups having a relatively higher redundancy of data, said devices being accessed based upon the ranks and upon respective port numbers of the devices.

* * * * *

UNITED STATES PATENT AND TRADEMARK OFFICE
CERTIFICATE OF CORRECTION

PATENT NO.  : 6,079,029
DATED       : June 20, 2000
INVENTOR(S) : Sawao Iwatani, et al.

It is certified that error appears in the above-identified patent and that said Letters Patent is hereby corrected as shown below:

Item [57]  Abstract
Line 9, after "triplicated." change "when" to -- When --.

Item [56]  References Cited
Please list the following references which were omitted from the cover of the patent:

-- F6401A Magnetic Disk Array Unit" Fujitsu Science Technology Journal, 31, 1, pp. 18-28 (June 1995)

F1710A File Control Unit and F6493 Array Disk Subsystem" Extracted from Fujitsu Scientific and Technical Journal Vol. 31, No. 1, Japan, pp. 29-35 (June 15, 1995).

Chen et al., "RAID: High-Performance, Reliable Secondary Storage, ACM Computing Surveys, Vol.26, No. 2, pp 145-185.

| | | |
|---|---|---|
| 5,845,319 | 12/1998 | Yorimitsu |
| 5,634,033 | 5/1997  | Stewart et al. |
| 5,754,756 | 12/1998 | Watanabe et al. -- |

UNITED STATES PATENT AND TRADEMARK OFFICE
CERTIFICATE OF CORRECTION

PATENT NO. : 6,079,029
DATED : June 20, 2000
INVENTOR(S) : Sawao Iwatani, et al.

It is certified that error appears in the above-identified patent and that said Letters Patent is hereby corrected as shown below:

Column 42,
Line 61, change "group s" to -- groups --.

Column 43,
Line 9, change "an d" to -- and --.

Signed and Sealed this

Fourteenth Day of August, 2001

*Attest:*

*Attesting Officer*

NICHOLAS P. GODICI
*Acting Director of the United States Patent and Trademark Office*